United States Patent
Raghavan et al.

(10) Patent No.: US 11,784,702 B2
(45) Date of Patent: Oct. 10, 2023

(54) TECHNIQUES FOR TRANSMISSION/RECEPTION POINT AND BEAM SELECTION IN ULTRA-WIDE BANDWIDTH SYSTEMS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 17/484,049

(22) Filed: Sep. 24, 2021

(65) Prior Publication Data
US 2022/0103235 A1    Mar. 31, 2022

Related U.S. Application Data

(60) Provisional application No. 63/085,053, filed on Sep. 29, 2020, provisional application No. 63/085,126, filed on Sep. 29, 2020.

(51) Int. Cl.
*H04B 7/08*       (2006.01)
*H04W 72/0453*    (2023.01)
*H04W 72/56*      (2023.01)

(52) U.S. Cl.
CPC ........ *H04B 7/088* (2013.01); *H04W 72/0453* (2013.01); *H04W 72/56* (2023.01)

(58) Field of Classification Search
CPC ...... H04B 7/088; H04B 7/0695; H04B 16/28; H04W 72/56; H04W 72/0453; H04W 72/563; H04W 72/046
See application file for complete search history.

(56) References Cited

U.S. PATENT DOCUMENTS

| | | | |
|---|---|---|---|
| 2019/0215136 A1* | 7/2019 | Zhou | H04B 7/088 |
| 2019/0268901 A1* | 8/2019 | Park | H04L 5/00 |
| 2019/0306867 A1* | 10/2019 | Cirik | H04W 74/0833 |
| 2020/0036430 A1* | 1/2020 | Kim | H04W 76/28 |
| 2020/0221478 A1* | 7/2020 | Fakoorian | H04W 72/1268 |
| 2021/0045070 A1* | 2/2021 | Yi | H04W 72/0446 |

* cited by examiner

*Primary Examiner* — Mewale A Ambaye
(74) *Attorney, Agent, or Firm* — Holland & Hart LLP

(57) ABSTRACT

Methods, systems, and devices for wireless communications are described. Devices in a wireless communications system using multiple transmission/reception points (TRPs) may provide information related to one or more default operating frequencies. A user equipment (UE) may receive a message indicating one or more default operating frequencies for each TRP of a set of TRPs. The UE may determine a priority of each TRP of the set of TRPs based on the respective default operating frequencies of the TRPs compared with a default operating frequency of the UE and may indicate the priorities to each TRP. Additionally, based on the default operating frequencies of the TRPs, the UE may select two or more TRPs of the set of TRPs that are suited for joint communications with the UE and may transmit an indication of the selected TRPs. The selected TRPs may coordinate joint communications over an ultra-wide bandwidth with the UE.

30 Claims, 26 Drawing Sheets

TECHNIQUES FOR TRANSMISSION/RECEPTION POINT AND BEAM SELECTION IN ULTRA-WIDE BANDWIDTH SYSTEMS

CROSS REFERENCE

The present Application for Patent claims the benefit of U.S. Provisional Patent Application No. 63/085,126 by RAGHAVAN et al., entitled "TECHNIQUES FOR TRANSMISSION/RECEPTION POINT AND BEAM SELECTION IN ULTRA-WIDE BANDWIDTH SYSTEMS," filed Sep. 29, 2020, and U.S. Provisional Patent Application No. 63/085,053 by RAGHAVAN et al., entitled "JOINT BEAMFORMING OVER ULTRA-WIDE BANDWIDTHS IN MULTI-TRANSMISSION/RECEPTION POINT SYSTEMS," filed Sep. 29, 2020, both of which are assigned to the assignee hereof, and expressly incorporated by reference herein.

FIELD OF TECHNOLOGY

The present disclosure relates to wireless communications, including techniques for transmission/reception point and beam selection in ultra-wide bandwidth systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support beamformed communications using one or multiple antenna arrays at different devices. For instance, a network may communicate with a UE using one or more transmission/reception point (TRPs), where each TRP and the UE may have one or more antenna arrays to form directional beams. However, communications performance over some frequency ranges may, in some cases, be affected by a configuration of an antenna array at the UE or at the multiple TRPs.

SUMMARY

The described techniques relate to improved methods, systems, devices, and apparatuses that support techniques for transmission/reception point (TRP) and beam selection in ultra-wide bandwidth systems. Generally, the described techniques enable devices in a wireless communications system to indicate a preference for one or more TRPs and one or more associated beams in a multi-TRP deployment. For example, each TRP may identify one or more default operating frequencies within an ultra-wide bandwidth and transmit an indication of the default operating frequencies to another wireless device, such as a user equipment (UE). Based on the default operating frequencies of the TRPs (in addition to the TRP ports and associated beams used for communications with the UE), the UE may determine a priority for each TRP, ports of each TRP, and each beam index based on a comparison or compatibility with the UE's default operating frequencies. For instance, a higher-priority TRP, port, and beam (e.g., beam index) may be associated with a default operating frequency that corresponds more closely to the UE's default operating frequency than a lower-priority TRP, port, and beam. In some examples, the UE may generate a list of the TRPs, the ports, and the beam indices in order of the determined priority. The UE may indicate (e.g., via a broadcast transmission or control signaling) the priorities or list of priorities to each TRP, and may communicate with one or more TRPs over an ultra-wide bandwidth based on the priority indication. The default operating frequencies for the various wireless devices may be device-specific and may be based on a hardware configuration of a certain device (e.g., a number of radio frequency (RF) chains, antenna element spacing, or the like).

Additionally, or alternatively, the UE may (e.g., based on the default operating frequencies of the TRPs and the TRP ports and associated beams used for communications with the UE) determine that two or more TRPs are suited for joint communications (e.g., joint beamforming or TRP hopping) with the UE (e.g., based on a comparison or compatibility with the UE's default operating frequencies). The UE may indicate (e.g., via a broadcast transmission or control signaling) the selected TRPs such that the selected TRPs may coordinate joint communications over an ultra-wide bandwidth with one another and the UE. For example, the TRPs may configure the joint communications using signaling over a backhaul link or other link between the TRPs.

A method for wireless communication at a wireless device is described. The method may include receiving one or more messages indicating respective default operating frequencies for each TRP of a set of multiple TRPs, each of the respective default operating frequencies for communications with the wireless device over different portions of a bandwidth, transmitting an indication of a priority of each TRP of the set of multiple TRPs, the priority being based on the respective default operating frequencies for each TRP, where the indication of the priority includes an ordering of the set of multiple TRPs, one or more antenna ports associated with each TRP, one or more beam indices, or any combination thereof, selecting, from the set of multiple TRPs, two or more TRPs for joint communications with the wireless device based on the respective default operating frequencies of the two or more TRPs and one or more default operating frequencies of the wireless device, and transmitting a message indicating the two or more TRPs for the joint communications with the wireless device.

An apparatus for wireless communication at a wireless device is described. The apparatus may include a processor, memory coupled with the processor, and instructions stored in the memory. The instructions may be executable by the processor to cause the apparatus to receive one or more messages indicating respective default operating frequencies for each TRP of a set of multiple TRPs, each of the respective default operating frequencies for communications with the wireless device over different portions of a bandwidth, transmit an indication of a priority of each TRP of the set of multiple TRPs, the priority being based on the respective default operating frequencies for each TRP, where the indication of the priority includes an ordering of the set of multiple TRPs, one or more antenna ports associated with each TRP, one or more beam indices, or any combination thereof, select, from the set of multiple TRPs, two or more TRPs for joint communications with the wireless device based on the respective default operating frequencies of the two or more TRPs and one or more default operating frequencies of the wireless device, and transmit a message indicating the two or more TRPs for the joint communications with the wireless device.

Another apparatus for wireless communication at a wireless device is described. The apparatus may include means for receiving one or more messages indicating respective default operating frequencies for each TRP of a set of multiple TRPs, each of the respective default operating frequencies for communications with the wireless device over different portions of a bandwidth, means for transmitting an indication of a priority of each TRP of the set of multiple TRPs, the priority being based on the respective default operating frequencies for each TRP, where the indication of the priority includes an ordering of the set of multiple TRPs, one or more antenna ports associated with each TRP, one or more beam indices, or any combination thereof, means for selecting, from the set of multiple TRPs, two or more TRPs for joint communications with the wireless device based on the respective default operating frequencies of the two or more TRPs and one or more default operating frequencies of the wireless device, and means for transmitting a message indicating the two or more TRPs for the joint communications with the wireless device.

A non-transitory computer-readable medium storing code for wireless communication at a wireless device is described. The code may include instructions executable by a processor to receive one or more messages indicating respective default operating frequencies for each TRP of a set of multiple TRPs, each of the respective default operating frequencies for communications with the wireless device over different portions of a bandwidth, transmit an indication of a priority of each TRP of the set of multiple TRPs, the priority being based on the respective default operating frequencies for each TRP, where the indication of the priority includes an ordering of the set of multiple TRPs, one or more antenna ports associated with each TRP, one or more beam indices, or any combination thereof, select, from the set of multiple TRPs, two or more TRPs for joint communications with the wireless device based on the respective default operating frequencies of the two or more TRPs and one or more default operating frequencies of the wireless device, and transmit a message indicating the two or more TRPs for the joint communications with the wireless device.

Some examples of the method, apparatuses, and non-transitory computer-readable medium described herein may further include operations, features, means, or instructions for determining the priority of each TRP of the set of multiple TRPs based on the one or more default operating frequencies of the wireless device for the communications over the portions of the bandwidth.

In some examples of the method, apparatuses, and non-transitory computer-readable medium described herein, determining the priority may include operations, features, means, or instructions for identifying a first antenna port of a first TRP of the set of multiple TRPs, the first antenna port associated with a first default operating frequency, identifying a first beam index of a beam for communicating with the first TRP, the first beam index associated with the first antenna port and the first default operating frequency, and determining a priority of the first TRP, the first antenna port, and the first beam index based on the one or more default operating frequencies of the wireless device and the first default operating frequency.

In some examples of the method, apparatuses, and non-transitory computer-readable medium described herein, the indication of the priority includes the priority of the first TRP, the first antenna port, and the first beam index relative to a second TRP of the set of multiple TRPs, a second antenna port of the second TRP, and a second beam index.

Some examples of the method, apparatuses, and non-transitory computer-readable medium described herein may further include operations, features, means, or instructions for identifying one or more of a synchronization signal block (SSB), a channel state information reference signal (CSI-RS), or a sounding reference signal (SRS), associated with the beam, where the first beam index may be identified based on SSB, the CSI-RS, the SRS, or any combination thereof.

Some examples of the method, apparatuses, and non-transitory computer-readable medium described herein may further include operations, features, means, or instructions for comparing the respective default operating frequencies for each TRP with the one or more default operating frequencies of the wireless device, where determining the priority may be based on the comparison.

Some examples of the method, apparatuses, and non-transitory computer-readable medium described herein may further include operations, features, means, or instructions for estimating array gain losses for transmissions over antenna ports of the wireless device and antenna ports of each TRP, where the comparison may be based on the estimated array gain losses.

In some examples of the method, apparatuses, and non-transitory computer-readable medium described herein, each default operating frequency of the one or more default operating frequencies includes a frequency such that substantially half of a wavelength corresponding to the frequency may be substantially equal to a spacing between two or more antenna elements of an antenna array of the wireless device.

In some examples of the method, apparatuses, and non-transitory computer-readable medium described herein, the spacing between the two or more antenna elements of the antenna array of the wireless device may be within an upper threshold and a lower threshold that may be associated with substantially half of the wavelength of the frequency.

In some examples of the method, apparatuses, and non-transitory computer-readable medium described herein, transmitting the indication of the priority may include operations, features, means, or instructions for transmitting, to at least one TRP of the set of multiple TRPs, the indication of the priority via a control signaling.

In some examples of the method, apparatuses, and non-transitory computer-readable medium described herein, transmitting the indication of the priority may include operations, features, means, or instructions for broadcasting the indication of the priority to the set of multiple TRPs.

In some examples of the method, apparatuses, and non-transitory computer-readable medium described herein, receiving the one or more messages indicating the respective default operating frequencies may include operations, features, means, or instructions for receiving, from a first TRP of the set of multiple TRPs, a message including an indication of one or more default operating frequencies of the first TRP, each of the one or more default operating frequencies corresponding to one or more antenna ports of the first TRP.

In some examples of the method, apparatuses, and non-transitory computer-readable medium described herein, each of the respective default operating frequencies include a range of default operating frequencies for a TRP of the set of multiple TRPs, the range of default operating frequencies providing beamforming performance that satisfies a performance threshold.

Some examples of the method, apparatuses, and non-transitory computer-readable medium described herein may further include operations, features, means, or instructions for communicating with a first TRP over a beam based on the priority, where the beam corresponds to a beam index, an antenna port, and a TRP having a highest priority.

Some examples of the method, apparatuses, and non-transitory computer-readable medium described herein may further include operations, features, means, or instructions for identifying an additional TRP that may be different from TRPs of the set of multiple TRPs and modifying the priority based on one or more default operating frequencies of the additional TRP.

Some examples of the method, apparatuses, and non-transitory computer-readable medium described herein may further include operations, features, means, or instructions for performing one or more beam refinement procedures for communicating with at least one TRP of the set of multiple TRPs based on the indication of the priority.

In some examples of the method, apparatuses, and non-transitory computer-readable medium described herein, the priority may be based on a dynamic TRP selection scheme.

Some examples of the method, apparatuses, and non-transitory computer-readable medium described herein may further include operations, features, means, or instructions for identifying a first TRP of the set of multiple TRPs that supports a first default operating frequency, determining that the first default operating frequency may be supported by the wireless device using a comparison between the one or more default operating frequencies of the wireless device and the first default operating frequency of the first TRP, and selecting at least the first TRP for the joint communications based on the comparison.

Some examples of the method, apparatuses, and non-transitory computer-readable medium described herein may further include operations, features, means, or instructions for identifying a second TRP of the set of multiple TRPs that supports a second default operating frequency, determining that the second default operating frequency may be supported by the wireless device using a comparison between the one or more default operating frequencies of the wireless device and the second default operating frequency of the second TRP, and selecting the second TRP for the joint communications based on the comparison.

In some examples of the method, apparatuses, and non-transitory computer-readable medium described herein, determining that the first default operating frequency may be supported by the wireless device may include operations, features, means, or instructions for identifying a configuration of one or more antenna ports of the wireless device and determining that the first default operating frequency may be supported by the wireless device based on the configuration of the one or more antenna ports.

Some examples of the method, apparatuses, and non-transitory computer-readable medium described herein may further include operations, features, means, or instructions for estimating array gain losses for communications over the bandwidth that may be associated with a first antenna port of the first TRP and a second antenna port of the wireless device, where selecting at least the first TRP may be based on the estimated array gain losses satisfying a threshold.

Some examples of the method, apparatuses, and non-transitory computer-readable medium described herein may further include operations, features, means, or instructions for receiving, from the first TRP, a second message including an indication of one or more default operating frequencies of the first TRP, each of the one or more default operating frequencies of the first TRP corresponding to one or more antenna ports of the first TRP, or one or more radio frequency chains of the first TRP, or any combination thereof.

In some examples of the method, apparatuses, and non-transitory computer-readable medium described herein, transmitting the message indicating the two or more TRPs may include operations, features, means, or instructions for transmitting the message via control signaling to each TRP of the set of multiple TRPs.

In some examples of the method, apparatuses, and non-transitory computer-readable medium described herein, the message may be transmitted semi-statically during one or more time intervals or dynamically.

Some examples of the method, apparatuses, and non-transitory computer-readable medium described herein may further include operations, features, means, or instructions for communicating with the two or more TRPs for the joint communications, where the joint communications includes joint beamforming between the wireless device and each TRP of the two or more transmission reception points.

Some examples of the method, apparatuses, and non-transitory computer-readable medium described herein may further include operations, features, means, or instructions for identifying a TRP hopping pattern for communications between the two or more TRPs, transmitting, within the message, an indication of the TRP hopping pattern, and communicating with each of the two or more TRPs in accordance with the TRP hopping pattern.

In some examples of the method, apparatuses, and non-transitory computer-readable medium described herein, the wireless device includes a user equipment, or an integrated access and backhaul node, or a customer premises equipment, or a sidelink node, or a wireless repeater configured for retransmissions.

A method for wireless communication at a base station is described. The method may include transmitting, to a wireless device, one or more messages indicating respective default operating frequencies for a set of multiple TRPs including at least a first TRP associated with the base station, each of the respective default operating frequencies for communications with the wireless device over portions of a bandwidth, receiving, from the wireless device, an indication of a priority of each TRP of the set of multiple TRPs, the priority being based on the respective default operating frequencies for each TRP, where the indication of the priority includes an ordering of the set of multiple TRPs, one or more antenna ports associated with each TRP of the two or more TRPs, one or more beam indices, or any combination thereof, receiving, from the wireless device, a message indicating at least the first TRP and a second TRP for joint communications with the wireless device, where the joint communications are based on one or more default operating frequencies of the first TRP, one or more default operating frequencies of the second TRP, and one or more default operating frequencies of the wireless device, and communicating, in accordance with a configuration corresponding to the joint communications, with the wireless device based on the indication of the priority, the one or more default operating frequencies of the first TRP, and the one or more default operating frequencies of the wireless device, where the configuration is based on the message indicating at least the first TRP and the second TRP.

An apparatus for wireless communication at a base station is described. The apparatus may include a processor, memory coupled with the processor, and instructions stored in the memory. The instructions may be executable by the processor to cause the apparatus to transmit, to a wireless device, one or more messages indicating respective default operating frequencies for a set of multiple TRPs including at least a first TRP associated with the base station, each of the respective default operating frequencies for communications with the wireless device over portions of a bandwidth, receive, from the wireless device, an indication of a priority of each TRP of the set of multiple TRPs, the priority being based on the respective default operating frequencies for each TRP, where the indication of the priority includes an ordering of the set of multiple TRPs, one or more antenna ports associated with each TRP of the two or more TRPs, one or more beam indices, or any combination thereof, receive, from the wireless device, a message indicating at least the first TRP and a second TRP for joint communications with the wireless device, where the joint communications are based on one or more default operating frequencies of the first TRP, one or more default operating frequencies of the second TRP, and one or more default operating frequencies of the wireless device, and communicate, in accordance with a configuration corresponding to the joint communications, with the wireless device based on the indication of the priority, the one or more default operating frequencies of the first TRP, and the one or more default operating frequencies of the wireless device, where the configuration is based on the message indicating at least the first TRP and the second TRP.

Another apparatus for wireless communication at a base station is described. The apparatus may include means for transmitting, to a wireless device, one or more messages indicating respective default operating frequencies for a set of multiple TRPs including at least a first TRP associated with the base station, each of the respective default operating frequencies for communications with the wireless device over portions of a bandwidth, means for receiving, from the wireless device, an indication of a priority of each TRP of the set of multiple TRPs, the priority being based on the respective default operating frequencies for each TRP, where the indication of the priority includes an ordering of the set of multiple TRPs, one or more antenna ports associated with each TRP of the two or more TRPs, one or more beam indices, or any combination thereof, means for receiving, from the wireless device, a message indicating at least the first TRP and a second TRP for joint communications with the wireless device, where the joint communications are based on one or more default operating frequencies of the first TRP, one or more default operating frequencies of the second TRP, and one or more default operating frequencies of the wireless device, and means for communicating, in accordance with a configuration corresponding to the joint communications, with the wireless device based on the indication of the priority, the one or more default operating frequencies of the first TRP, and the one or more default operating frequencies of the wireless device, where the configuration is based on the message indicating at least the first TRP and the second TRP.

A non-transitory computer-readable medium storing code for wireless communication at a base station is described. The code may include instructions executable by a processor to transmit, to a wireless device, one or more messages indicating respective default operating frequencies for a set of multiple TRPs including at least a first TRP associated with the base station, each of the respective default operating frequencies for communications with the wireless device over portions of a bandwidth, receive, from the wireless device, an indication of a priority of each TRP of the set of multiple TRPs, the priority being based on the respective default operating frequencies for each TRP, where the indication of the priority includes an ordering of the set of multiple TRPs, one or more antenna ports associated with each TRP of the two or more TRPs, one or more beam indices, or any combination thereof, receive, from the wireless device, a message indicating at least the first TRP and a second TRP for joint communications with the wireless device, where the joint communications are based on one or more default operating frequencies of the first TRP, one or more default operating frequencies of the second TRP, and one or more default operating frequencies of the wireless device, and communicate, in accordance with a configuration corresponding to the joint communications, with the wireless device based on the indication of the priority, the one or more default operating frequencies of the first TRP, and the one or more default operating frequencies of the wireless device, where the configuration is based on the message indicating at least the first TRP and the second TRP.

DETAILED DESCRIPTION

Figure 1:
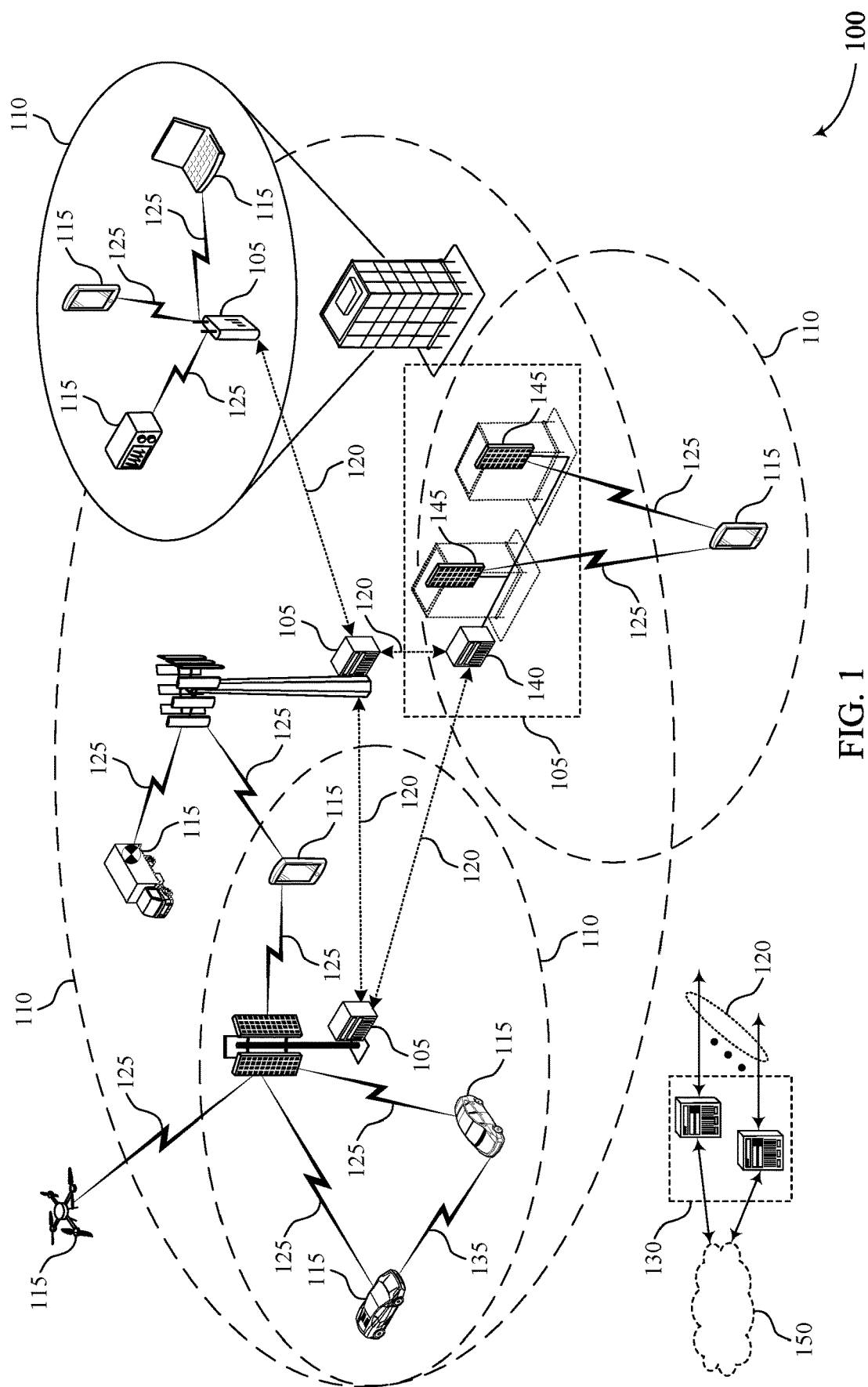
FIGS. 1 and 2 illustrate examples of wireless communications systems that support techniques for transmission/reception point (TRP) and beam selection in ultra-wide bandwidth systems in accordance with aspects of the present disclosure.

Some wireless communications systems may support wireless communications in relatively high frequency ranges, such as in frequency range 4 (FR4) (e.g., including 52.6 gigahertz (GHz)-114.25 GHz bands), which may be referred to as upper millimeter wave (mmW) bands, a sub-THz regime, or the like. Communications in such frequency ranges may utilize an ultra-wide bandwidth (e.g., a 14 GHz bandwidth, a 25 GHz bandwidth, a bandwidth greater than 3 GHz, or the like), which may enable enhanced communications performance at the corresponding frequencies. In such examples, the communications within an ultra-wide bandwidth may be associated with a channelization of the ultra-wide bandwidth, where respective portions or channels of the ultra-wide bandwidth may be used for communications between devices. In particular, a 14 GHz ultra-wide bandwidth may be available for communications between a user equipment (UE) and a base station, but only a portion of the ultra-wide bandwidth (e.g., a 2 GHz or 3 GHz channel) may be allocated for some communications between the devices.

However, a wireless device may be optimized for performance at a specific frequency—which may be referred to as a default operating frequency—and different devices communicating within a system may not have the same default operating frequency. Additionally, within an ultra-wide bandwidth, wireless devices may use a number of different channels (e.g., the 2 GHz or 3 GHz channels at different radio frequency (RF) bands) for communications, and in some cases may switch channels across the ultra-wide bandwidth. However, a device switching to a different channel may also need to update a beamforming codebook in accordance with the frequencies of the new channel, which may introduce latency and other inefficiencies. If, instead, a device re-uses a beamforming codebook across different channels within the ultra-wide bandwidth, performance may degrade at the device (e.g., rate control issues, decoding failures, or the like) due to beam squinting at the corresponding frequencies.

In some wireless communications systems, the network may communicate with a UE using one or more transmission/reception points (TRPs). For example, the network may communicate with the UE using a single TRP at a base station, using multiple TRPs at a same base station, or using multiple TRPs across multiple base stations. In such systems, the default operating frequencies of each device (e.g., each UE, each TRP, each base station) may vary across the system (e.g., because the default operating frequencies may be device-specific), and mismatches in default operating frequencies between communicating devices may cause array gain deterioration or other performance degradation or issues. For example, in a multi-TRP system, two or more TRPs may coordinate to perform joint communications (e.g., joint beamforming) with a wireless device (e.g., a UE). However, if the default operating frequencies across the two or more TRPs and the UE are mismatched, the joint communications may suffer from reduced performance. As such, it may be beneficial for a wireless device (e.g., a UE) to identify which TRPs may enable efficient communications based on the various default operating frequencies within a system.

As described herein, to avoid inefficiency and performance degradation in a multi-TRP system using an ultra-wide bandwidth, dynamic point selection and beam selection may be performed based on the default operating frequencies of devices within the multi-TRP system. For example, one or more TRPs may each identify one or more default operating frequencies within an ultra-wide bandwidth and may transmit an indication of the default operating frequencies to a UE. The default operating frequencies may be device-specific and may be based on a hardware configuration (e.g., a number of RF chains, an antenna array configuration, an antenna element spacing within an antenna panel) for communications over portions of a bandwidth (e.g., an ultra-wide bandwidth). The UE may determine a priority or an order of the TRPs, their antenna ports, and associated beams based on the default operating frequencies of the TRPs and the default operating frequencies of the UE. The UE may transmit an indication of the priority or order to the TRPs, and may communicate with one or more TRPs accordingly.

As an example, a first TRP and a second TRP may each indicate respective default operating frequencies to the UE. The UE may compare the indicated default operating frequencies with the default operating frequencies of the UE, and may determine that the first TRP is associated with a default operating frequency that is relatively closer (e.g., in a frequency domain) to a default operating frequency of the UE. The UE may assign a priority to the first TRP that is higher than a priority assigned to the second TRP and, in some examples, may communicate with the first TRP based on the priority.

Additionally, or alternatively, the UE may recommend which TRPs in the multi-TRP system may provide efficient communications based on the default operating frequencies of the devices. For instance, the UE may select, based on the indicated default operating frequencies of each TRP and the default operating frequencies of the UE, two or more TRPs for joint communications. The UE may transmit an indication of the selected two or more TRPs. The two or more TRPs may coordinate with one another to perform the joint communications with the UE. For instance, the TRPs may exchange configuration information (e.g., over a backhaul link) and may determine a configuration for the joint communications. In some examples, the TRPs may perform joint beamforming with one another to communicate with the UE.

Enabling a UE to dynamically select a TRP or an associated beam based on a default operating frequency and associated priority, and to indicate recommended TRPs (e.g., for joint communications), may enable more efficient communications within the network. For example, a mismatch between the UE and a TRP's respective default operating frequencies may result in beamforming loss during communications between the two devices. However, the UE may avoid or reduce such loss by instead choosing to communicate with a TRP (e.g., a higher-priority TRP, a recommended TRP) according to the default operating frequencies of each device (e.g., as indicated by the UE). In addition, the UE may transmit an indication of the priority or a list of priorities (e.g., an ordered list), an indication of the recommended TRPs, or a combination thereof, to multiple wireless devices (e.g., base stations or TRPs) in the system, thereby establishing a network of devices that each have knowledge of the device-specific default operating frequencies utilized in the system. In addition, default operating frequencies may be antenna port, RF chain, or array-specific, where a wireless device may have one or multiple default operating frequencies in the ultra-wide bandwidth based on, for example, its antenna configuration.

In some examples, a wireless device may have a range or upper and lower bounds of default operating frequencies, which may be indicated between wireless devices and used for the determination of the TRP priority and/or selection of preferred TRPs. The upper and lower bounds may indicate the frequencies at which communications performance may be achieved in accordance with some performance threshold (e.g., based on a predetermined signal strength threshold(s) (both upper and lower thresholds) for transmissions within the bounds). The identification of TRP priority based on the one or more default operating frequencies may provide for more efficient communications between devices (e.g., between a UE and one or more TRPs), and may reduce array gain deterioration due to beam shape distortion/beam squinting. Likewise, the enhanced communications performance obtained through sharing default operating frequencies may provide for relatively increased throughput and higher reliability, thereby enhancing user experience.

Aspects of the disclosure are initially described in the context of wireless communications systems. Aspects of the disclosure are then illustrated by a process flow. Aspects of the disclosure are further illustrated by and described with reference to apparatus diagrams, system diagrams, and flowcharts that relate to techniques for TRP and beam selection in ultra-wide bandwidth systems.

FIG. 1 illustrates an example of a wireless communications system 100 that supports techniques for TRP and beam selection in ultra-wide bandwidth systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). In addition, a frequency range designation of FR4 (e.g., 52.6 GHz-114.25 GHz bands) may also be referred to as "upper millimeter wave bands," or a "sub-THz regime," or some other terminology. The frequencies between FR1 and FR2 are often referred to as mid-band frequencies. Although a portion of FR1 is greater than 6 GHz, FR1 is often referred to as (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, one or more UEs 115 and base stations 105 may communicate in an ultra-wide bandwidth (e.g., a 14 GHz bandwidth, a 25 GHz bandwidth, or some bandwidth that is greater than 3 GHz). Within the ultra-wide bandwidth, the UEs 115 and base stations 105 may communicate over a number of different channels (e.g., 2 GHz or 3 GHz channels), and the channels may be switched (e.g., dynamically) across the bandwidth. Additionally or alternatively, a base station 105 or a UE 115 may be configured (e.g., with a hardware/antenna configuration) to operate optimally at a subset of frequencies within the ultra-wide bandwidth, and may suffer reduced performance when communicating at other frequencies. As such, it may be beneficial for respective devices to operate at some default operating frequency within an ultra-wide bandwidth that enables the device to avoid beam squinting effects as well as delays caused by updating codebooks and/or beam weights for different channels within the ultra-wide bandwidth. Put another way, a device may have one or more device-specific default operating frequencies for communications in an ultra-wide bandwidth, and the communications may be optimized when operating within at least one of the device's default operating frequencies.

Additionally, a base station 105 in the wireless communications system 100 may include one or more TRPs. Each TRP may be associated with one or more antenna ports, beams, and beam indices. Thus, each TRP may also be associated with one or more default operating frequencies (e.g., according to an antenna array configuration). Accordingly, a UE 115 communicating with multiple TRPs may determine a preference for a TRP based on the TRP's default operating frequency and the default operating frequency of the UE 115. For instance, the default operating frequencies of the multiple TRPs may be provided to the UE 115, and the UE 115 may compare the default operating frequencies of each TRP against the default operating frequencies of the UE 115. The default operating frequencies may be for communications over respective portions of the bandwidth and may be based on an antenna array configuration of each TRP. The UE 115 may assign a priority to each TRP based on the default operating frequency information and may transmit an indication of the priority information to the multiple TRPs. The UE 115 may also select (e.g., based on the default operating frequencies) two or more TRPs for joint communications and may transmit an indication of the selected TRPs to the multiple TRPs. The UE 115 may communicate with one or more of the TRPs based on the priority indication, the indication of the selected TRPs, or both.

Figure 2:
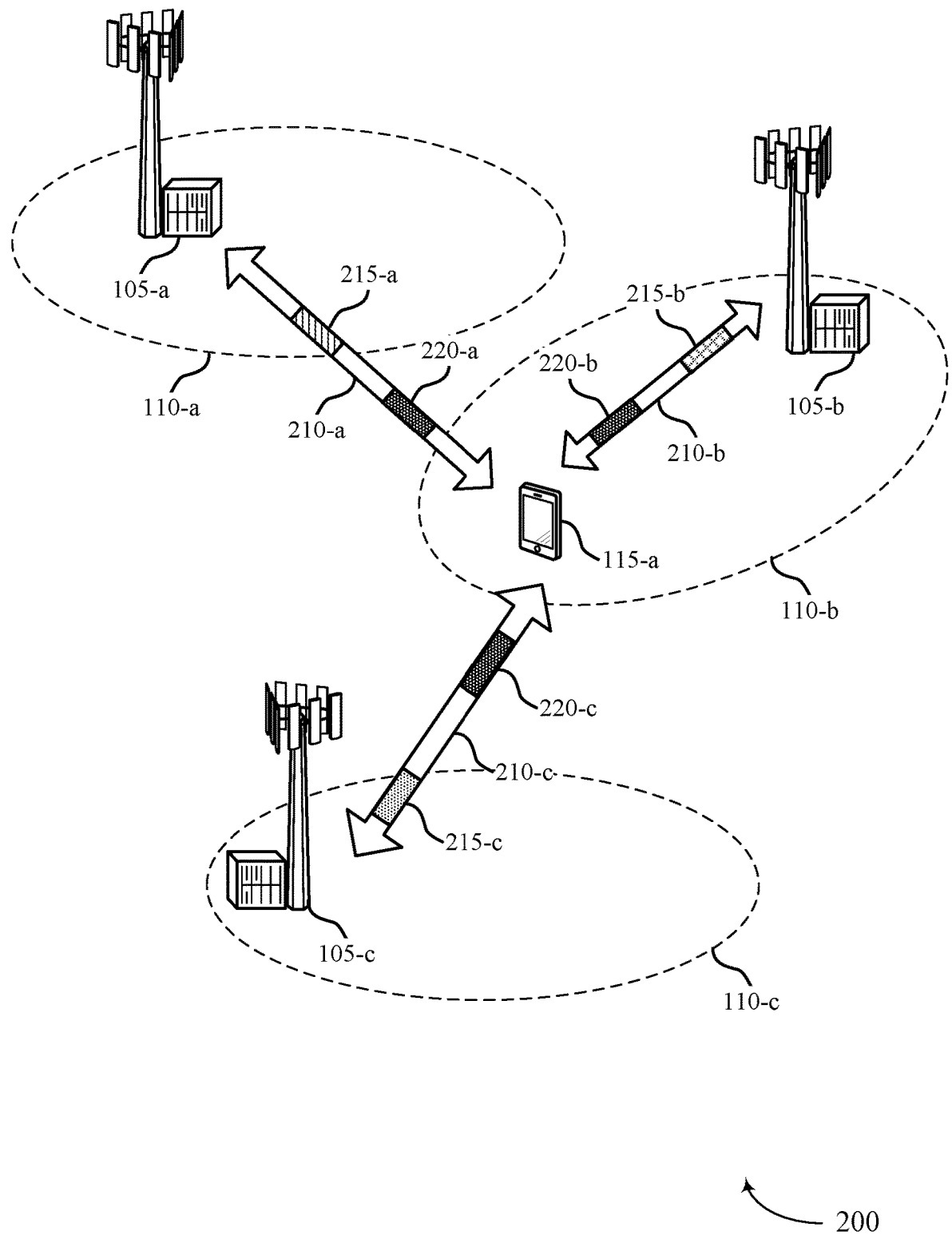

FIG. 2 illustrates an example of a wireless communications system 200 that supports techniques for TRP and beam selection in ultra-wide bandwidth systems in accordance with aspects of the present disclosure. In some examples, wireless communications system 200 may implement aspects of wireless communications system 100. For example, the wireless communications system 200 includes base stations 105-a, 105-b, and 105-c, and a UE 115-a, which may be examples of the respective devices as described with reference to FIG. 1. It is to be understood that references to specific wireless devices (e.g., UEs, TRPs, base stations) in the below figures are provided for illustrative purposes, and different wireless devices not specifically referred to herein may be used interchangeably with those described herein. Likewise, the described operations performed by a UE 115 may, in some cases, be performed by a base station 105 (or TRP), and vice versa. In some examples, multiple TRPs may each be a standalone TRPs or may be part of one base station 105 or different base stations 105. Additionally or alternatively, the base stations 105 or TRPs may be a component of or an example of an IAB node, a repeater node (e.g., configured with some retransmission capability), or the like. Further, the UE 115-a may be an example of a customer premises equipment (CPE), a sidelink node, a repeater node, or the like.

The base stations 105-a, 105-b, and 105-c may each provide coverage areas 110-a, 110-b, and 110-c, respectively. Additionally, each base station 105 may communicate with the UE 115-a over a communication link 210. For example, the base station 105-a may communicate over a communication link 210-a, the base station 105-b may communicate with the UE 115-a over a communication link 210-b, and the base station 105-c may communicate with the UE 115-a over a communication link 210-c. In some examples, the base stations 105 and the UE 115-a may communicate over an ultra-wide bandwidth (e.g., 14 GHz, 25 GHz), where scheduled communications may be transmitted and received within various portions of the ultra-wide bandwidth (e.g., 2 GHz or 3 GHz portions of the ultra-wide bandwidth). Each base station 105 and the UE 115-a may be configured (e.g., with hardware) to perform beamforming with a limited number of RF chains over an antenna array, which may include a fixed inter-antenna element spacing for operation at a default operating frequency.

In some examples, each base station 105 may include one or more TRPs, and each TRP may be associated with one or more antenna ports. In such examples, each TRP may be associated with one or more default operating frequencies. Additionally, in some examples, each antenna port may correspond to a default operating frequency. In such examples, a beam and corresponding beam index associated with the antenna port may also be associated with the default operating frequency. Each frequency of the one or more default operating frequencies of each device may be for communications over respective portions of the bandwidth, and may be associated with an analog beamforming codebook of the respective device. For instance, the default operating frequencies may be associated with one or more carrier frequencies corresponding to the analog beamforming codebook. Additionally or alternatively, the one or more default operating frequencies may be associated with a frequency band from a set of frequency bands or a channel from a set of channels.

In some cases, a TRP may include one or more antenna arrays or antenna panels, which may be combined to form larger antenna arrays for wireless communications or operate separately. Respective one or more antenna ports may be associated with each of the antenna arrays. In one example, a TRP may have four antenna panels working in unison or separately, where two antenna panels may be used for directional beamforming in a first direction, and another two antenna panels may be used for directional beamforming in a second, different direction. Additionally or alternatively, all four antenna panels may be used for directional beamforming in the same direction. Accordingly, the antenna panels of a TRP may enable various communications schemes, such as SU-MIMO and MU-MIMO. In addition, based on the configuration of each antenna panel of a TRP (or at the UE 115-a), respective antenna panels may be associated with a default operating frequency, and the corresponding antenna ports may similarly be associated with the default operating frequency.

Additionally, the one or more default operating frequencies may be associated with an antenna array configuration of the respective device. The antenna array configuration may include an inter-antenna element spacing of an antenna array or antenna panel, which may have uniformly-spaced antenna elements or non-uniformly spaced antenna elements. In the case of non-uniformly spaced antenna elements, the inter-antenna element spacing could be the average inter-antenna element spacing across the array. The inter-antenna element spacing may be in azimuth, in elevation, or both. Each default operating frequency of the one or more default operating frequencies for the device may include a frequency such that approximately half of a wavelength corresponding to the frequency may be equal to a spacing between two or more antenna elements of the antenna array of the respective device. More specifically, a default operating frequency of a device (e.g., UE 115, base station 105, TRP, etc.) may have some wavelength, $\lambda$, and the spacing of the device's antenna elements (e.g., within an antenna panel of one or more antenna panels) may be approximately equal to $\lambda/2$. Further, the inter-antenna element spacing may have some threshold or tolerance (e.g., $\lambda/2 \pm$ some appropriately chosen small value relative to $\lambda/2$ to account for process variations in printed circuit board design and fabrication) associated with the default operating frequency, such that the inter-antenna element spacing may be different from $\lambda/2$, but may still correspond to the default operating frequency for a particular device. That is, the spacing between two or more antenna elements may be within an upper threshold and a lower threshold, such that the thresholds are associated with substantially half of the wavelength of the frequency. It is also noted that a default operating frequency may correspond to one or more respective frequencies (or range of frequencies) that may provide for communications performance in accordance with some performance metrics or specifications, where the one or more default operating frequencies may be specific to the device (e.g., based on the device's hardware configuration for communicating over ultra-wide bandwidths). Further, a default operating frequency may, in some cases, be antenna port or RF chain-specific, such that multiple default operating frequencies may be possible at a particular wireless device.

In the wireless communications system 200, the base stations 105 (e.g., or one or more TRPs associated with the base stations 105) may coordinate to perform joint communications with the UE 115-a. For example, a TRP associated with the base station 105-a may coordinate with a TRP associated with the base station 105-b. The TRPs may exchange (e.g., over a backhaul link) configuration information for a configuration for communicating data with the UE 115-a according to the joint communications. To facilitate more efficient communications between the base stations 105 (e.g., and/or the TRPs associated with each base station 105) and the UE 115-a, each device may identify one or more default operating frequencies and may transmit an indication of the default operating frequencies to one or both of the other devices in the wireless communications system 200. Thus, a device in the wireless communications system 200 may consider the default operating frequency information of another device, and may adjust or modify communications parameters to reduce performance loss.

For example, a TRP associated with the base station 105-a may identify one or more default operating frequencies associated with the TRP and may transmit an indication of the default operating frequencies 215-a to the UE 115-a. Similarly, a TRP associated with the base station 105-b and a TRP associated with the base station 105-c may each identify one or more respective default operating frequencies and may transmit the default operating frequency information via default operating frequency indications 215-b and 215-c, respectively. In some examples, the default operating frequencies may correspond to one or more antenna ports and one or more beams associated with the respective TRPs. Each frequency of the one or more default operating frequencies of each device may be for communications over respective portions of the bandwidth, and may be associated with an analog beamforming codebook of the respective device. For instance, the default operating frequencies may be associated with one or more carrier frequencies corresponding to the analog beamforming codebook. Additionally or alternatively, the one or more default operating frequencies may be associated with a frequency band from a set of frequency bands or a channel from a set of channels.

In some cases, identifying the one or more default operating frequencies may include identifying a range of default operating frequencies or one or more frequency boundaries, such as a first (e.g., an upper) frequency boundary and/or a second (e.g., a lower) frequency boundary (e.g., such that the first frequency boundary is different from the second frequency boundary). One or more frequencies within the boundaries may provide beamforming performance that satisfies a threshold, such as a performance threshold (e.g., based on a signal strength threshold for communications over each frequency). In such cases, the default operating frequency indications 215 may include indications of the first frequency boundary, the second frequency boundary, or both. More generally, the default operating frequency indications 215 may provide another device with the operating frequencies that enable efficient communications (e.g., in FR4 or other RF domains). As an example, the TRP associated with the base station 105-a may transmit, to the UE 115-a, a default operating frequency indication 215-a that includes an indication of an upper frequency boundary (e.g., 65 GHz) and a lower frequency boundary (e.g., 63 GHz).

The UE 115-a may thus receive default operating frequency indications 215 from a plurality of TRPs and may use the indications to identify one or more default operating frequencies for each TRP. In some cases, the UE 115-a may use the default operating frequency indications 215 to identify a configuration of one or more antenna ports. The UE 115-a may then analyze default operating frequencies and determine an associated communications performance. For example, the UE 115-a may compare each indicated default operating frequency for each TRP with one or more default operating frequencies of the UE 115-*a*. The UE 115-*a* may, in some cases, estimate array gain losses for transmissions over antenna ports of the UE 115-*a* and antenna ports of each TRP, and may use the estimation in the comparison.

The UE 115-*a* may select, from the plurality of TRPs, two or more TRPs for joint communications. The selection may be performed based on the default operating frequencies of each TRP and the default operating frequencies of the UE 115-*a* (e.g., based on the comparison of the default operating frequencies, or the estimation of the array gain losses, or some other parameter). The selected TRPs may be those that the UE 115-*a* determines may provide the most efficient communications. For example, the UE 15-*a* may determine that a first TRP (e.g., associated with the base station 105-*a*) has a default operating frequency that is also supported by the UE 115-*a* (e.g., according to a configuration of antenna ports of the UE 115-*a*). The default operating frequency of the first TRP may be close (e.g., in a frequency domain) to one or more default operating frequencies of the UE 115-*a*. The UE 115-*a* may also select a second TRP (e.g., associated with the base station 105-*c*) that has a default operating frequency that is supported by the UE 115-*a*. Accordingly, by determining to communicate with one or more TRPs that each have an operating frequency that corresponds to a default operating frequency of the UE 115-*a*, the UE 115-*a* and the TRPs may avoid performance loss or deterioration associated with communicating over mismatched default operating frequencies.

The UE 115-*a* may transmit an indication of the selected two or more TRPs to the plurality of TRPs. In the example of FIG. 2, the UE 115-*a* may have selected a first TRP associated with the base station 105-*a* and a second TRP associated with the base station 105-*c* based on the respective default operating frequencies. The UE 115-*a* may then transmit an indication of the selected TRPs via a selected TRP indication 220. For example, the UE 115-*a* may transmit a selected TRP indication 220-*a* to the base station 105-*a*, an indication 220-*b* to the base station 105-*b*, and an indication 220-*c* to the base station 105-*c*. In some examples, the UE 115-*a* may also identify a TRP hopping pattern for communications between the selected TRPs. In such examples, the indications 220 may include an indication of the TRP hopping pattern.

The default operating frequency indications 215 and the selected TRP indications 220 may be transmitted via capability signaling (e.g., via RRC signaling). In other examples, the default operating frequencies may be dynamically indicated (e.g., using DCI, SCI, or the like), or may be transmitted semi-statically (e.g., during one or more time intervals). In such examples, the indications 215 and 220 may be transmitted based on changes in interference measured at a default operating frequency. As an example, communications performance at a first default operating frequency may change (e.g., degrade), and the UE 115-*a* or a base station 105 (e.g., or an associated TRP) may select a second, different default operating frequency to communicate with, where the second default operating frequency may be dynamically signaled between the devices. Additionally or alternatively, the UE 115-*a* may update or modify the selected TRPs according to a change in default operating frequencies and may dynamically signal the updated selected TRP indication to the TRPs.

In some examples, the default operating frequencies may be indicated based on a trigger identified by the device. For example, the base station 105-*a* may identify a trigger, such as a startup event or an activation or restarting of the base station 105-*a*, and may transmit a default operating frequency indication 215-*a* of the base station 105-*a* to the UE 115-*a*. The base station 105-*b* and/or the base station 105-*c* may also transmit a default operating frequency indication 215 of the base station 105 to the UE 115-*a* in a similar manner (e.g., according to a trigger identified at the respective base station). Additionally or alternatively, the base stations 105 may exchange default operating frequency information dynamically, regularly (e.g., the trigger may be one or more time periods of a predetermined schedule), or semi-persistently (e.g., the trigger may be one or more time periods of a semi-persistent schedule). In some examples, the base stations 105 may indicate default operating frequencies to one another (e.g., based on identifying a configuration of a protocol for exchanging default operating frequencies).

Based on the default operating frequency indications 215 and the selected TRP indications 220, the selected TRPs may coordinate to perform joint communications with the UE 115-*a*. For instance, the selected TRPs may each determine a configuration for communicating data with the UE 115-*a* based on the default operating frequencies. In some examples, the TRPs may exchange configuration information (e.g., over a backhaul link) and may determine the configuration accordingly. In some examples, the selected TRPs and the UE 115-*a* may perform joint beamforming between the UE 115-*a* and each TRP. In cases where the UE 115-*a* identified and indicated a TRP hopping pattern, the TRPs may communicate with the UE 115-*a* according to the hopping pattern. In any case, the TRPs may communicate using joint communications with the UE 115-*a* according to the respective default operating frequencies of each device, which may increase reliability and efficiency in the wireless communications system 200.

In some examples, a TRP of the selected TRPs and the UE 115 may modify one or more communications parameters based on the one or more default operating frequencies of the UE 115, the TRP, or both. For instance, the TRP may determine, based on the one or more default operating frequencies, that a communications performance threshold may not be satisfied, and may request that the UE 115-*a* increases a transmission power (e.g., to account for the performance degradation). Other communications parameters may include, but are not limited to, transmission power of the TRP, a modulation and coding scheme (MCS), beamforming parameters of an analog beamforming codebook associated with an antenna array of the UE 115-*a*, or the like. In some examples, the TRP may communicate with the other selected TRP(s) to perform such modifications. In any case, the selected TRPs and the UE 115-*a* may communicate over the ultra-wide bandwidth according to the default operating frequencies.

Figure 3A:
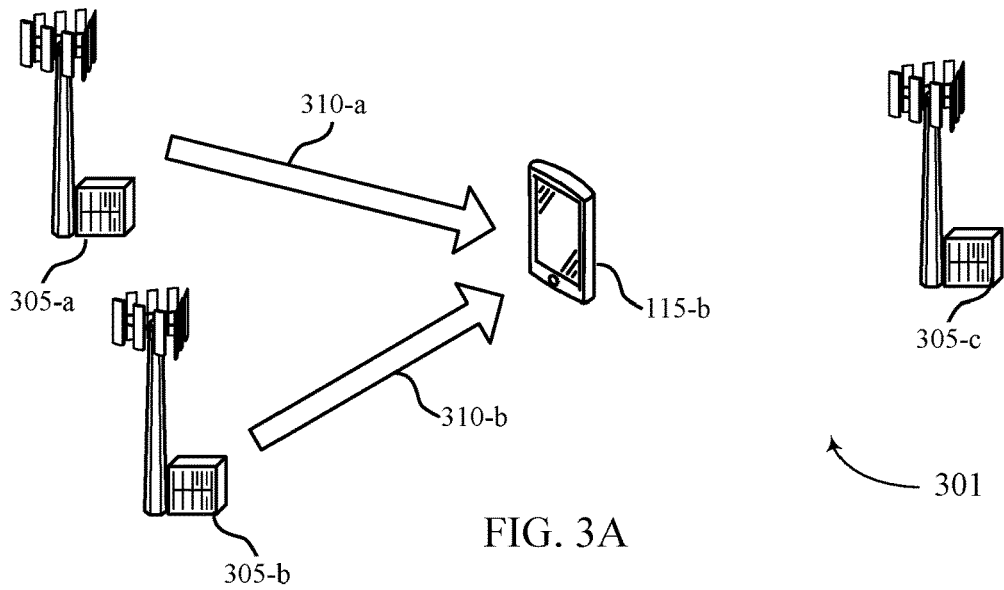
FIGS. 3A, 3B, and 3C illustrate examples of wireless communications systems that support techniques for TRP and beam selection in ultra-wide bandwidth systems in accordance with aspects of the present disclosure.
Figure 3B:
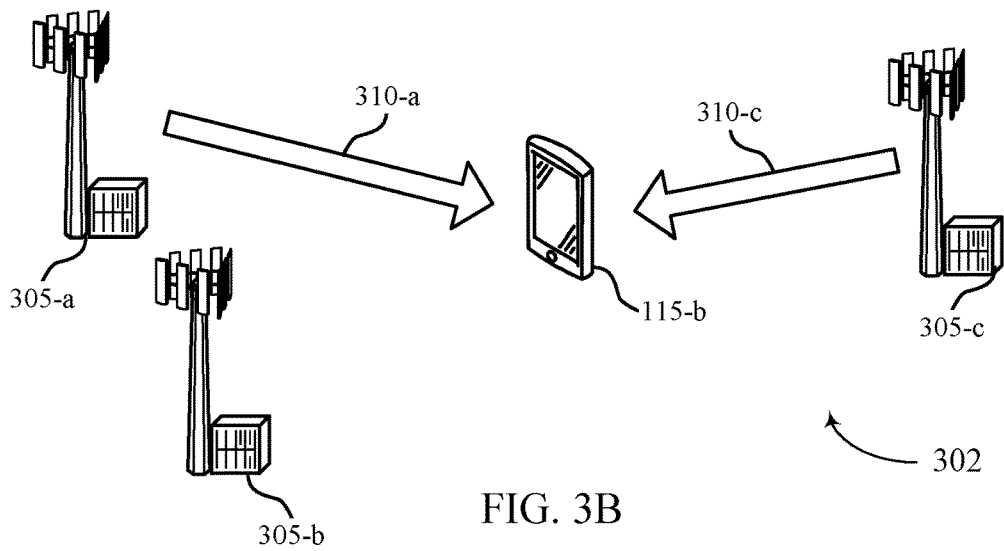
Figure 3C:
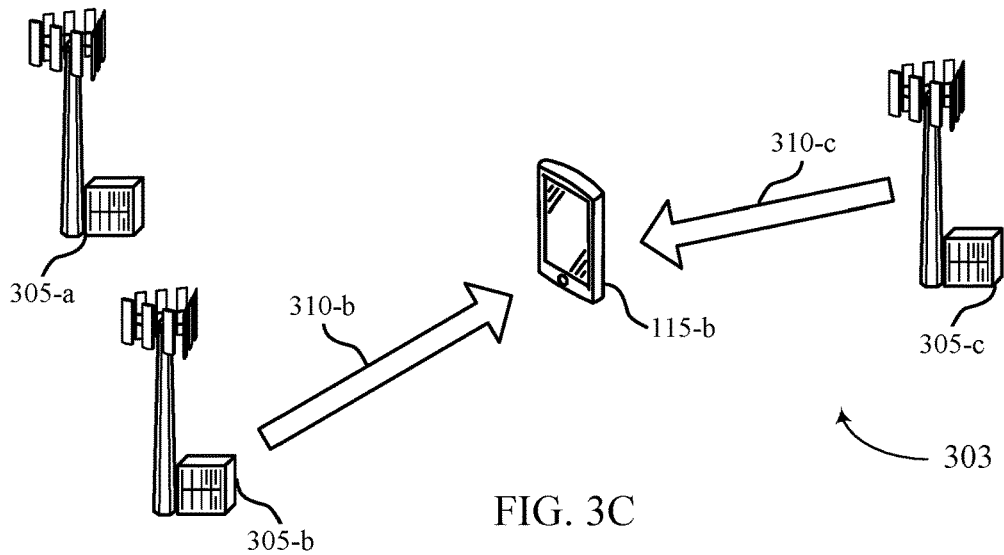

FIGS. 3A through 3C illustrate an example of wireless communications systems 301 through 303 that support techniques for TRP and beam selection in ultra-wide bandwidth systems in accordance with aspects of the present disclosure. For example, the wireless communications systems 301, 302, and 303 include UEs 115 and base stations 305, which may be examples of the respective devices as described with reference to FIGS. 1 and 2. It is to be understood that references to specific wireless devices (e.g., UEs, TRPs, base stations) in the below figures are provided for illustrative purposes, and different wireless devices not specifically referred to herein may be used interchangeably with those described herein. Likewise, the described operations performed by a UE 115 may, in some cases, be performed by a base station 105, and vice versa. In some examples, the base stations 305 may be examples of, or include, one or more TRPs. Additionally or alternatively, the base stations 305 may each be an example of an IAB node, a repeater node (e.g., configured with some retransmission capability), or the like. Further, the UE 115-*b* may be an example of a CPE, a sidelink node, a repeater node, or the like.

FIGS. 3A through 3C illustrate a multi-TRP system including a base station 305-*a*, a base station 305-*b*, and a base station 305-*c*, as well as a UE 115-*b*, such that two or more base stations 305 may communicate with the UE 115-*b* using joint communications (e.g., joint beamforming). Each base station 305 may thus communicate with the UE 115-*b* over a corresponding communication link 310. For instance, base station 305-*a* may communicate with the UE 115-*b* via communication link 310-*a*, base station 305-*b* may communicate with the UE 115-*b* via communication link 310-*b*, and base station 305-*c* may communicate with the UE 115-*b* via communication link 310-*c*.

In some examples, the base stations 305 and the UEs 115 may communicate over an ultra-wide bandwidth (e.g., 14 GHz, 25 GHz), where scheduled communications may be transmitted and received within various portions of the ultra-wide bandwidth (e.g., 2 GHz or 3 GHz portions of the ultra-wide bandwidth). Each base station 305 and UE 115 may be configured (e.g., with hardware) to perform beamforming with a limited number of RF chains over an antenna array, which may include a fixed inter-antenna element spacing for operation at a default operating frequency. Additionally, each base station 305 may include or may be associated with one or more TRPs, and each TRP may be associated with one or more default operating frequencies. For instance, in FIGS. 3A through 3C, the base station 305-*a* may be associated with a TRP that has default operating frequencies of 57 GHz and 71 GHz, the base station 305-*b* may be associated with a TRP that has default operating frequencies of 64 GHz and 57 GHz, and the base station 305-*c* may be associated with a TRP that has default operating frequencies of 64 GHz and 71 GHz.

In FIGS. 3A through 3C, the UE 115-*b* may receive indications of the one or more respective default operating frequencies associated with the TRPs and, as described herein, may determine which TRPs of the plurality of TRPs should be selected to perform joint communications. In addition, the UE 115-*b* in FIGS. 3A through 3C may be the same UE 115 having a same antenna array configuration (and a same set of one or more default operating frequencies). Alternatively, each UE 115-*b* in FIGS. 3A through 3C may be a different UE 115 having different antenna array configurations (and different default operating frequencies).

For example, in FIG. 3A, the UE 115-*b* may have a default operating frequency of 57 GHz. A TRP associated with the base station 305-*a* may have a first communication link (e.g., communication link 310-*a*) associated with a default operating frequency of 57 GHz and a second communication link associated with a default operating frequency of 71 GHz. Similarly, a TRP associated with the base station 305-*b* may have a first communication link (e.g., communication link 310-*b*) associated with a default operating frequency of 57 GHz and a second communication link associated with a default operating frequency of 64 GHz. A TRP associated with the base station 305-*c* may have a first communication link (e.g., communication link 310-*c*) associated with a default operating frequency of 64 GHz and a second communication link associated with a default operating frequency of 71 GHz. Each TRP may indicate its associated default operating frequencies to the UE 115-*b*, and the UE 115-*b* may determine which TRPs and/or communication links may correspond to one or more default operating frequencies of the UE 115-*b*.

According to the techniques described herein, the UE 115-*b* may determine that a first TRP associated with the base station 305-*a* and a second TRP associated with the base station 305-*b* each have one or more default operating frequencies that correspond to one or more default operating frequencies of the UE 115-*b*, and may select the first and second TRPs for joint communications. For example, because the UE 115-*b* in FIG. 3A has a default operating frequency of 57 GHz, the UE 115-*b* may select the TRPs associated with the base stations 305-*a* and 305-*b* that are able to communicate (e.g., via communication links 310-*a* and 310-*b*, respectively) based on the default operating frequency of 57 GHz. The UE 115-*b* may transmit an indication of the selected TRPs to each base station (e.g., base stations 305-*a*, 305-*b*, and 305-*c*) in the wireless communications system 301. It is noted that the default operating frequencies described are provided for illustrative purposes only. As such, these and other default operating frequencies may be possible and should not be considered limiting.

Accordingly, the selected TRPs associated with the base stations 305-*a* and 305-*b* may coordinate to perform joint communications with the UE 115-*b* based on the indication and the default operating frequencies. For instance, the TRPs may communicate (e.g., via a backhaul link) configuration information with one another and each TRP may select a configuration for the joint communications. In some examples, the joint communications may include joint beamforming operations. Each TRP may thus communicate (e.g., communicate data) with the UE 115-*b* based on the respective default operating frequencies. As illustrated in FIG. 3A, the TRPs associated with the base station 305-*a* and the base station 305-*b* may communicate with the UE 115-*b* using communication links 310-*a* and 310-*b*, respectively.

In FIG. 3B, the UE 115-*b* may instead have a default operating frequency of 71 GHz. Accordingly, the UE 115-*b* may determine to communicate with the TRPs associated with the base stations 305-*a* and 305-*c* (e.g., because those TRPs are also associated with a default operating frequency of 71 GHz). Thus, the TRP associated with the base station 350-*a* and the TRP associated with the base station 305-*c* may coordinate to perform joint communications with the UE 115-*b*, and may each communicate over the respective communication links 310-*a* and 310-*c*.

In FIG. 3C, the UE 115-*b* may instead have a default operating frequency of 64 GHz. Accordingly, the UE 115-*b* may determine to communicate with the TRPs associated with the base stations 305-*b* and 305-*c* (e.g., because those TRPs are also associated with a default operating frequency of 64 GHz). Thus, the TRP associated with the base station 350-*b* and the TRP associated with the base station 305-*c* may coordinate to perform joint communications with the UE 115-*b*, and may each communicate over the respective communication links 310-*b* and 310-*c*.

Figure 4A:
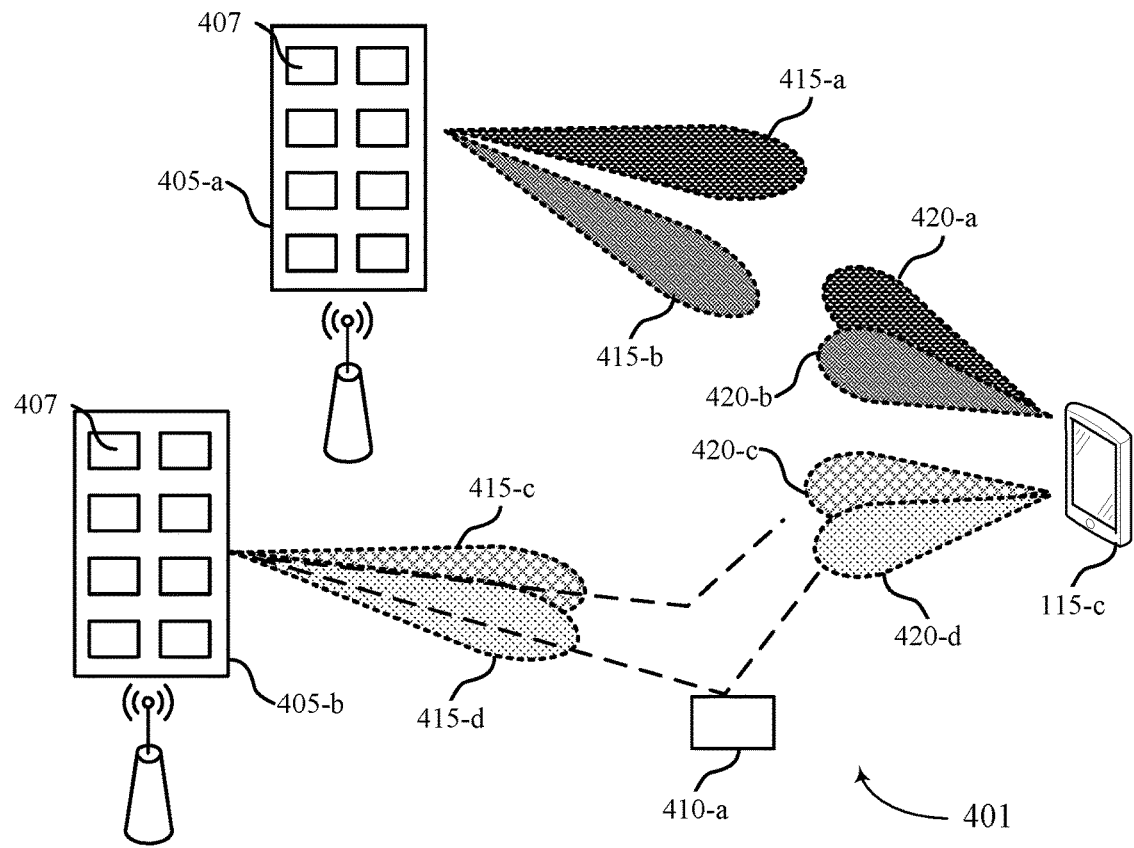
FIGS. 4A and 4B illustrate examples of wireless communications systems that support techniques for TRP and beam selection in ultra-wide bandwidth systems in accordance with aspects of the present disclosure.
Figure 4B:
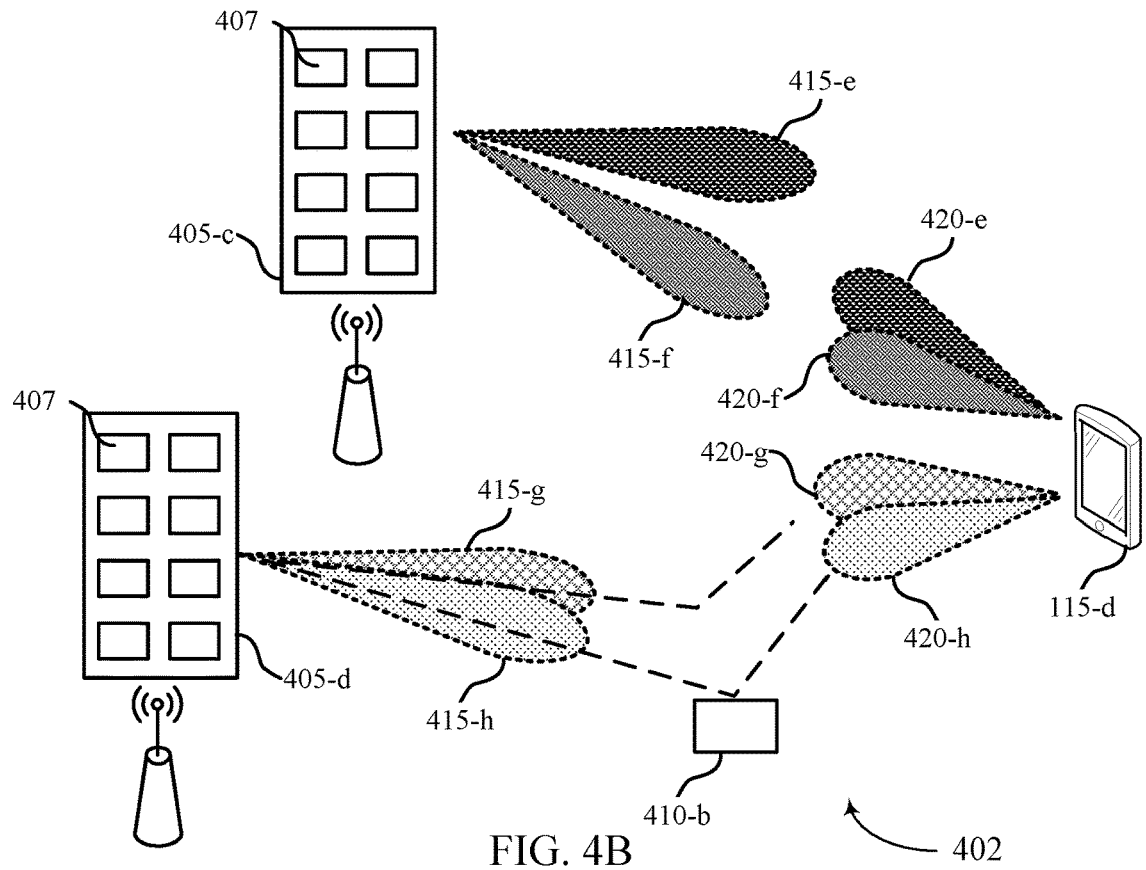

FIGS. 4A and 4B illustrate examples of wireless communications systems 401 and 402 that support techniques for TRP and beam selection in ultra-wide bandwidth systems in accordance with aspects of the present disclosure. In some examples, the wireless communications systems 401 and 402 may implement aspects of wireless communications systems 100, 200, or 300. For example, the wireless communications systems 401 and 402 include UEs 115 and TRPs 405, which may be examples of the respective devices as described with reference to FIGS. 1-3. It is to be understood that references to specific wireless devices (e.g., UEs, TRPs, base stations) in the below figures are provided for illustrative purposes, and different wireless devices not specifically referred to herein may be used interchangeably with those described herein. Likewise, the described operations performed by a UE 115 may, in some cases, be performed by a base station 105 (or TRP 405), and vice versa. In some examples, multiple TRPs 405 (e.g., a TRP 405-a, TRP 405-b, TRP 405-c, and/or TRP 405-d) may each be a standalone TRPs or may be part of one base station (e.g., a base station 105) or different base stations. Additionally or alternatively, the TRPs 405-a and 405-b may be a component of or an example of an IAB node, a repeater node (e.g., configured with some retransmission capability), or the like. Further, the UE 115-c may be an example of a CPE, a sidelink node, a repeater node, or the like.

In some examples, the TRPs 405 and the UEs 115 may communicate over an ultra-wide bandwidth (e.g., 14 GHz, 25 GHz), where scheduled communications may be transmitted and received within various portions of the ultra-wide bandwidth (e.g., 2 GHz or 3 GHz portions of the ultra-wide bandwidth). Each TRP 405 and UE 115 may be configured (e.g., with hardware) to perform beamforming with a number of RF chains over an antenna array, which may include an inter-antenna element spacing for operation at a default operating frequency. In some cases, a TRP 405 may include one or more antenna arrays or antenna panels, which may be combined to form larger antenna arrays for wireless communications or operate separately. Respective one or more antenna ports may be associated with each of the antenna arrays.

Communications over the ultra-wide bandwidth may include directional beams formed by each device, where the beams may be formed by beamforming weights based on codebooks (e.g., precoding codebooks). In some examples, each of the directional beams (e.g., beams 415) may be transmitted directly between devices (e.g., in line-of-sight scenarios), or may also be reflected off other objects or a reflector 410 (e.g., reflector 410-a or reflector 410-b), such as in non-line-of-sight scenarios.

In FIG. 4A, wireless communications system 401 may include a TRP 405-a and a TRP 405-b. Each TRP 405 may include an antenna array associated with one or more antenna ports. As illustrated, TRP 405-a includes a 2×4 antenna array associated with antenna ports (e.g., an array with two columns of antenna elements 407 and four rows of antenna elements 407). TRP 405-b includes a 2×4 antenna array associated with antenna ports. However, the TRPs 405 may include arrays of different sizes with a different number or arrangement of antenna elements 407. The TRPs 405 may transmit and receive signals to and from the UE 115-c using beams 415. Likewise, the UE 115-c may transmit and receive signals to and from the TRPs 405 using beams 420. For instance, the TRP 405-a may use beams 415-a and 415-b to communicate with the UE 115-c, and the UE 115-c may use corresponding beams 420-a and 420-b to communicate with the TRP 405-a. The TRP 405-b may use beams 415-c and 415-d to communicate with the UE 115-c, and the UE 115-c may use corresponding beams 420-c and 420-d to communicate with the TRP 405-b. Each beam 415 may be associated with an antenna port of the corresponding TRP and a beam index.

Thus, each TRP 405 and the UE 115-c may be associated with one or more default operating frequencies. In such examples, a beam (e.g., a beam 415) and corresponding beam index associated with some antenna port may also be associated with the default operating frequency. Each frequency of the one or more default operating frequencies of each device may be for communications over respective portions (e.g., channels) of the ultra-wide bandwidth, and may be associated with an analog beamforming codebook of the respective device. For instance, the default operating frequencies may be associated with one or more carrier frequencies corresponding to the analog beamforming codebook. Additionally or alternatively, the one or more default operating frequencies may be associated with a frequency band from a set of frequency bands or a channel from a set of channels.

To facilitate more efficient communications among multiple TRPs and UEs in a multi-TRP system such as wireless communications system 401 illustrated in FIG. 4A, a TRP 405 may identify and transmit an indication of the one or more default operating frequencies to the UE 115-c. For instance, TRP 405-a may indicate, to the UE 115-c, one or more default operating frequencies associated with the TRP 405-a. In some examples, the default operating frequencies may correspond to respective antenna ports and one or more beams, such as beams 415-a and 415-b. The TRP 405-b may also indicate, to the UE 115-c, one or more default operating frequencies (e.g., associated with the TRP 405-b, which may indicate one or more ports of the TRP 405-b, one or more beams 415 such as beams 415-c and 415-d, or some combination thereof). The UE 115-c may receive the default operating frequency indications and may use the default operating frequency information to determine a preferred beam and/or TRP with which to communicate over the bandwidth.

In some cases, the one or more default operating frequencies may include a range of default operating frequencies or one or more frequency boundaries, such as a first (e.g., an upper) frequency boundary and/or a second (e.g., a lower) frequency boundary (e.g., such that the first frequency boundary is different from the second frequency boundary). One or more frequencies within the boundaries may provide beamforming performance that satisfies a threshold, such as a performance threshold (e.g., based on a signal strength threshold for communications over each frequency). In such cases, the default operating frequency indications may include indications of the first frequency boundary, the second frequency boundary, or both. More generally, the default operating frequency indications may provide another device with the operating frequencies that enable efficient communications (e.g., in FR4 or other RF domains). As an example, the TRP 405-a may transmit, to the UE 115-c, a default operating frequency indication that includes an indication of an upper frequency boundary (e.g., 65 GHz) and a lower frequency boundary (e.g., 63 GHz).

The UE 115-c may use the default operating frequency indications to analyze communications performance between the TRPs 405-a and 405-b and the UE 115-c, and may assign a priority or preference to each TRP 405, antenna port, and beam 415 accordingly. For example, the UE 115-c may compare the respective default operating frequencies for each TRP 405 with one or more default operating frequencies of the UE 115-c. The UE 115-c may, in some cases, estimate array gain losses for transmissions over antenna ports of the UE 115-c and the antenna ports of each TRP 405 and may use the estimation in the comparison. In some examples, the UE 115-c may determine that a particular antenna port and corresponding beam 415 (e.g., with an associated beam index) of a TRP 405 may be associated with a default operating frequency that provides optimal communications performance (e.g., based on a comparison with the default operating frequencies of the UE 115-c), and may assign the antenna port, beam 415, and TRP 405 a higher priority than other antenna ports, beams 415, and TRP 405. In some examples, the UE 115-c may generate a list or table that provides the priorities of TRPs, antenna ports, and beams based on received default operating frequency information. As an example, the UE 115-c may generate a table, as illustrated by Table 1:

TABLE 1

| Priority | Information |
|---|---|
| 1st best | $TRP_2$, $Port_0$, Beam index X |
| 2nd best | $TRP_2$, $Port_1$, Beam index Y |
| 3rd best | $TRP_1$, $Port_0$, Beam index Z |
| 4th best | $TRP_1$, $Port_1$, Beam index W |
| . . . | . . . |

As shown in Table 1, the UE 115-c may indicate a ranked or ordered list of TRPs 405, which may be indicated by an identifier for each TRP 405. In addition, the UE 115-c may indicate an antenna port of the corresponding TRP 405 (e.g., indicated by an identifier for the antenna port). Further, the UE 115-c may indicate a beam of the TRP 405, indicated by some corresponding beam index. The priority information provided by the UE 115-c (such as using Table 1) may be associated with beamforming in ultra-wide bandwidths, and the UE 115-c may use default operating frequency information (for one or more TRPs 405 and the UE 115-c) when determining the priority of the TRP 405, antenna port, and beam index. In some examples, the priority of the TRP 405, antenna port, or beam index may be based on a determination of array gain loss over the ultra-wide bandwidth transmissions, where estimated performance for an antenna port at the UE 115-c for transmissions from an antenna port of the TRP 405 may be used in determining port-specific array gain losses and/or performance.

In some examples, the TRP 405-a and TRP 405-b may each transmit an indication of one or more default operating frequencies for communications with the UE 115-c over different portions of a bandwidth. The UE 115-c may identify, from the default operating frequency indications, an antenna port associated with a TRP (e.g., TRP 405-a) and a first default operating frequency, as well as a beam index of a beam 415 (e.g., beam 415-a) associated with the antenna port and the first default operating frequency. The UE 115-c may determine a priority for the antenna port, the beam 415-a, and the TRP 405-a based on the first default operating frequency and its correspondence with one or more default operating frequencies of the UE 115-c. The UE 115-c may similarly determine a priority for other antenna ports and beams 415, and the TRP 405-a and TRP 405-b, in the wireless communications system 401. For instance, the UE 115-c may identify, from the default operating frequency indications, another antenna port associated with the TRP 405-a and a corresponding second default operating frequency, as well as a beam index of a beam 415 (e.g., beam 415-b) associated with the antenna port and the second default operating frequency. In some examples, the first default operating frequency may be the same as the first default operating frequency. In other examples, the first default operating frequency may be different form the first default operating frequency. The UE 115-c may also identify a third default operating frequency and a fourth default operating frequency of TRP 405-b, where the third default operating frequency may be associated with some antenna port (and corresponding beam) of the TRP 405-b, and the fourth default operating frequency may be associated with another antenna port of the TRP 405-b. The third default operating frequency and the fourth default operating frequency may be the same or different.

In the example of FIG. 4A, the UE 115-c may determine that the TRP 405-a and corresponding beam 415-b have the highest priority, as the beam 415-b (and thus the TRP 405-a) may be associated with a default operating frequency that is close (e.g., in the frequency domain) to the default operating frequency of the UE 115-c. For instance, both the UE 115-c and the beam 415-b may be associated with a default operating frequency of 64 GHz, while the beam 415-d may be associated with a default operating frequency of 57 GHz, the beam 415-c may be associated with a default operating frequency of 71 GHz, and the beam 415-a may be associated with a default operating frequency of 64 GHz. The UE 115-c may prefer the beam 415-b for communications with the TRP 405-a, which may be based on communications performance provided by the beam 415-b, as well as the associated default operating frequency of the beam 415-b and corresponding antenna port and the default operating frequency of the UE 115-c. The UE 115-c may transmit an indication of the priority to the TRPs 405-a and 405-b, and the UE 115-c and the TRPs 405-a may communicate according to the priority. For example, the UE 115-c may complete procedures to attach to and communicate with the TRP 405-a using the indicated beam 415. In some cases, a highest-priority TRP 405, antenna port, and beam may not be available, but the prioritized list may provide for additional options and preferences of the UE 115-c, and so a next-highest priority TRP 405, antenna port, and/or beam 415 may be used for communications with the network.

In some examples, a TRP 405 and a UE 115 may modify one or more communications parameters based on the one or more default operating frequencies of the UE 115, the TRP 405, or both. For instance, the TRP 405-a may determine, based on the one or more default operating frequencies, that a communications performance threshold may not be satisfied, and may request that the UE 115-c increases a transmission power (e.g., to account for the performance degradation). Other communications parameters may include, but are not limited to, transmission power of the TRP 405-a, a modulation and coding scheme (MCS), beamforming parameters of an analog beamforming codebook associated with an antenna array of the UE 115-c, or the like. In any case, the TRP 405-a and the UE 115-c may communicate over the ultra-wide bandwidth using the preferred beam 415-b according to the default operating frequencies.

The default operating frequency indications, the priority indications, or both, may be transmitted via capability signaling (e.g., via RRC signaling). In other examples, the default operating frequencies or priority indications may be dynamically indicated (e.g., using DCI, SCI, or the like), which may be based on changes in interference measured at a default operating frequency. As an example, communications performance at a first default operating frequency may change (e.g., degrade), and the UE 115-c may select a second, different default operating frequency to communicate with, where the second default operating frequency may be dynamically signaled between the devices. Additionally or alternatively, the UE 115-c may rearrange or reassign a priority for the beams 415, antenna ports, and TRPs 405 based on the second default operating frequency.

The UE 115-d and the TRPs 405-c and 405-d illustrated in FIG. 4B may perform a similar TRP and beam selection process based on default operating frequencies as described in FIG. 4A. For example, TRP 405-c may transmit a default operating frequency indication to the UE 115-*d*, which may include default operating frequency information for one or more associated antenna ports, beams 415-*e* and 415-*f*, and associated beam indices. TRP 405-*d* may transmit, to the UE 115-*d*, a default operating frequency indication including default operating frequency information for one or more associated antenna ports, beams 415-*g* and 415-*h*, and associated beam indices. The UE 115-*d* may determine, based on the default operating frequency information, a priority order for the TRPs 405, antenna ports, and beams 415.

For example, the UE 115-*d* may determine that TRP 405-*d*, an antenna port, and beam 415-*h* are associated with a highest priority. Beam 415-*g* (e.g., associated with TRP 405-*d* and an antenna port) may have a second-highest priority, followed (e.g., in descending order) by TRP 405-*c*, another antenna port, and beam 415-*f*, or an antenna port and beam 415-*e*. In the example of FIG. 4B, the UE 115-*d* may transmit, to the TRPs 405-*c* and 405-*d*, an indication of the priorities as an ordered list. The UE 115-*d* may communicate with a TRP using a beam based on the priority list. For example, the UE 115-*d* may communicate with the TRP 405-*d* using beam 415-*h*, where beam 415-*h* corresponds to an antenna port and a beam index.

In another example, the UE 115-*d* may determine that the TRP 405-*c* and corresponding beam 415-*f* have the highest priority, as the beam 415-*f* (and thus the TRP 405-*c*) may be associated with a default operating frequency that is close (e.g., in the frequency domain) to the default operating frequency of the UE 115-*d*. For instance, both the UE 115-*d* and the beam 415-*f* may be associated with a default operating frequency of 57 GHz, while the beam 415-*e* may be associated with a default operating frequency of 64 GHz, the beam 415-*g* may be associated with a default operating frequency of 71 GHz, and the beam 415-*h* may be associated with a default operating frequency of 64 GHz. The UE 115-*d* may prefer the beam 415-*f* for communications with the TRP 405-*c*, which may be based on communications performance provided by the beam 415-*f*, as well as the associated default operating frequency of the beam 415-*f* and corresponding antenna port and the default operating frequency of the UE 115-*d*. The UE 115-*d* may transmit an indication of the priority to the TRPs 405-*a* and 405-*b* providing the priorities of the TRP 405-*c*, an antenna port of TRP 405-*c* corresponding to the beam 415-*f*, and a beam index of beam 415-*f*, and the UE 115-*d* and the TRPs 405-*a* and 405-*b* may communicate according to the priorities indicated by the UE 115-*d*. It is noted that the default operating frequencies described are provided for illustrative purposes only. As such, these and other default operating frequencies may be possible and should not be considered limiting.

Figure 5:
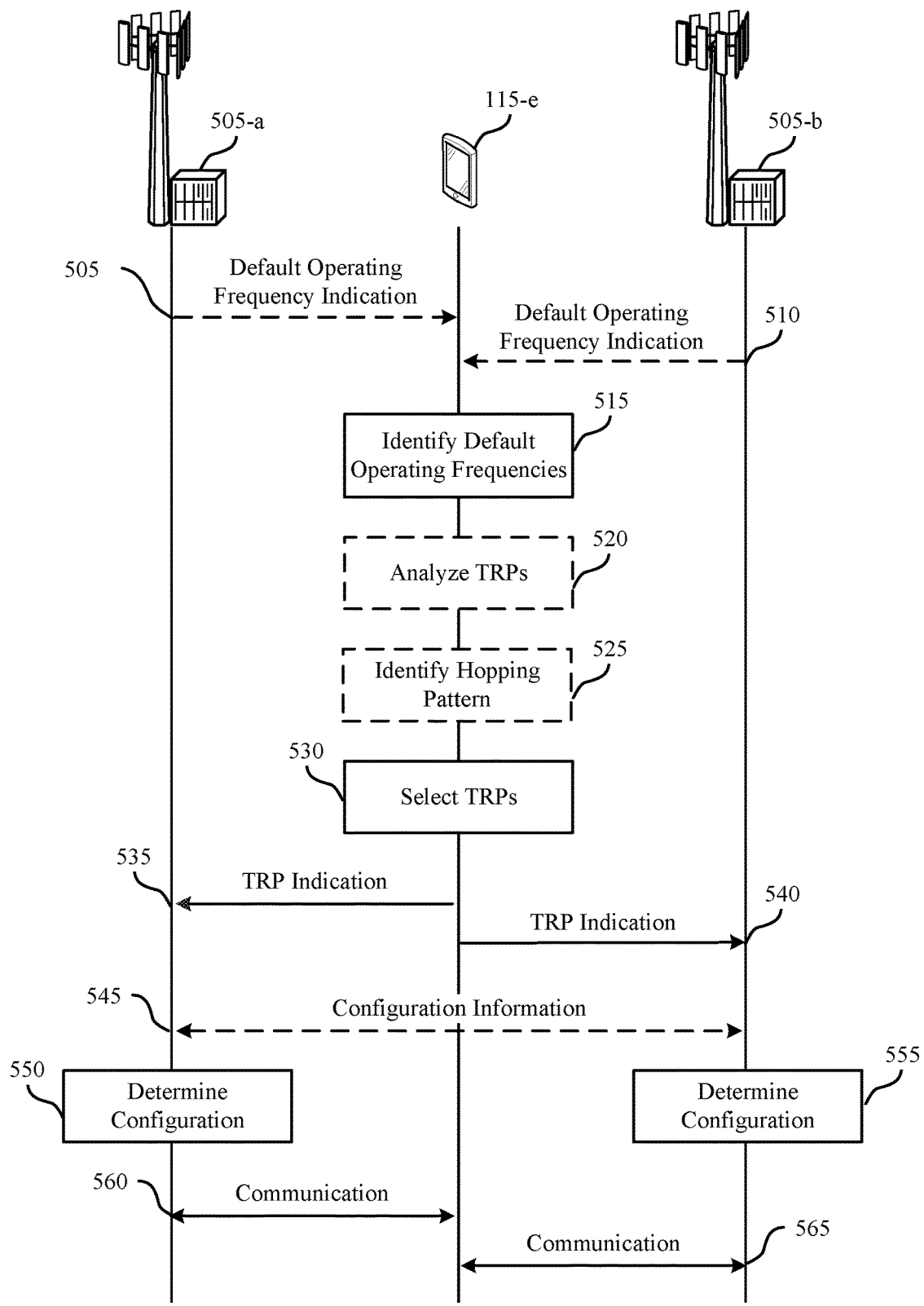
FIGS. 5 and 6 illustrate examples of process flows in systems that support techniques for TRP and beam selection in ultra-wide bandwidth systems in accordance with aspects of the present disclosure.

FIG. 5 illustrates an example of a process flow 500 in a system that supports techniques for TRP and beam selection in ultra-wide bandwidth systems in accordance with aspects of the present disclosure. In some examples, the process flow 500 may implement aspects of wireless communications systems as described herein. For example, the process flow 500 includes a UE 115-*e* and base stations 505-*a* and 505-*b* that each may be examples of the corresponding devices described with reference to FIGS. 1, 2, 3, and 4. The process flow 500 may illustrate an example of the base stations 505-*a* and 505-*b* and the UE 115-*e* determining and signaling one or more default operating frequencies to be used for communications between the devices.

In the following description of the process flow 500, the operations between the UE 115-*e* and the base stations 505-*a* and 505-*b* may be transmitted in a different order than the order shown, or the operations performed by the base stations 505-*a* and 505-*b* and the UE 115-*e* may be performed in different orders or at different times. Certain operations may also be left out of the process flow 500, or other operations may be added to the process flow 500. It is to be understood that while base stations 505-*a* and 505-*b* and the UE 115-*e* are shown performing a number of the operations of process flow 500, any wireless device (e.g., a UE, a customer premises equipment, a base station, a TRP, an IAB node, a repeater with different types of capabilities in terms of repetition of signals (also known as "smart" or "dumb" repeaters, or some other terminology), or a sidelink node, among other examples) may perform the operations shown.

At 505, the base station 505-*a* may transmit, and the UE 115-*e* may receive, an indication of one or more respective default operating frequencies for one or more TRPs for communicating over portions of a bandwidth. The one or more TRPs may be associated with the base station 505-*a*. In some cases, the one or more TRPs may transmit the one or more messages. Each of the one or more default operating frequencies may correspond to one or more antenna ports of each TRP. In some cases, the indication may include a range of default operating frequencies of the one or more TRPs, or each of the one or more default operating frequencies may include a range of default operating frequencies (e.g., such that the range provides beamforming performance that satisfies a performance threshold). For instance, a TRP may identify a first frequency boundary and a second frequency boundary for each default operating frequency of the one or more default operating frequencies. The first frequency boundary may be different from the second frequency boundary. For example, the first frequency boundary may be an upper frequency boundary and the second frequency boundary may be a lower frequency boundary. One or more frequencies within the upper and lower frequency boundaries may, in some cases, provide beamforming performance that satisfies a performance threshold. For example, the performance threshold may be based on a signal strength threshold (e.g., for communications over each of the one or more frequencies).

The default operating frequencies may be specific to a TRP. In some examples, one or more of the default operating frequencies may be predetermined by or associated with an antenna array configuration (e.g., a number of RF chains) of the respective TRP and may indicate an antenna array configuration of TRP. The antenna array configuration may include an inter-antenna element spacing of an antenna array having uniformly-spaced antenna elements or non-uniformly spaced antenna elements. Further, the one or more default operating frequencies of the one or more TRPs may include a frequency such that substantially half of a wavelength corresponding to the frequency is substantially equal to a spacing between two or more antenna elements of an antenna array of the corresponding TRP. For example, the spacing between two or more antenna elements may be within an upper threshold and a lower threshold that are associated with substantially half of the wavelength of the frequency.

Additionally, or alternatively, the one or more default operating frequencies may be associated with a frequency band of a set of frequency bands, or with one or more carrier frequencies that correspond to an analog beamforming codebook.

At 510, the base station 505-*b* may transmit, and the UE 115-*e* may receive, an indication of one or more respective default operating frequencies for one or more TRPs for communicating over portions of a bandwidth. The one or more TRPs may be associated with the base station 505-*b*. In some cases, the one or more TRPs may transmit the one or more messages. Each of the one or more default operating frequencies may correspond to one or more antenna ports, RF chains, or both, of each TRP. In some cases, the indication may include a range of default operating frequencies of the one or more TRPs, or each of the one or more default operating frequencies may include a range of default operating frequencies (e.g., such that the range provides beamforming performance that satisfies a performance threshold). For instance, a TRP may identify a first frequency boundary and a second frequency boundary for each default operating frequency of the one or more default operating frequencies. The first frequency boundary may be different from the second frequency boundary. For example, the first frequency boundary may be an upper frequency boundary and the second frequency boundary may be a lower frequency boundary. One or more frequencies within the upper and lower frequency boundaries may, in some cases, provide beamforming performance that satisfies a performance threshold. For example, the performance threshold may be based on a signal strength threshold (e.g., for communications over each of the one or more frequencies).

At 515, the UE 115-*e* may identify respective default operating frequencies for each TRP of a plurality of TRPs. For example, the UE 115-*e* may identify default operating frequencies for TRPs based on the indications transmitted by the base station 505-*a* at 505, the base station 505-*b* at 510, or both.

At 520, the UE 115-*e* may perform an analysis of each TRP of the plurality of TRPs. For instance, the UE 115-*e* may compare the respective default operating frequencies for each TRP of the set of TRPs indicated at 505 (e.g., associated with base station 505-*a*) with one or more default operating frequencies of the UE 115-*e*. The UE 115-*e* may also compare the respective default operating frequencies for each TRP of the set of TRPs indicated at 510 (e.g., associated with base station 505-*b*) with one or more default operating frequencies of the UE 115-*e*.

The UE 115-*e* may identify a first TRP out of the plurality of TRPs that supports a first default operating frequency and may use the comparison to determine that the first default operating frequency is also supported by the UE 115-*e*. The UE 115-*e* may also identify a second TRP out of the plurality of TRPs that supports a second default operating frequency, and may determine that the second default operating frequency is supported by the UE 115-*e*. In some cases, the determination that the first or second default operating frequency is supported by the UE 115-*e* may be made based on a configuration of antenna ports of the UE 115-*e*.

In some examples, the UE 115-*e* may estimate array gain losses for communications over the bandwidth. For example, the UE 115-*e* may perform the estimation for communications associated with an antenna port of a TRP (e.g., of the plurality of TRPs) and an antenna port of the UE 115-*e*.

At 525, the UE 115-*e* may identify a TRP hopping pattern for communications between two or more TRPs.

At 530, the UE 115-*e* may select two or more TRPs for joint communications. The selection may be based on the default operating frequencies of the two or more TRPs and one or more default operating frequencies of the UE 115-*e*. For instance, the selection may be made based on the analysis performed at 520, such as the comparison between the one or more default operating frequencies of the UE 115-*e* and the one or more default operating frequencies of the TRP(s). Additionally or alternatively the UE 115-*e* may select at least one TRP of the two or more TRPs based on the estimation of array gain losses performed at 520. For example, a TRP may be chosen based on the estimated array gain losses satisfying a threshold.

At 535, the UE 115-*e* may transmit, and the base station 505-*a* may receive, a message that includes an indication of the TRPs selected for joint communications at 530. For instance, at 530, the UE 115-*e* may have selected a first TRP of the plurality of TRPs (e.g., associated with the base station 505-*a*) and a second TRP of the plurality of TRPs (e.g., associated with the base station 505-*b*). The message may thus include an indication of the first TRP and the second TRP. The indication may be transmitted via control signaling (e.g., dynamically or semi-statically, during one or more time intervals). In some examples, the indication may include an indication of the TRP hopping pattern identified at 525.

At 540, the UE 115-*e* may transmit, and the base station 505-*b* may receive, a message that includes an indication of the TRPs selected for joint communications at 530. For instance, at 530, the UE 115-*e* may have selected a first TRP of the plurality of TRPs (e.g., associated with the base station 505-*a*) and a second TRP of the plurality of TRPs (e.g., associated with the base station 505-*b*). The message may thus include an indication of the first TRP and the second TRP. The indication may be transmitted via control signaling (e.g., dynamically or semi-statically, during one or more time intervals). In some examples, the indication may include an indication of the TRP hopping pattern identified at 525.

At 545, each TRP indicated in the messages received at 535 and 540 may exchange configuration information with the other TRPs for performing joint communications with the UE 115-*e*. For example, the first TRP (e.g., associated with the base station 505-*a*) and the second TRP (e.g., associated with the base station 505-*b*) may exchange configuration information over a backhaul link between the first and second TRPs.

At 550 and 555, each TRP indicated in the messages received at 535 and 540 may determine a configuration for communicating data with the UE 115-*e* in accordance with the joint communications based on the messages received at 535 and 540. The TRPs may determine the configuration based on the configuration information exchanged at 545.

At 560, the first TRP (e.g., associated with the base station 505-*a*) may communicate with the UE 115-*e* over a portion of the bandwidth. The communicating may include performing joint beamforming with the second TRP (e.g., associated with the base station 505-*b*) and may be based on the one or more default operating frequencies of the first TRP, the one or more default operating frequencies of the UE 115-*e*, and the configuration determined at 550. In some cases, the communicating may also be based on the configuration information exchanged at 545. In some examples, if the UE 115-*e* identified a hopping pattern at 525 and included an indication of the hopping pattern in the message transmitted at 535, the first TRP may communicate with the UE 115-*e* according to the hopping pattern.

At 565, the second TRP (e.g., associated with the base station 505-*b*) may communicate with the UE 115-*e* over a portion of the bandwidth. The communicating may include performing joint beamforming with the first TRP (e.g., associated with the base station 505-*a*) and may be based on the one or more default operating frequencies of the second TRP, the one or more default operating frequencies of the UE 115-e, and the configuration determined at 555. In some cases, the communicating may also be based on the configuration information exchanged at 545. In some examples, if the UE 115-e identified a hopping pattern at 525 and included an indication of the hopping pattern in the message transmitted at 535, the second TRP may communicate with the UE 115-e according to the hopping pattern.

Figure 6:
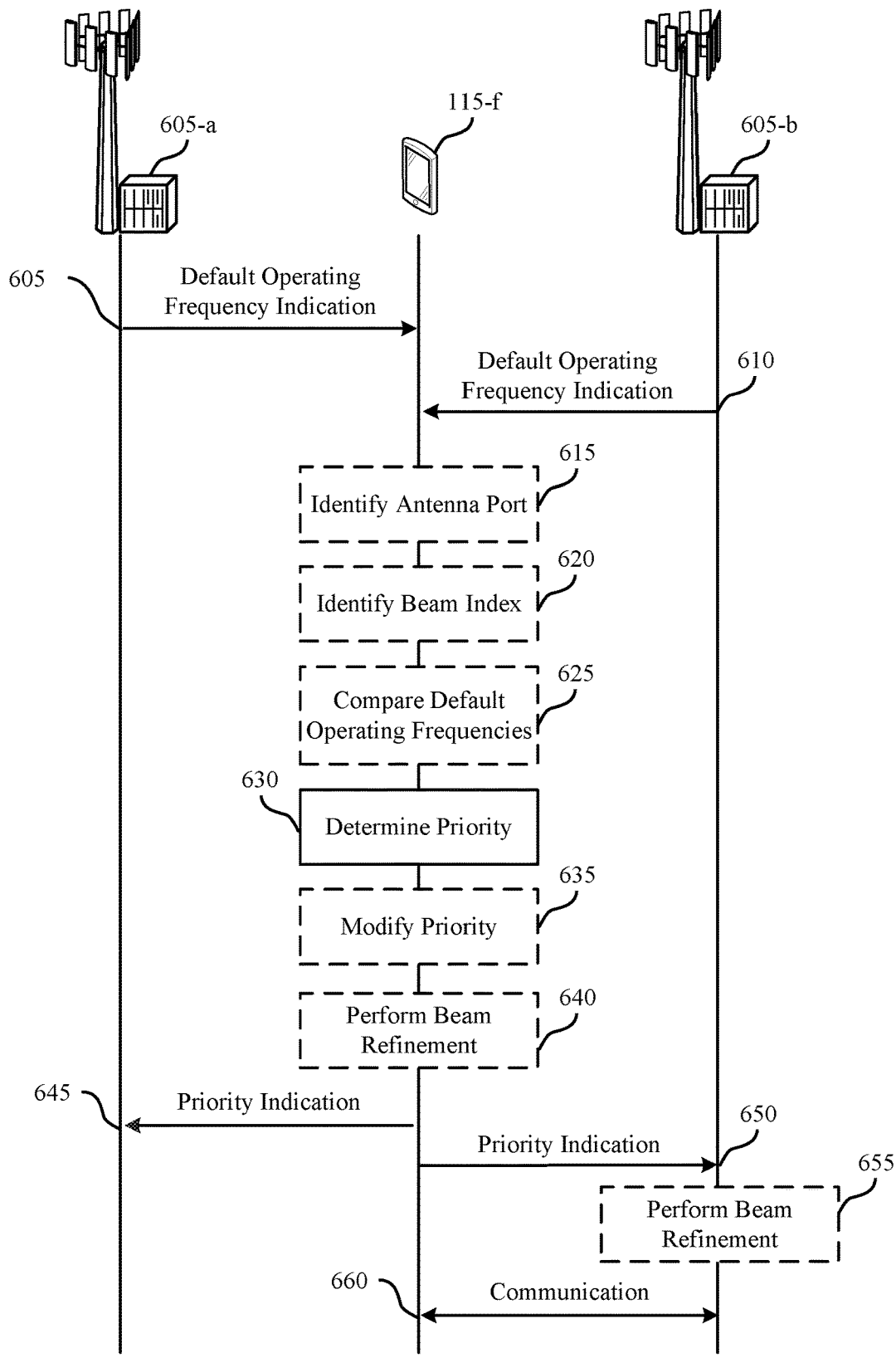

FIG. 6 illustrates an example of a process flow 600 in a system that supports techniques for TRP and beam selection in ultra-wide bandwidth systems in accordance with aspects of the present disclosure. In some examples, the process flow 600 may implement aspects of wireless communication systems as described herein. For example, the process flow 600 includes a UE 115-f and base stations 605-a and 605-b that each may be examples of the corresponding devices described with reference to FIGS. 1-4. The process flow 600 may illustrate an example of the base stations 605-a and 605-b and the UE 115-f determining and signaling one or more default operating frequencies to be used for communications between the UE 115-f and the base stations 605-a and 605-b.

In the following description of the process flow 600, the operations between the UE 115-f and the base stations 605-a and 605-b may be transmitted in a different order than the order shown, or the operations performed by the base stations 605-a and 605-b and the UE 115-f may be performed in different orders or at different times. Certain operations may also be left out of the process flow 600, or other operations may be added to the process flow 600. It is to be understood that while base stations 605-a and 605-b and the UE 115-f are shown performing a number of the operations of process flow 600, any wireless device (e.g., a UE, a customer premises equipment, a base station, a TRP, an IAB node, a repeater with different types of capabilities (e.g., in terms of repetition of signals, which may be referred to as "smart" or "dumb" repeaters, or by some other terminology), or a sidelink node, among other examples) may perform the operations shown.

At 605, the base station 605-a may transmit, and the UE 115-f may receive, a message indicating one or more respective default operating frequencies for one or more TRPs for communicating over portions of a bandwidth. The one or more TRPs may be associated with the base station 605-a. In some cases, the one or more TRPs may transmit the one or more messages. Each of the one or more default operating frequencies may correspond to one or more antenna ports of each TRP. In some cases, the indication may include a range of default operating frequencies of the one or more TRPs, or each of the one or more default operating frequencies may include a range of default operating frequencies (e.g., such that the range provides beamforming performance that satisfies a performance threshold). For instance, a TRP may identify a first frequency boundary and a second frequency boundary for each default operating frequency of the one or more default operating frequencies. The first frequency boundary may be different from the second frequency boundary. For example, the first frequency boundary may be an upper frequency boundary and the second frequency boundary may be a lower frequency boundary. One or more frequencies within the upper and lower frequency boundaries may, in some cases, provide beamforming performance that satisfies a performance threshold. For example, the performance threshold may be based on a signal strength threshold (e.g., for communications over each of the one or more frequencies).

At 610, the base station 605-b may transmit, and the UE 115-f may receive, one or more messages indicating one or more default operating frequencies for one or more TRPs for communicating over portions of a bandwidth. The one or more TRPs may be associated with the base station 605-a. In some cases, the one or more TRPs may transmit the one or more messages. Each of the one or more default operating frequencies may correspond to one or more antenna ports of each TRP. In some cases, the indication may include a range of default operating frequencies of the one or more TRPs, or each of the one or more default operating frequencies may include a range of default operating frequencies (e.g., such that the range provides beamforming performance that satisfies a performance threshold). For instance, a TRP may identify a first frequency boundary and a second frequency boundary for each default operating frequency of the one or more default operating frequencies. The first frequency boundary may be different from the second frequency boundary. For example, the first frequency boundary may be an upper frequency boundary and the second frequency boundary may be a lower frequency boundary. One or more frequencies within the upper and lower frequency boundaries may, in some cases, provide beamforming performance that satisfies a performance threshold. For example, the performance threshold may be based on a signal strength threshold (e.g., for communications over each of the one or more frequencies).

At 615, the UE 115-f may identify a first antenna port of a first TRP of a set of TRPs based on the indication received at 605. The first TRP may be associated with the base station 605-a. The first antenna port may be associated with a first default operating frequency. The UE 115-f may also identify a second antenna port of a second TRP of a set of TRPs based on the indication received at 610. The second TRP may be associated with the base station 605-b. The second antenna port may be associated with a second default operating frequency.

At 620, the UE 115-f may identify a first beam index of a beam for communicating with the first TRP. The first beam index may be associated with the first TRP (e.g., identified at 615) and the first default operating frequency. In some examples, the UE 115-f may identify one or more of a synchronization signal block (SSB), a channel state information reference signal (CSI-RS), or a sounding reference signal (SRS), associated with the beam, and may identify the first beam index based on the SSB, the CSI-RS, or the SRS, or any combination thereof.

In some examples, the UE 115-f may identify a second beam index of a beam for communicating with the second TRP. The second beam index may be associated with the second TRP (e.g., identified at 615) and the second default operating frequency. The UE 115-f may identify one or more of an SSB, a CSI-RS, or an SRS, associated with the beam, and may identify the second beam index based on the SSB, the CSI-RS, or the SRS, or any combination thereof.

At 625, the UE 115-f may compare the respective default operating frequencies for each TRP of the set of TRPs indicated at 605 (e.g., associated with base station 605-a) with one or more default operating frequencies of the UE 115-f. The UE 115-f may also compare the respective default operating frequencies for each TRP of the set of TRPs indicated at 610 (e.g., associated with base station 605-b) with one or more default operating frequencies of the UE 115-f.

In some examples, the comparison performed at 625 may be based on an estimation of array gain losses. For instance, the UE 115-f may estimate array gain losses for transmissions over antenna ports of the UE 115-f and antenna ports of each TRP, and may compare default operating frequencies based on the estimated array gain losses.

At 630, the UE 115-*f* may determine a priority of each TRP of the TRPs. The priority may be based on the default operating frequencies of the UE 115-*f* over the portions of the bandwidth, the default operating frequencies of the TRPs, or some combination thereof. For example, the priority may be determined based on the comparison(s) at 625, or on a dynamic TRP selection scheme. In some cases, the UE 115-*f* may determine a priority for the first TRP, the first antenna port, and the first beam index (e.g., identified at 620) based on the default operating frequencies of the UE 115-*f* and the first default operating frequency. The UE 115-*f* may also determine a priority for the second TRP, the second antenna port, and the second beam index (e.g., identified at 620) based on the default operating frequencies of the UE 115-*f* and the second default operating frequency.

At 635, the UE 115-*f* may optionally identify an additional TRP that is different from the TRPs indicated at 605 and/or 610. The UE 115-*f* may modify the priority determined at 630 based on one or more default operating frequencies associated with the additional TRP.

At 640, the UE 115-*f* may perform one or more beam refinement procedures for communicating with a TRP. For instance, the UE 115-*f* may determine to perform a beam refinement procedure to communicate with the first TRP, the second TRP, or both. The beam refinement procedure(s) may be based on the priority determined at 630.

At 645, the UE 115-*f* may transmit, and the base station 605-*a* may receive, an indication of the priority (e.g., determined at 630 and/or modified at 635) to the base station 605-*a* and/or the one or more TRPs associated with the base station 605-*a*. The UE 115-*f* may broadcast the priority indication or may transmit the priority indication via control signaling. The indication may include a priority of two or more TRPs based on the respective default operating frequencies, such as an ordering of a set of two or more TRPs. The TRPs may be associated with a same base station (e.g., base station 605-*a* or base station 605-*b*) or with different base stations (e.g., base station 605-*a* and base station 605-*b*). For instance, the set of TRPs may include one or more TRPs indicated at 605 (e.g., associated with base station 605-*a*), one or more TRPs indicated at 610 (e.g., associated with base station 605-*b*), a TRP identified at 635, or any combination thereof. Additionally, or alternatively, the indication may include one or more antenna ports associated with each TRP of the set of TRPs, one or more beam indices, or some combination thereof.

As an example, the priority indication may include an indication of a priority of a first TRP (e.g., associated with the base station 605-*a*), the first antenna port (e.g., determined at 615), and the first beam index (e.g., determined at 620) relative to the second TRP (e.g., associated with the base station 605-*b*), the second antenna port (e.g., determined at 615), and the second beam index (e.g., determined at 620). Alternatively, the indication of the priority may include a priority of a first TRP, a first antenna port associated with the first TRP, and a first beam index, and a second TRP, a second antenna port associated with the second TRP, and a second beam index. In this case, the first TRP and the second TRP may be associated with a same base station, such as base station 605-*a* or base station 605-*b*.

The base station 605-*a* may use the priority indication received at 645 to identify a priority of a first TRP, a first antenna port of the first TRP, and a first beam index relative to a second TRP, a second antenna port of the second TRP, and a second beam index. Each beam index may be based on an SSB, a CSI-RS, an SRS, or some combination thereof.

At 650, the UE 115-*f* may transmit the priority indication to the base station 605-*b* and/or the one or more TRPs associated with the base station 605-*b*. The UE 115-*f* may broadcast the priority indication or may transmit the priority indication via control signaling.

The base station 605-*b* may use the priority indication received at 650 to identify a priority of a first TRP, a first antenna port of the first TRP, and a first beam index relative to a second TRP, a second antenna port of the second TRP, and a second beam index. Each beam index may be based on an SSB, a CSI-RS, an SRS, or some combination thereof.

At 655, the base station 605-*b* may perform one or more beam refinement procedures for communicating with the UE 115-*f* based on the priority indication received at 650. For instance, at 650, the base station 605-*b* may have identified a priority for a first TRP associated with the base station 605-*b*, and may perform a beam refinement procedure for a beam associated with the first TRP to provide more efficient communications with the UE 115-*f*.

At 660, the UE 115-*f* may communicate with a TRP over a beam corresponding to a beam index, an antenna port, and a TRP having a highest priority (e.g., identified at 630). For example, the UE 115-*f* may communicate with a TRP associated with the base station 605-*b* according to the priority indication.

Figure 7:
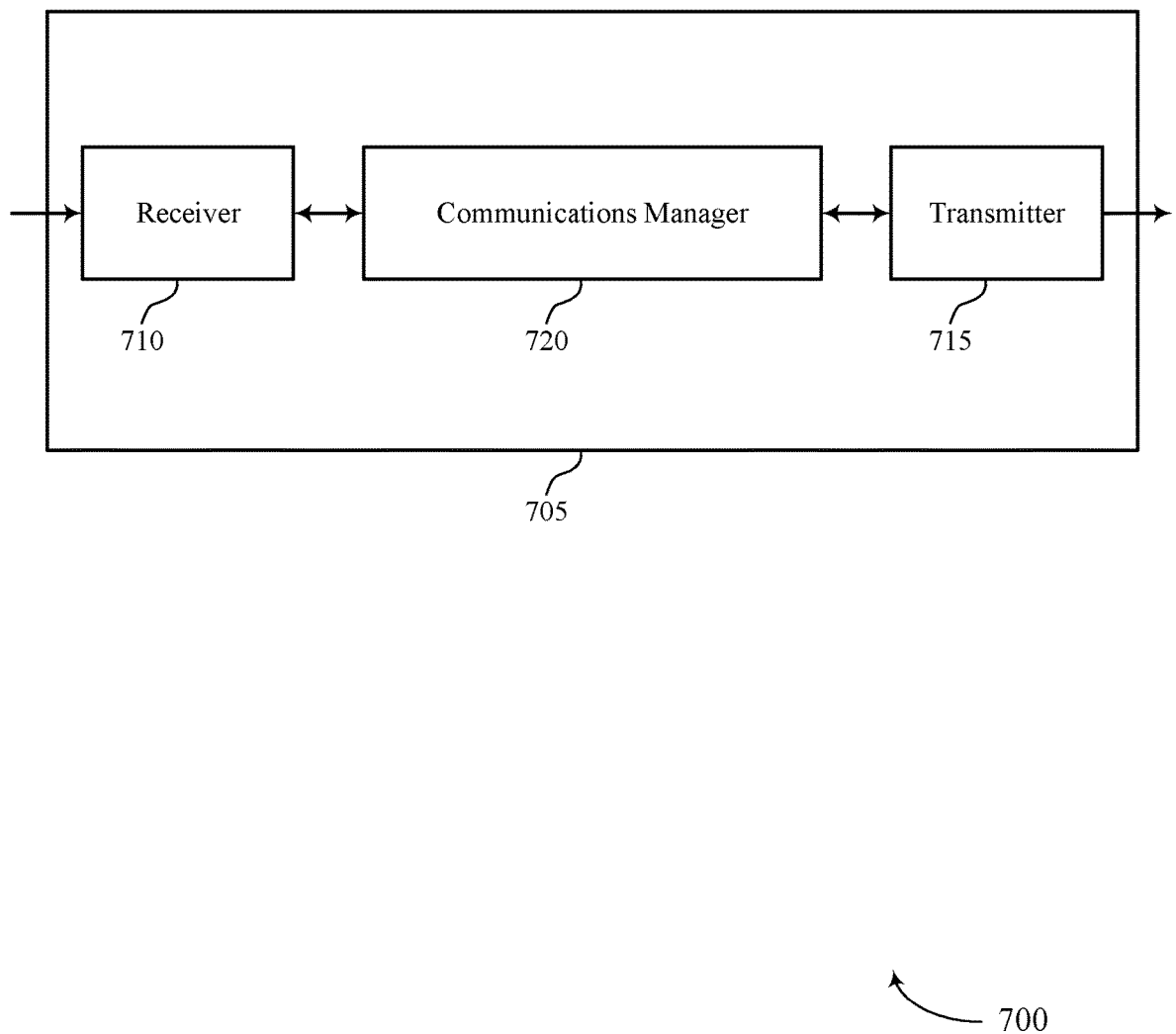
FIGS. 7 and 8 show block diagrams of devices that support techniques for TRP and beam selection in ultra-wide bandwidth systems in accordance with aspects of the present disclosure.

FIG. 7 shows a block diagram 700 of a device 705 that supports techniques for TRP and beam selection in ultra-wide bandwidth systems in accordance with aspects of the present disclosure. The device 705 may be an example of aspects of a UE 115 as described herein. In some examples, the device 705 may be an example of or include the components of a CPE, a repeater, a sidelink node, or the like. The device 705 may include a receiver 710, a transmitter 715, and a communications manager 720. The device 705 may also include one or more processors, and instructions stored in memory that are executable by the one or more processors to enable the one or more processors to perform the TRP and beam selection features discussed herein. Each of these components may be in communication with one another (e.g., via one or more buses).

The receiver 710 may receive information such as packets, user data, or control information associated with various information channels (e.g., control channels, data channels, and information related to techniques for TRP and beam selection in ultra-wide bandwidth systems, etc.). Information may be passed on to other components of the device 705. The receiver 710 may be an example of aspects of the transceiver 1015 described with reference to FIG. 10. The receiver 710 may utilize a single antenna or a set of antennas.

The transmitter 715 may transmit signals generated by other components of the device 705. In some examples, the transmitter 715 may be collocated with a receiver 710 in a transceiver module. For example, the transmitter 715 may be an example of aspects of the transceiver 1015 described with reference to FIG. 10. The transmitter 715 may utilize a single antenna or a set of antennas.

The communications manager 720 may receive one or more messages indicating respective default operating frequencies for each TRP of a set of two or more TRPs, each of the respective default operating frequencies for communications with the wireless device over different portions of a bandwidth, determine a priority of each TRP of the set of two or more TRPs based on the respective default operating frequencies for each TRP, and transmit an indication of the priority based on the determination, where the indication of the priority includes an ordering of the set of two or more TRPs, one or more antenna ports associated with each TRP, one or more beam indices, or any combination thereof. The communications manager 720 may be an example of aspects of the communications manager 1020 described herein.

Additionally or alternative, the communications manager 720 may identify respective default operating frequencies for each TRP of a set of TRPs, each of the respective default operating frequencies for communications with the wireless device over different portions of a bandwidth, select, from the set of TRPs, two or more TRPs for joint communications with the wireless device, where the selection is based on the respective default operating frequencies of the two or more TRPs and one or more default operating frequencies of the wireless device, and transmit a message indicating the two or more TRPs for the joint communications with the wireless device.

In some examples, the communications manager 720 may receive one or more messages indicating respective default operating frequencies for each TRP of a set of TRPs, each of the respective default operating frequencies for communications with the wireless device over different portions of a bandwidth, transmit an indication of a priority of each TRP of the set of TRPs, the priority being based on the respective default operating frequencies for each TRP, where the indication of the priority includes an ordering of the set of TRPs, one or more antenna ports associated with each TRP, one or more beam indices, or any combination thereof, select, from the set of TRPs, two or more TRPs for joint communications with the wireless device, where the selection is based on the respective default operating frequencies of the two or more TRPs and one or more default operating frequencies of the wireless device, and transmit a message indicating the two or more TRPs for the joint communications with the wireless device.

The communications manager 720, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 720, or its sub-components, may be physically located at various positions, including being distributed such that portions of functions are implemented at different physical locations by one or more physical components. In some examples, the communications manager 720, or its sub-components, may be a separate and distinct component in accordance with various aspects of the present disclosure. In some examples, the communications manager 720, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

By including or configuring the communications manager 720 in accordance with examples as described herein, the device 705 may support techniques for communicating with TRPs in ultra-wide bandwidth systems based on default operating frequencies. For example, by exchanging default operating frequency information with one or more TRPs in a system, the device 705 may determine to communicate with TRPs that have a default operating frequency similar to that of the device 705, which may reduce beamforming loss and increase communications reliability and robustness. As such, the device 705 may potentially communicate with a TRP more successfully, which may decrease a number of potential retransmissions or a number of monitoring occasions that the device 705 may decode. Accordingly, the device 705 may power off one or more processing units associated with transmitting or decoding monitoring occasions, which may improve power savings at the device 705 and increase battery life.

Figure 8:
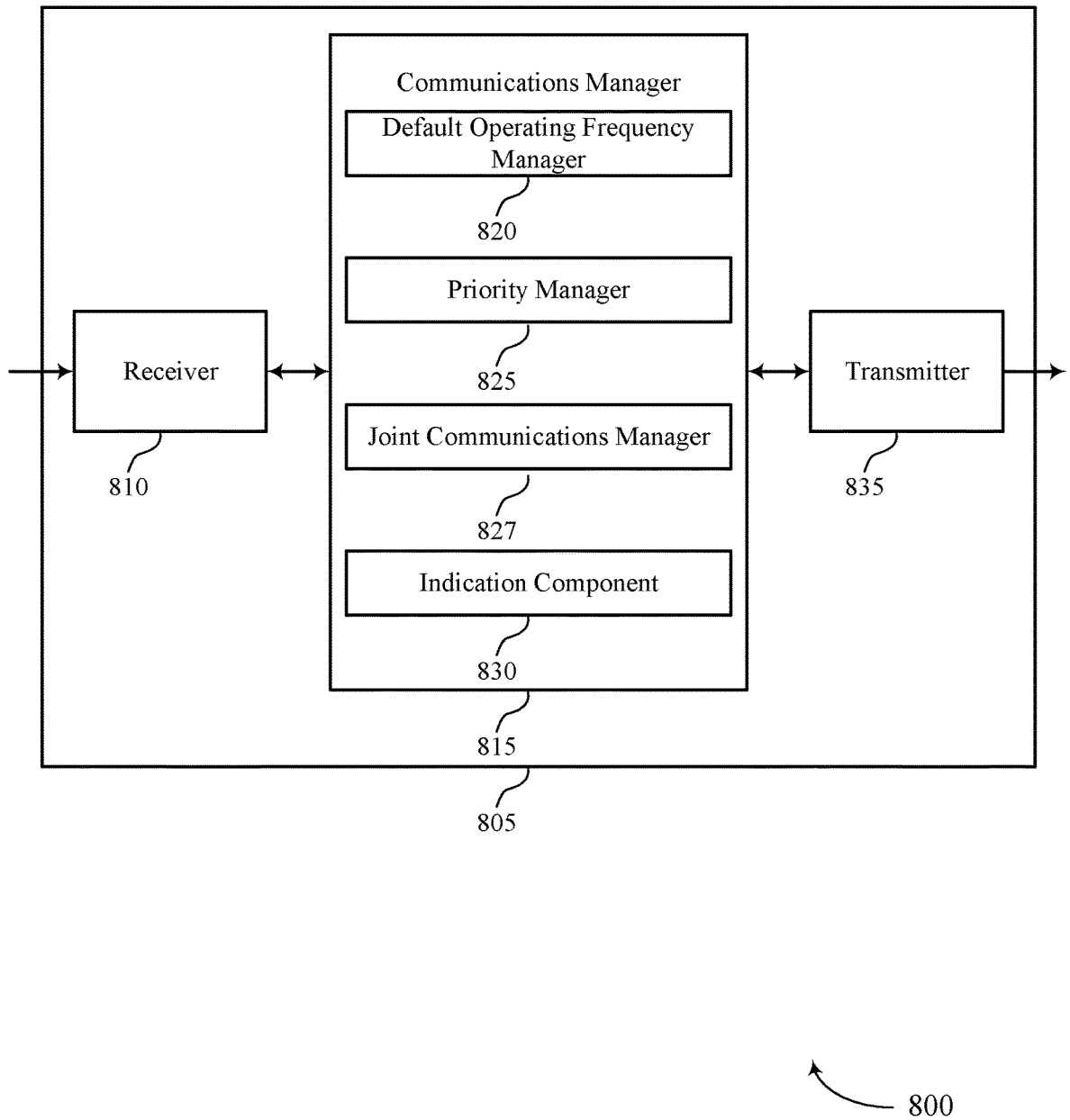

FIG. 8 shows a block diagram 800 of a device 805 that supports techniques for TRP and beam selection in ultra-wide bandwidth systems in accordance with aspects of the present disclosure. The device 805 may be an example of aspects of a device 705, or a UE 115 as described herein. In some examples, the device 805 may be an example of or include the components of a CPE, a repeater, a sidelink node, or the like. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to techniques for TRP and beam selection in ultra-wide bandwidth systems, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 720 as described herein. The communications manager 815 may include a default operating frequency manager 820, a priority manager 825, a joint communications manager 827, and an indication component 830. The communications manager 815 may be an example of aspects of the communications manager 1020 described herein.

The default operating frequency manager 820 may receive one or more messages indicating respective default operating frequencies for each TRP of a set of TRPs, each of the respective default operating frequencies for communications with the wireless device over different portions of a bandwidth.

The priority manager 825 may determine a priority of each TRP of the set of TRPs based on the respective default operating frequencies for each TRP.

The indication component 830 may transmit an indication of the priority based on the determination, where the indication of the priority includes an ordering of the set of TRPs, one or more antenna ports associated with each TRP, one or more beam indices, or any combination thereof.

The joint communications manager 827 may select, from the set of TRPs, two or more TRPs for joint communications with the wireless device, where the selection is based on the respective default operating frequencies of the two or more TRPs and one or more default operating frequencies of the wireless device.

The indication component 830 may transmit a message indicating the two or more TRPs for the joint communications with the wireless device.

The transmitter 835 may transmit signals generated by other components of the device 805. In some examples, the transmitter 835 may be collocated with a receiver 810 in a transceiver module. For example, the transmitter 835 may be an example of aspects of the transceiver 1015 described with reference to FIG. 10. The transmitter 835 may utilize a single antenna or a set of antennas.

In some cases, the default operating frequency manager 820, the priority manager 825, the joint communications manager 827, and the indication component 830 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the default operating frequency manager 820, the priority manager 825, the joint communications manager 827, and the indication component 830 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 9:
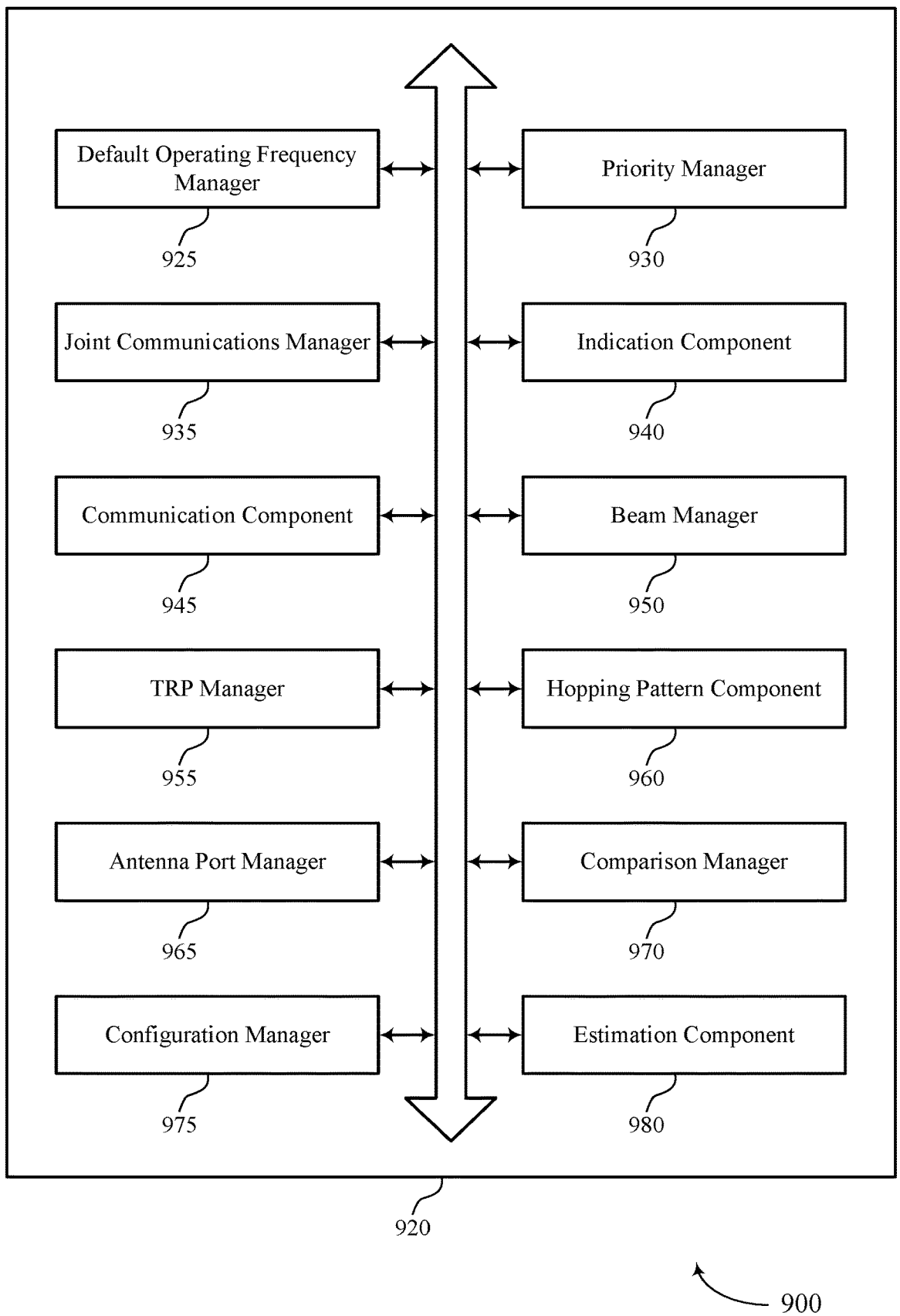
FIG. 9 shows a block diagram of a communications manager that supports techniques for TRP and beam selection in ultra-wide bandwidth systems in accordance with aspects of the present disclosure.

FIG. 9 shows a block diagram 900 of a communications manager 920 that supports techniques for TRP and beam selection in ultra-wide bandwidth systems in accordance with aspects of the present disclosure. The communications manager 920 may be an example of aspects of a communications manager 720, a communications manager 815, or both, as described herein. The communications manager 920, or various components thereof, may be an example of means for performing various aspects of techniques for TRP and beam selection in ultra-wide bandwidth systems as described herein. For example, the communications manager 920 may include a default operating frequency manager 925, a priority manager 930, a joint communications manager 935, an indication component 940, a communication component 945, a beam manager 950, an TRP manager 955, a hopping pattern component 960, an antenna port manager 965, a comparison manager 970, a configuration manager 975, an estimation component 980, or any combination thereof. Each of these components may communicate, directly or indirectly, with one another (e.g., via one or more buses).

The communications manager 920 may support wireless communication at a wireless device in accordance with examples as disclosed herein. The default operating frequency manager 925 may be configured as or otherwise support a means for receiving one or more messages indicating respective default operating frequencies for each TRP of a set of multiple TRPs, each of the respective default operating frequencies for communications with the wireless device over different portions of a bandwidth. The priority manager 930 may be configured as or otherwise support a means for transmitting an indication of a priority of each TRP of the set of multiple TRPs, the priority being based on the respective default operating frequencies for each TRP, where the indication of the priority includes an ordering of the set of multiple TRPs, one or more antenna ports associated with each TRP, one or more beam indices, or any combination thereof. The joint communications manager 935 may be configured as or otherwise support a means for selecting, from the set of multiple TRPs, two or more TRPs for joint communications with the wireless device based on the respective default operating frequencies of the two or more TRPs and one or more default operating frequencies of the wireless device. The indication component 940 may be configured as or otherwise support a means for transmitting a message indicating the two or more TRPs for the joint communications with the wireless device.

In some examples, the priority manager 930 may be configured as or otherwise support a means for determining the priority of each TRP of the set of multiple TRPs based on the one or more default operating frequencies of the wireless device for the communications over the portions of the bandwidth.

In some examples, to support determining the priority, the antenna port manager 965 may be configured as or otherwise support a means for identifying a first antenna port of a first TRP of the set of multiple TRPs, the first antenna port associated with a first default operating frequency. In some examples, to support determining the priority, the beam manager 950 may be configured as or otherwise support a means for identifying a first beam index of a beam for communicating with the first TRP, the first beam index associated with the first antenna port and the first default operating frequency. In some examples, to support determining the priority, the priority manager 930 may be configured as or otherwise support a means for determining a priority of the first TRP, the first antenna port, and the first beam index based on the one or more default operating frequencies of the wireless device and the first default operating frequency.

In some examples, the indication of the priority includes the priority of the first TRP, the first antenna port, and the first beam index relative to a second TRP of the set of multiple TRPs, a second antenna port of the second TRP, and a second beam index.

In some examples, the beam manager 950 may be configured as or otherwise support a means for identifying one or more of a SSB, a CSI-RS, or a SRS, associated with the beam, where the first beam index is identified based on the SSB, the CSI-RS, the SRS, or any combination thereof.

In some examples, the comparison manager 970 may be configured as or otherwise support a means for comparing the respective default operating frequencies for each TRP with the one or more default operating frequencies of the wireless device, where determining the priority is based on the comparison.

In some examples, the beam manager 950 may be configured as or otherwise support a means for estimating array gain losses for transmissions over antenna ports of the wireless device and antenna ports of each TRP, where the comparison is based on the estimated array gain losses.

In some examples, each default operating frequency of the one or more default operating frequencies includes a frequency such that substantially half of a wavelength corresponding to the frequency is substantially equal to a spacing between two or more antenna elements of an antenna array of the wireless device. For example, as described herein, half of a wavelength of a default operating frequency for a wireless device may be approximately equal to the inter-element spacing of antenna elements for that wireless device. In addition, the spacing between two or more antenna elements of the antenna array of the wireless device may be within an upper threshold and a lower threshold that are associated with substantially half of the wavelength of the frequency. In such cases, half the default operating frequency of a device may generally correspond to the inter-element spacing of the device's antenna array elements within some tolerance or threshold. The antenna elements may be spaced either more or less than a distance that is approximately equal to half of the wavelength of a default operating frequency (e.g., the antenna elements may be separated by $\lambda/2 \pm$some value or distance).

In some examples, the spacing between the two or more antenna elements of the antenna array of the wireless device is within an upper threshold and a lower threshold that are associated with substantially half of the wavelength of the frequency.

In some examples, to support transmitting the indication of the priority, the indication component 940 may be configured as or otherwise support a means for transmitting, to at least one TRP of the set of multiple TRPs, the indication of the priority via control signaling.

In some examples, to support transmitting the indication of the priority, the indication component 940 may be configured as or otherwise support a means for broadcasting the indication of the priority to the set of multiple TRPs.

In some examples, to support receiving the one or more messages indicating the respective default operating frequencies, the default operating frequency manager 925 may be configured as or otherwise support a means for receiving, from a first TRP of the set of multiple TRPs, a message including an indication of one or more default operating frequencies of the first TRP, each of the one or more default operating frequencies corresponding to one or more antenna ports of the first TRP.

In some examples, each of the respective default operating frequencies include a range of default operating frequencies for a TRP of the set of multiple TRPs, the range of default operating frequencies providing beamforming performance that satisfies a performance threshold.

In some examples, the communication component 945 may be configured as or otherwise support a means for communicating with a first TRP over a beam based on the priority, where the beam corresponds to a beam index, an antenna port, and a TRP having a highest priority. In some examples, the communication component 945 may be configured as or otherwise support a means for identifying an additional TRP that is different from TRPs of the set of multiple TRPs. In some examples, the priority manager 930 may be configured as or otherwise support a means for modifying the priority based on one or more default operating frequencies of the additional TRP.

In some examples, the beam manager 950 may be configured as or otherwise support a means for performing one or more beam refinement procedures for communicating with at least one TRP of the set of multiple TRPs based on the indication of the priority.

In some examples, the priority is based on a dynamic TRP selection scheme.

In some examples, the TRP manager 955 may be configured as or otherwise support a means for identifying a first TRP of the set of multiple TRPs that supports a first default operating frequency. In some examples, the default operating frequency manager 925 may be configured as or otherwise support a means for determining that the first default operating frequency is supported by the wireless device using a comparison between the one or more default operating frequencies of the wireless device and the first default operating frequency of the first TRP. In some examples, the joint communications manager 935 may be configured as or otherwise support a means for selecting at least the first TRP for the joint communications based on the comparison.

In some examples, the TRP manager 955 may be configured as or otherwise support a means for identifying a second TRP of the set of multiple TRPs that supports a second default operating frequency. In some examples, the default operating frequency manager 925 may be configured as or otherwise support a means for determining that the second default operating frequency is supported by the wireless device using a comparison between the one or more default operating frequencies of the wireless device and the second default operating frequency of the second TRP. In some examples, the joint communications manager 935 may be configured as or otherwise support a means for selecting the second TRP for the joint communications based on the comparison.

In some examples, to support determining that the first default operating frequency is supported by the wireless device, the configuration manager 975 may be configured as or otherwise support a means for identifying a configuration of one or more antenna ports of the wireless device. In some examples, to support determining that the first default operating frequency is supported by the wireless device, the default operating frequency manager 925 may be configured as or otherwise support a means for determining that the first default operating frequency is supported by the wireless device based on the configuration of the one or more antenna ports.

In some examples, the estimation component 980 may be configured as or otherwise support a means for estimating array gain losses for communications over the bandwidth that are associated with a first antenna port of the first TRP and a second antenna port of the wireless device, where selecting at least the first TRP is based on the estimated array gain losses satisfying a threshold.

In some examples, the indication component 940 may be configured as or otherwise support a means for receiving, from the first TRP, a second message including an indication of one or more default operating frequencies of the first TRP, each of the one or more default operating frequencies of the first TRP corresponding to one or more antenna ports of the first TRP, or one or more radio frequency chains of the first TRP, or any combination thereof.

In some examples, to support transmitting the message indicating the two or more TRPs, the indication component 940 may be configured as or otherwise support a means for transmitting the message via control signaling to each TRP of the set of multiple TRPs. In some examples, the message is transmitted semi-statically during one or more time intervals or dynamically.

In some examples, the communication component 945 may be configured as or otherwise support a means for communicating with the two or more TRPs for the joint communications, where the joint communications includes joint beamforming between the wireless device and each TRP of the two or more transmission reception points.

In some examples, the hopping pattern component 960 may be configured as or otherwise support a means for identifying a TRP hopping pattern for communications between the two or more TRPs. In some examples, the indication component 940 may be configured as or otherwise support a means for transmitting, within the message, an indication of the TRP hopping pattern. In some examples, the communication component 945 may be configured as or otherwise support a means for communicating with each of the two or more TRPs in accordance with the TRP hopping pattern.

In some examples, the wireless device includes a UE, or IAB node, or a CPE, or a sidelink node, or a wireless repeater configured for retransmissions.

In some cases, the default operating frequency manager 925, a priority manager 930, a joint communications manager 935, an indication component 940, a communication component 945, a beam manager 950, an TRP manager 955, a hopping pattern component 960, an antenna port manager 965, a comparison manager 970, a configuration manager 975, an estimation component 980, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the default operating frequency manager 925, a priority manager 930, a joint communications manager 935, an indication component 940, a communication component 945, a beam manager 950, an TRP manager 955, a hopping pattern component 960, an antenna port manager 965, a comparison manager 970, a configuration manager 975, an estimation component 980, as discussed herein.

Figure 10:
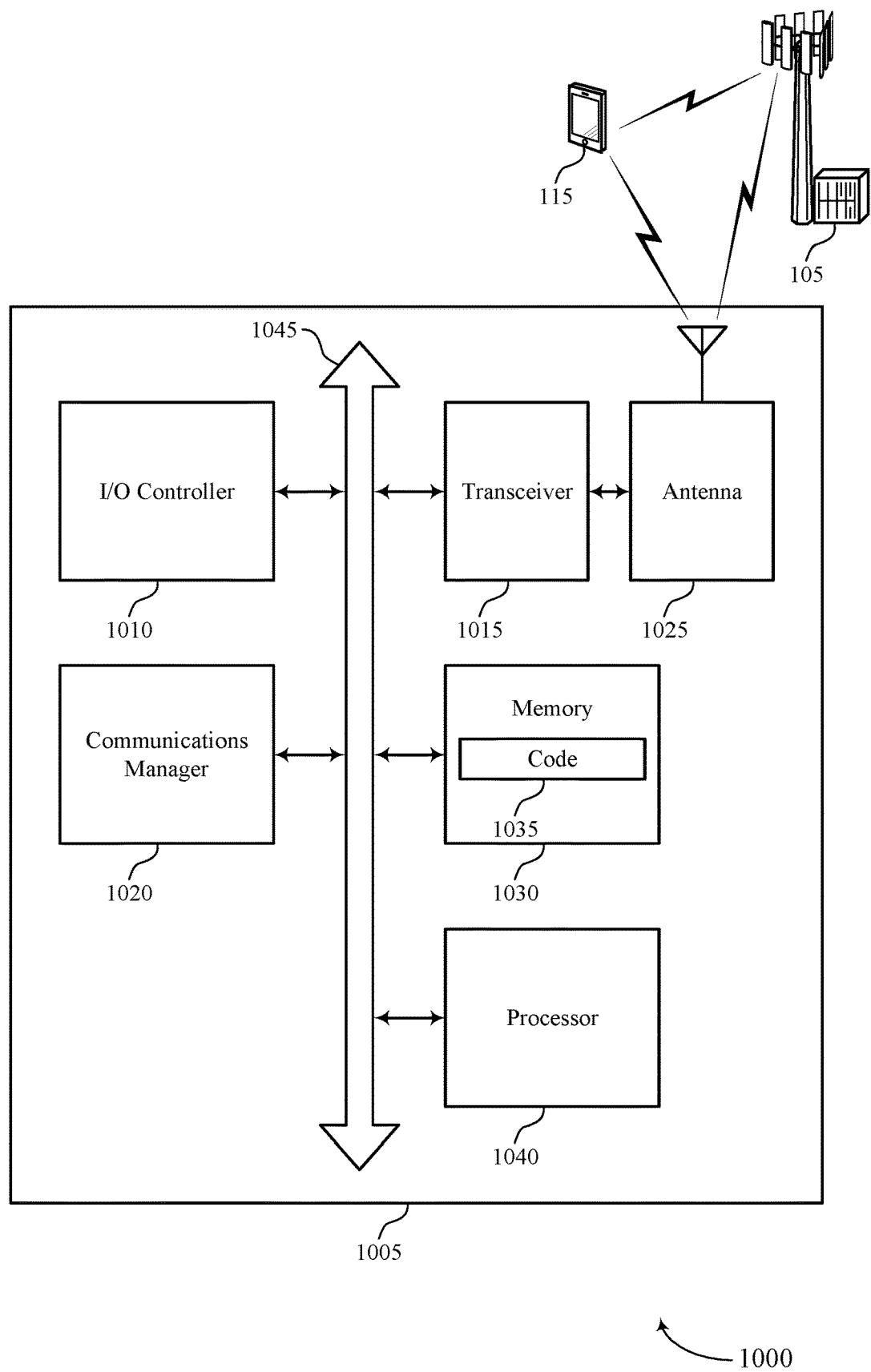
FIG. 10 shows a diagram of a system including a device that supports techniques for TRP and beam selection in ultra-wide bandwidth systems in accordance with aspects of the present disclosure.

FIG. 10 shows a diagram of a system 1000 including a device 1005 that supports techniques for TRP and beam selection in ultra-wide bandwidth systems in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 835, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for TRP and beam selection in ultra-wide bandwidth systems). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a wireless device in accordance with examples as disclosed herein. For example, the communications manager 1020 may be configured as or otherwise support a means for receiving one or more messages indicating respective default operating frequencies for each TRP of a set of multiple TRPs, each of the respective default operating frequencies for communications with the wireless device over different portions of a bandwidth. The communications manager 1020 may be configured as or otherwise support a means for transmitting an indication of a priority of each TRP of the set of multiple TRPs, the priority being based on the respective default operating frequencies for each TRP, where the indication of the priority includes an ordering of the set of multiple TRPs, one or more antenna ports associated with each TRP, one or more beam indices, or any combination thereof. The communications manager 1020 may be configured as or otherwise support a means for selecting, from the set of multiple TRPs, two or more TRPs for joint communications with the wireless device based on the respective default operating frequencies of the two or more TRPs and one or more default operating frequencies of the wireless device. The communications manager 1020 may be configured as or otherwise support a means for transmitting a message indicating the two or more TRPs for the joint communications with the wireless device.

The communications manager 1020 may receive one or more messages indicating respective default operating frequencies for each TRP of a set of TRPs, each of the respective default operating frequencies for communications with the wireless device over different portions of a bandwidth, determine a priority of each TRP of the set of TRPs based on the respective default operating frequencies for each TRP, and transmit an indication of the priority based on the determination, where the indication of the priority includes an ordering of the set of TRPs, one or more antenna ports associated with each TRP, one or more beam indices, or any combination thereof.

The communications manager 1020 may identify respective default operating frequencies for each TRP of a set of TRPs, each of the respective default operating frequencies for communications with the wireless device over different portions of a bandwidth, select, from the set of TRPs, two or more TRPs for joint communications with the wireless device, where the selection is based on the respective default operating frequencies of the two or more TRPs and one or more default operating frequencies of the wireless device, and transmit a message indicating the two or more TRPs for the joint communications with the wireless device.

By including or configuring the communications manager 1020 in accordance with examples as described herein, the device 1005 may support techniques for communicating with one or more TRPs in ultra-wide bandwidth systems based on default operating frequencies. Communications between the device 1005 and other devices with similar default operating frequencies may be associated with reduced beamforming loss, and may be more likely to be successfully received and decoded. Accordingly, the device 1005 may avoid possible retransmissions, thereby experiencing improved throughput and efficiency in the system.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for TRP and beam selection in ultra-wide bandwidth systems as described herein, or the processor 1040 and the memory 1030 may be otherwise configured to perform or support such operations.

Figure 11:
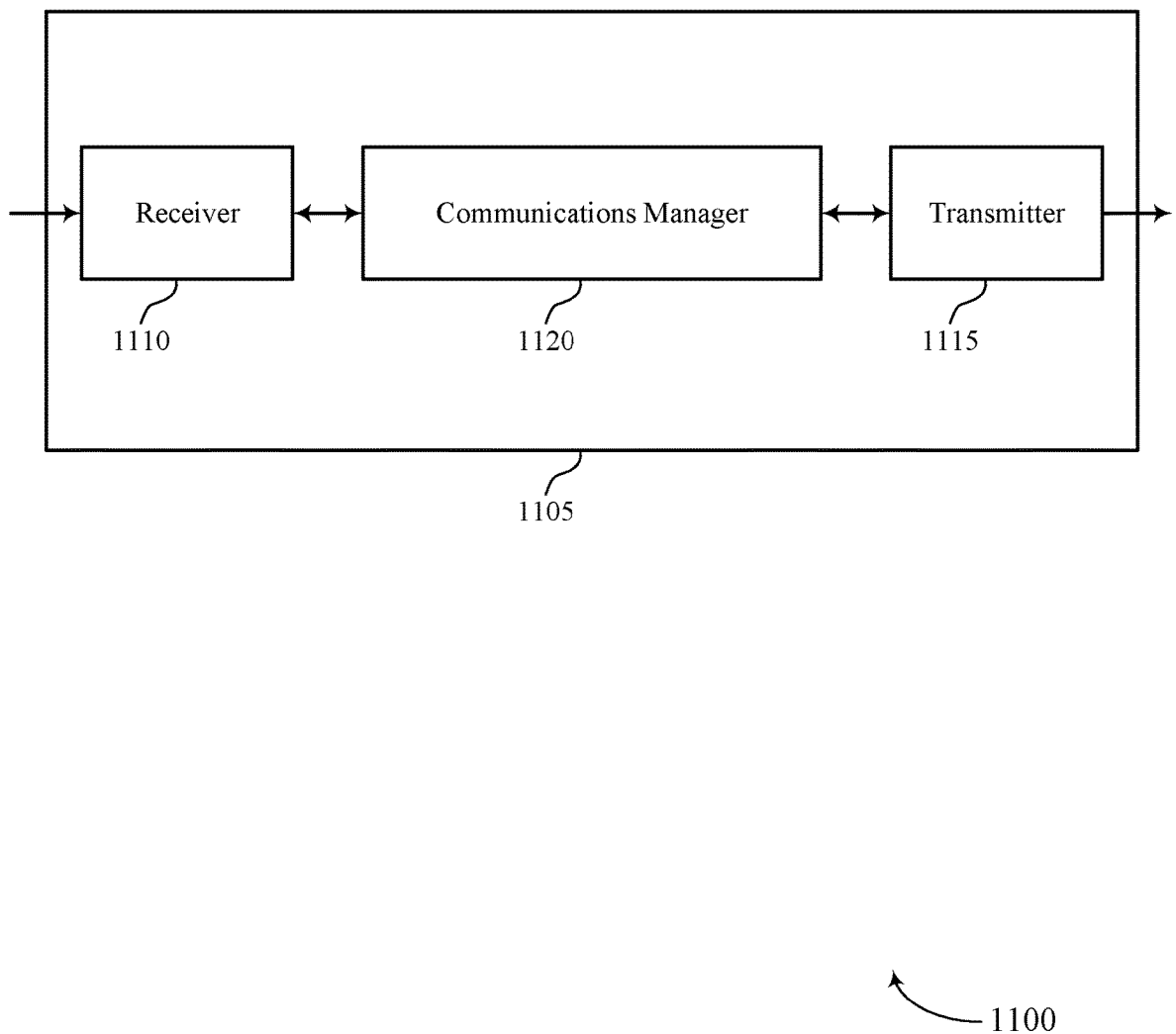
FIGS. 11 and 12 show block diagrams of devices that support techniques for TRP and beam selection in ultra-wide bandwidth systems in accordance with aspects of the present disclosure.

FIG. 11 shows a block diagram 1100 of a device 1105 that supports techniques for TRP and beam selection in ultra-wide bandwidth systems in accordance with aspects of the present disclosure. The device 1105 may be an example of aspects of a base station 105 as described herein. The device 1105 may include a receiver 1110, a transmitter 1115, and a communications manager 1120. The device 1105 may also include one or more processors, memory coupled with the one or more processors, and instructions stored in the memory that are executable by the one or more processors to enable the one or more processors to perform the TRP and beam selection features discussed herein. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for TRP and beam selection in ultra-wide bandwidth systems). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for TRP and beam selection in ultra-wide bandwidth systems). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for TRP and beam selection in ultra-wide bandwidth systems as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to a wireless device, one or more messages indicating respective default operating frequencies for a set of multiple TRPs including at least a first TRP associated with the base station, each of the respective default operating frequencies for communications with the wireless device over portions of a bandwidth. The communications manager 1120 may be configured as or otherwise support a means for receiving, from the wireless device, an indication of a priority of each TRP of the set of multiple TRPs, the priority being based on the respective default operating frequencies for each TRP, where the indication of the priority includes an ordering of the set of multiple TRPs, one or more antenna ports associated with each TRP of the two or more TRPs, one or more beam indices, or any combination thereof. The communications manager 1120 may be configured as or otherwise support a means for receiving, from the wireless device, a message indicating at least the first TRP and a second TRP for joint communications with the wireless device, where the joint communications are based on one or more default operating frequencies of the first TRP, one or more default operating frequencies of the second TRP, and one or more default operating frequencies of the wireless device. The communications manager 1120 may be configured as or otherwise support a means for communicating, in accordance with a configuration corresponding to the joint communications, with the wireless device based on the indication of the priority, the one or more default operating frequencies of the first TRP, the one or more default operating frequencies of the wireless device, or any combination thereof, where the configuration is based on the message indicating at least the first TRP and the second TRP.

In some examples, the communications manager 1120 may transmit, to a wireless device, one or more messages indicating respective default operating frequencies for one or more TRPs, each of the respective default operating frequencies for communications with the wireless device over portions of a bandwidth, receive, from the wireless device, an indication of a priority of two or more TRPs based on the respective default operating frequencies, where the indication of the priority includes an ordering of the two or more TRPs, one or more antenna ports associated with each TRP of the two or more TRPs, one or more beam indices, or any combination thereof, and communicate with the wireless device based on the indication of the priority. The communications manager 1120 may be an example of aspects of the communications manager 1420 described herein.

Additionally or alternatively, the communications manager 1120 may receive, from a wireless device, a message indicating at least the first TRP and a second TRP for joint communications with the wireless device, where the joint communications are based on one or more default operating frequencies of the first TRP, one or more default operating frequencies of the second TRP, and one or more default operating frequencies of the wireless device, determine a configuration for communicating data with the wireless device in accordance with the joint communications based on receiving the message, and communicate with the wireless device over a portion of a bandwidth based on the configuration, the one or more default operating frequencies of the first TRP, and the one or more default operating frequencies of the wireless device.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for communicating with other wireless devices in ultra-wide bandwidth systems based on default operating frequencies. For example, the device 1105 may communicate with other devices that have a default operating frequency similar to that of the device 1105, which may reduce beamforming loss and increase communications reliability and robustness. Increased reliability and robustness may further increase the likelihood that communications between the device 1105 and other devices are successfully received and decoded, which may decrease a number of potential retransmissions. Accordingly, the device 1105 may power off one or more processing units associated with transmitting or decoding monitoring occasions, which may reduce processing and power consumption at the device 1105.

Figure 12:
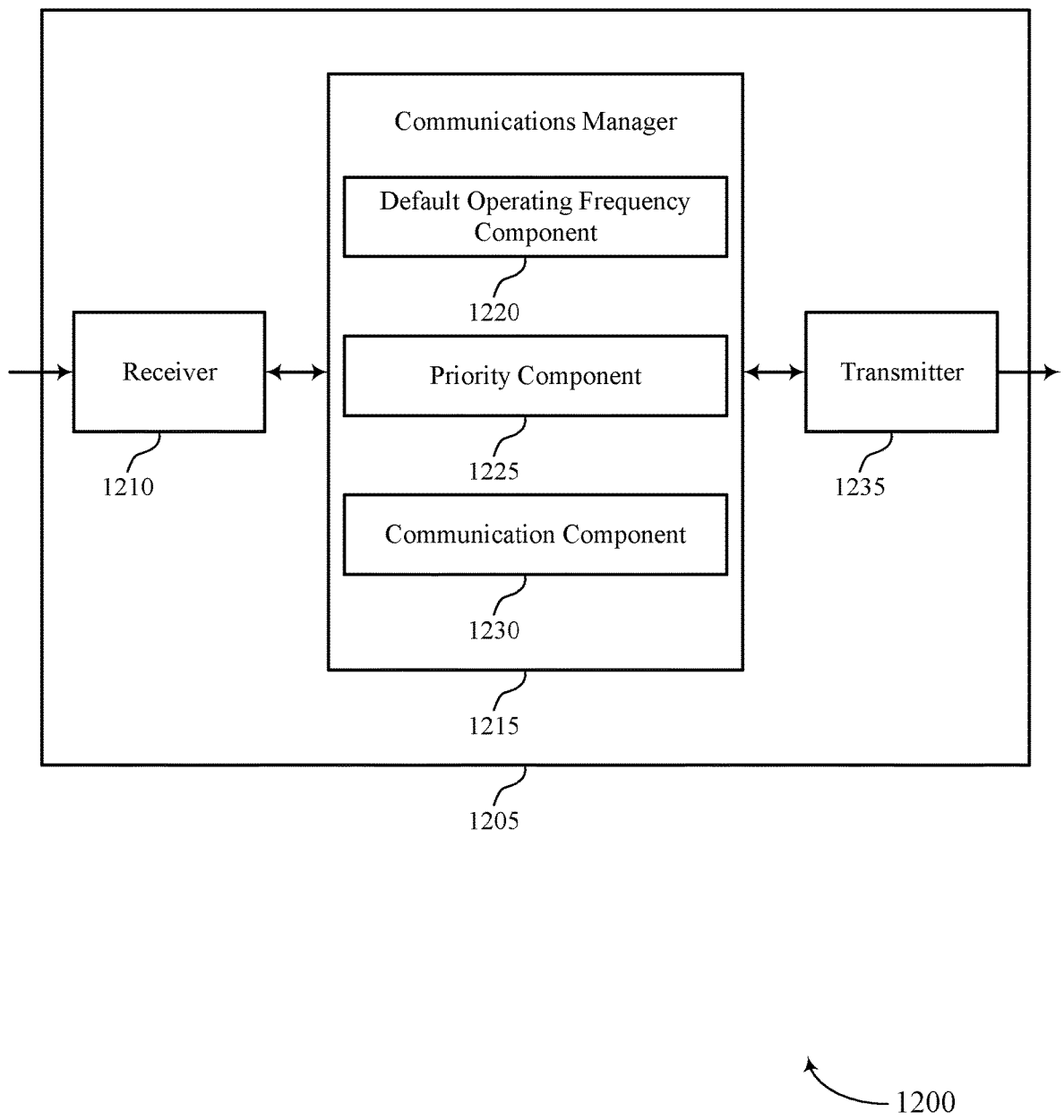

FIG. 12 shows a block diagram 1200 of a device 1205 that supports techniques for TRP and beam selection in ultra-wide bandwidth systems in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for TRP and beam selection in ultra-wide bandwidth systems). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for TRP and beam selection in ultra-wide bandwidth systems). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for TRP and beam selection in ultra-wide bandwidth systems as described herein. For example, the communications manager 1220 may include a default operating frequency component 1225, a priority component 1230, a joint communication component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The default operating frequency component 1225 may be configured as or otherwise support a means for transmitting, to a wireless device, one or more messages indicating respective default operating frequencies for a set of multiple TRPs including at least a first TRP associated with the base station, each of the respective default operating frequencies for communications with the wireless device over portions of a bandwidth. The priority component 1230 may be configured as or otherwise support a means for receiving, from the wireless device, an indication of a priority of each TRP of the set of multiple TRPs, the priority being based on the respective default operating frequencies for each TRP, where the indication of the priority includes an ordering of the set of multiple TRPs, one or more antenna ports associated with each TRP of the two or more TRPs, one or more beam indices, or any combination thereof. The joint communication component 1235 may be configured as or otherwise support a means for receiving, from the wireless device, a message indicating at least the first TRP and a second TRP for joint communications with the wireless device, where the joint communications are based on one or more default operating frequencies of the first TRP, one or more default operating frequencies of the second TRP, one or more default operating frequencies of the wireless device, or any combination thereof. The joint communication component 1235 may be configured as or otherwise support a means for communicating, in accordance with a configuration corresponding to the joint communications, with the wireless device based on the indication of the priority, the one or more default operating frequencies of the first TRP, and the one or more default operating frequencies of the wireless device, where the configuration is based on the message indicating at least the first TRP and the second TRP.

In some cases, the default operating frequency component 1225, a priority component 1230, a joint communication component 1235 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the default operating frequency component 1225, a priority component 1230, a joint communication component 1235 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 13:
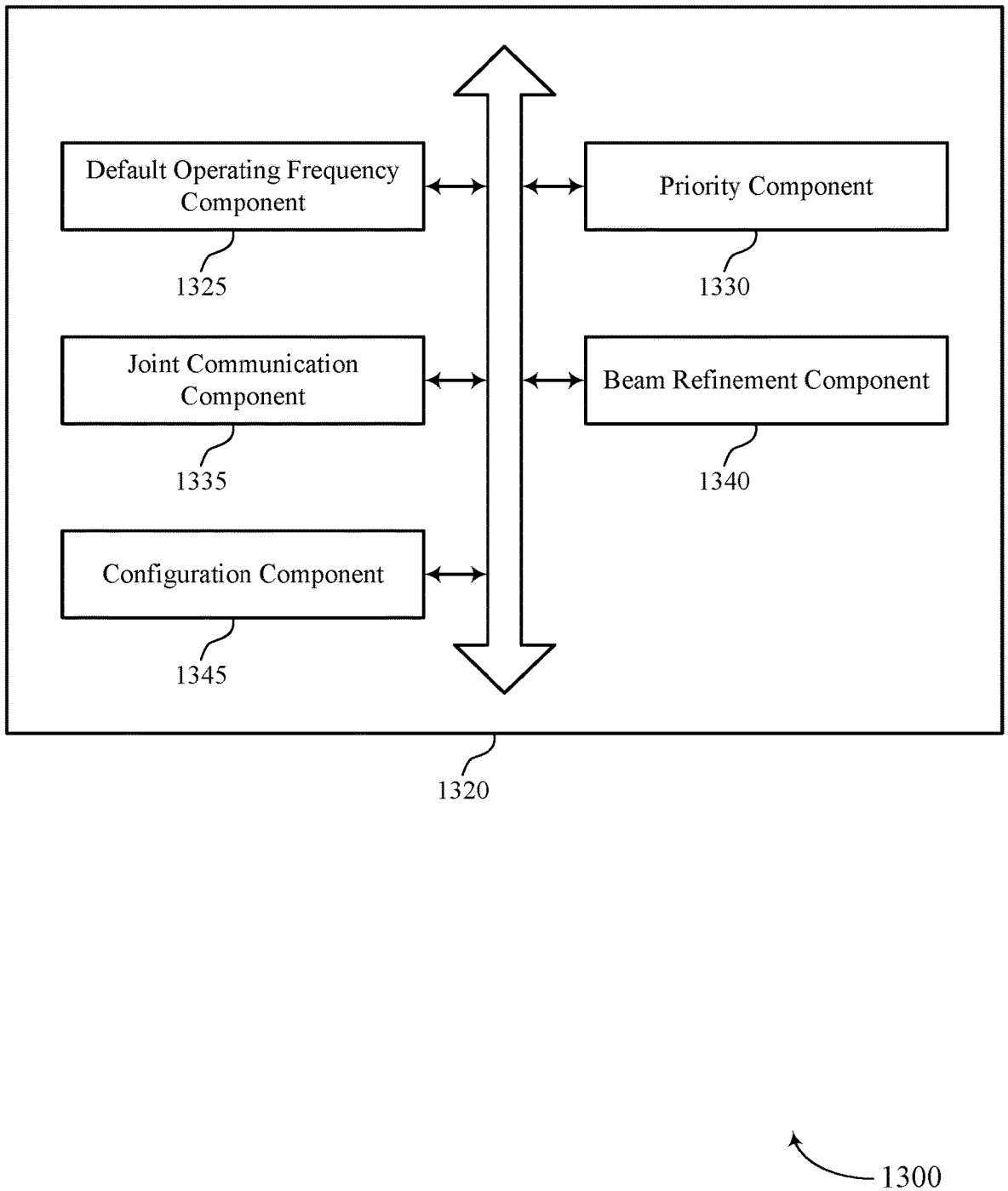
FIG. 13 shows a block diagram of a communications manager that supports techniques for TRP and beam selection in ultra-wide bandwidth systems in accordance with aspects of the present disclosure.

FIG. 13 shows a block diagram 1300 of a communications manager 1320 that supports techniques for TRP and beam selection in ultra-wide bandwidth systems in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for TRP and beam selection in ultra-wide bandwidth systems as described herein. For example, the communications manager 1320 may include a default operating frequency component 1325, a priority component 1330, a joint communication component 1335, a beam refinement component 1340, a configuration component 1345, or any combination thereof. Each of these components may communicate, directly or indirectly, with one another (e.g., via one or more buses).

The communications manager 1320 may support wireless communication at a base station in accordance with examples as disclosed herein. The default operating frequency component 1325 may be configured as or otherwise support a means for transmitting, to a wireless device, one or more messages indicating respective default operating frequencies for a set of multiple TRPs including at least a first TRP associated with the base station, each of the respective default operating frequencies for communications with the wireless device over portions of a bandwidth. The priority component 1330 may be configured as or otherwise support a means for receiving, from the wireless device, an indication of a priority of each TRP of the set of multiple TRPs, the priority being based on the respective default operating frequencies for each TRP, where the indication of the priority includes an ordering of the set of multiple TRPs, one or more antenna ports associated with each TRP of the two or more TRPs, one or more beam indices, or any combination thereof. The joint communication component 1335 may be configured as or otherwise support a means for receiving, from the wireless device, a message indicating at least the first TRP and a second TRP for joint communications with the wireless device, where the joint communications are based on one or more default operating frequencies of the first TRP, one or more default operating frequencies of the second TRP, and one or more default operating frequencies of the wireless device. In some examples, the joint communication component 1335 may be configured as or otherwise support a means for communicating, in accordance with a configuration corresponding to the joint communications, with the wireless device based on the indication of the priority, the one or more default operating frequencies of the first TRP, the one or more default operating frequencies of the wireless device, or any combination thereof, where the configuration is based on the message indicating at least the first TRP and the second TRP.

In some examples, the priority component 1330 may be configured as or otherwise support a means for identifying, from the indication of the priority, a priority of the first TRP, a first antenna port, and a first beam index relative to a second TRP of the set of multiple TRPs, a second antenna port of the second TRP, and a second beam index.

In some examples, the first beam index is based on an SSB, a CSI-RS, a SRS, or any combination thereof.

In some examples, to support transmitting the one or more messages indicating the respective default operating frequencies, the default operating frequency component 1325 may be configured as or otherwise support a means for transmitting, to the wireless device, a message including an indication of one or more default operating frequencies of the first TRP associated with the base station, each of the one or more default operating frequencies corresponding to one or more antenna ports of the first TRP.

In some examples, the priority of the set of multiple TRPs is based on one or more default operating frequencies of the wireless device for the communications over the portions of the bandwidth.

In some examples, each default operating frequency of the one or more default operating frequencies includes a frequency such that substantially half of a wavelength corresponding to the frequency is substantially equal to a spacing between two or more antenna elements of an antenna array of each of the one or more TRPs. In some examples, the spacing between the two or more antenna elements of the antenna array of each of the one or more TRPs is within an upper threshold and a lower threshold that are associated with substantially half of the wavelength of the frequency.

In some examples, to support receiving the indication of the priority, the priority component 1330 may be configured as or otherwise support a means for receiving, from the wireless device, the indication of the priority via a control signaling. In some examples, to support receiving the indication of the priority, the priority component 1330 may be configured as or otherwise support a means for receiving a broadcast message including the indication of the priority.

In some examples, each of the one or more default operating frequencies includes a range of default operating frequencies, the range of default operating frequencies providing beamforming performance that satisfies a performance threshold.

In some examples, the beam refinement component 1340 may be configured as or otherwise support a means for performing one or more beam refinement procedures for communicating with the wireless device based on the indication of the priority.

In some examples, the set of multiple TRPs are associated with the base station. In some examples, the set of multiple TRPs are associated with different base stations.

In some examples, the wireless device includes a UE, or an IAB node, or a CPE, or a sidelink node, or a wireless repeater configured for retransmissions.

In some examples, the configuration component 1345 may be configured as or otherwise support a means for exchanging configuration information for the joint communications with the second TRP, where the configuration is determined based on configuration information exchanged with the second TRP. In some examples, the configuration information is exchanged over a backhaul link between the first TRP and the second transmission reception point.

In some examples, to support communicating with the wireless device, the joint communication component 1335 may be configured as or otherwise support a means for performing joint beamforming with the second TRP for communicating data with the wireless device.

In some examples, to support communicating with the wireless device, the joint communication component 1335 may be configured as or otherwise support a means for receiving, within the message, an indication of a TRP hopping pattern including at least the first TRP and the second TRP. In some examples, to support communicating with the wireless device, the joint communication component 1335 may be configured as or otherwise support a means for communicating with the wireless device in accordance with the TRP hopping pattern.

In some examples, to support receiving the message indicating the first TRP and the second TRP for the joint communications, the joint communication component 1335 may be configured as or otherwise support a means for receiving the message from the wireless device via control signaling. In some examples, the message is received semi-statically during one or more time intervals or dynamically.

In some cases, the default operating frequency component 1325, the priority component 1330, the joint communication component 1335, the beam refinement component 1340, and the configuration component 1345 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the default operating frequency component 1325, the priority component 1330, the joint communication component 1335, the beam refinement component 1340, and the configuration component 1345 as discussed herein.

Figure 14:
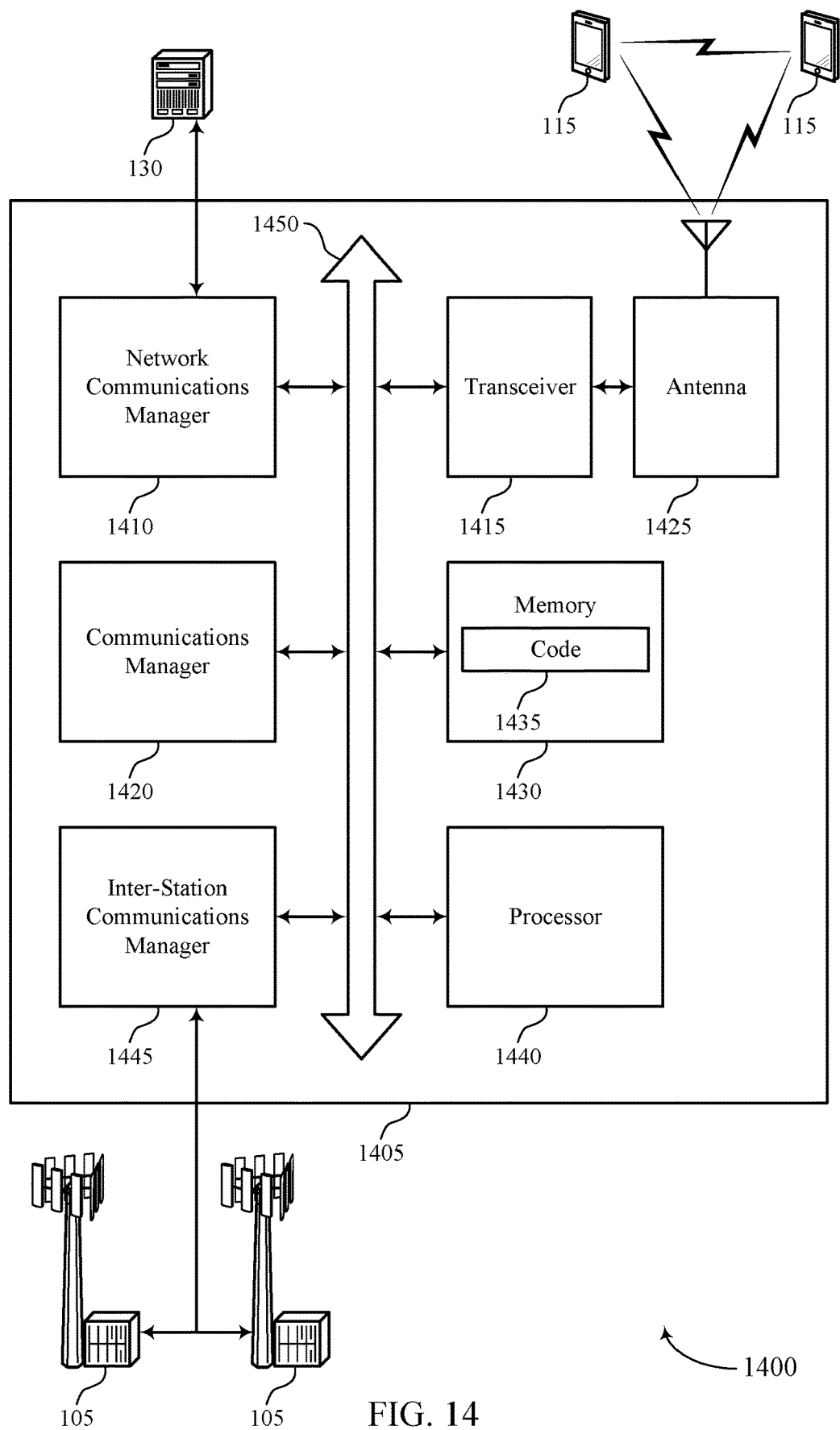
FIG. 14 shows a diagram of a system including a device that supports techniques for TRP and beam selection in ultra-wide bandwidth systems in accordance with aspects of the present disclosure.

FIG. 14 shows a diagram of a system 1400 including a device 1405 that supports techniques for TRP and beam selection in ultra-wide bandwidth systems in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for TRP and beam selection in ultra-wide bandwidth systems). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

In some examples, the communications manager 1420 may transmit, to a wireless device, one or more messages indicating respective default operating frequencies for one or more TRPs, each of the respective default operating frequencies for communications with the wireless device over portions of a bandwidth, receive, from the wireless device, an indication of a priority of two or more TRPs based on the respective default operating frequencies, where the indication of the priority includes an ordering of the two or more TRPs, one or more antenna ports associated with each TRP of the two or more TRPs, one or more beam indices, or any combination thereof, and communicate with the wireless device based on the indication of the priority.

Additionally or alternatively, the communications manager 1420 may receive, from a wireless device, a message indicating at least the first TRP and a second TRP for joint communications with the wireless device, where the joint communications are based on one or more default operating frequencies of the first TRP, one or more default operating frequencies of the second TRP, and one or more default operating frequencies of the wireless device, determine a configuration for communicating data with the wireless device in accordance with the joint communications based on receiving the message, and communicate with the wireless device over a portion of a bandwidth based on the configuration, the one or more default operating frequencies of the first TRP, and the one or more default operating frequencies of the wireless device.

In some examples, the communications manager 1420 may support wireless communication at a base station in accordance with examples as disclosed herein. For example, the communications manager 1420 may be configured as or otherwise support a means for transmitting, to a wireless device, one or more messages indicating respective default operating frequencies for a set of multiple TRPs including at least a first TRP associated with the base station, each of the respective default operating frequencies for communications with the wireless device over portions of a bandwidth. The communications manager 1420 may be configured as or otherwise support a means for receiving, from the wireless device, an indication of a priority of each TRP of the set of multiple TRPs, the priority being based on the respective default operating frequencies for each TRP, where the indication of the priority includes an ordering of the set of multiple TRPs, one or more antenna ports associated with each TRP of the two or more TRPs, one or more beam indices, or any combination thereof. The communications manager 1420 may be configured as or otherwise support a means for receiving, from the wireless device, a message indicating at least the first TRP and a second TRP for joint communications with the wireless device, where the joint communications are based on one or more default operating frequencies of the first TRP, one or more default operating frequencies of the second TRP, and one or more default operating frequencies of the wireless device. The communications manager 1420 may be configured as or otherwise support a means for communicating, in accordance with a configuration corresponding to the joint communications, with the wireless device based on the indication of the priority, the one or more default operating frequencies of the first TRP, the one or more default operating frequencies of the wireless device, or any combination thereof, where the configuration is based on the message indicating at least the first TRP and the second TRP.

By including or configuring the communications manager 1420 in accordance with examples as described herein, the device 1405 may support techniques for communicating with other wireless devices in ultra-wide bandwidth systems based on default operating frequencies. Communications between the device 1405 and other devices with similar default operating frequencies may be associated with reduced beamforming loss, and may be more likely to be successfully received and decoded. Accordingly, the device 1405 may avoid possible retransmissions, thereby experiencing improved throughput and efficiency in the system.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for TRP and beam selection in ultra-wide bandwidth systems as described herein, or the processor 1440 and the memory 1430 may be otherwise configured to perform or support such operations.

Figure 15:
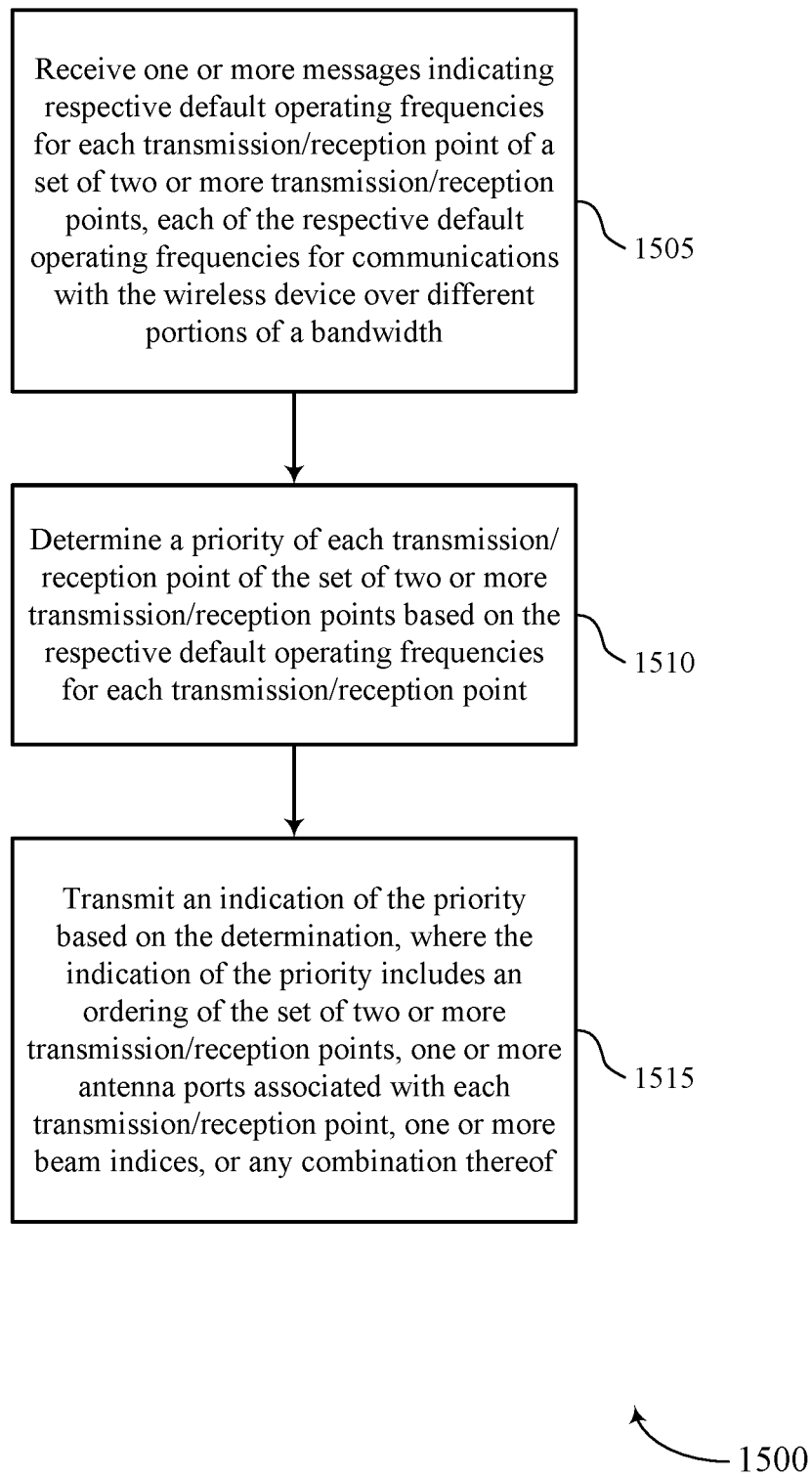
FIGS. 15 through 26 show flowcharts illustrating methods that support techniques for TRP and beam selection in ultra-wide bandwidth systems in accordance with aspects of the present disclosure.

FIG. 15 shows a flowchart illustrating a method 1500 that supports techniques for TRP and beam selection in ultra-wide bandwidth systems in accordance with aspects of the present disclosure. The operations of method 1500 may be implemented by a wireless device or its components as described herein. For example, the operations of method 1500 may be performed by a communications manager as described with reference to FIGS. 7 through 10. In some examples, a wireless device may execute a set of instructions to control the functional elements of the wireless device to perform the functions described below. Additionally or alternatively, a wireless device may perform aspects of the functions described below using special-purpose hardware. In some cases, the wireless device may be an example of a UE 115, a sidelink node, a repeater, or other device.

At 1505, the wireless device may receive one or more messages indicating respective default operating frequencies for each TRP of a set of two or more TRPs, each of the respective default operating frequencies for communications with the wireless device over different portions of a bandwidth. The operations of 1505 may be performed according to the methods described herein. In some examples, aspects of the operations of 1505 may be performed by a default operating frequency manager as described with reference to FIGS. 7 through 10.

At 1510, the wireless device may determine a priority of each TRP of the set of two or more TRPs based on the respective default operating frequencies for each TRP. The operations of 1510 may be performed according to the methods described herein. In some examples, aspects of the operations of 1510 may be performed by a priority manager as described with reference to FIGS. 7 through 10.

At 1515, the wireless device may transmit an indication of the priority based on the determination, where the indication of the priority includes an ordering of the set of two or more TRPs, one or more antenna ports associated with each TRP, one or more beam indices, or any combination thereof. The operations of 1515 may be performed according to the methods described herein. In some examples, aspects of the operations of 1515 may be performed by an indication component as described with reference to FIGS. 7 through 10.

Figure 16:
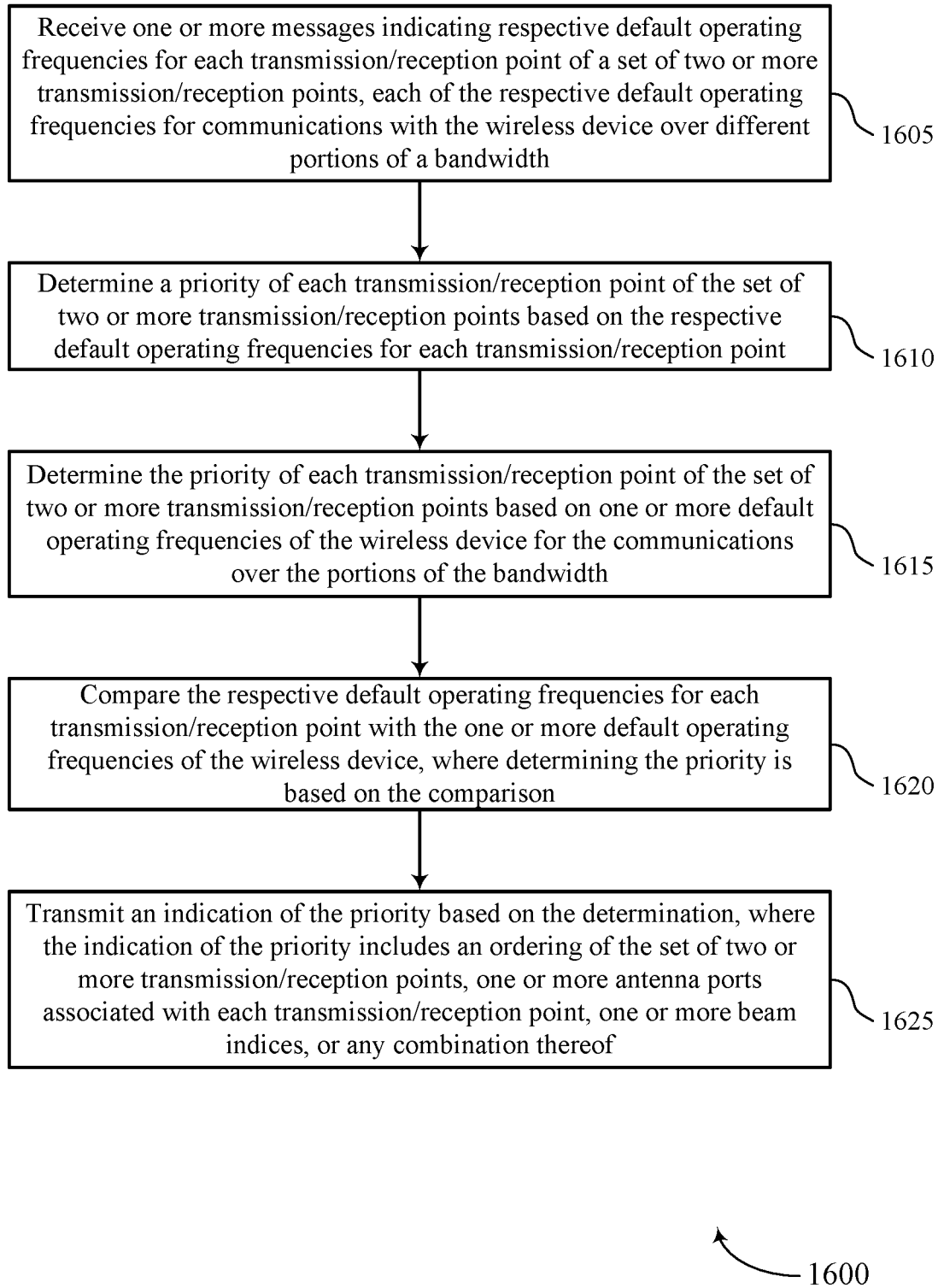

FIG. 16 shows a flowchart illustrating a method 1600 that supports techniques for TRP and beam selection in ultra-wide bandwidth systems in accordance with aspects of the present disclosure. The operations of method 1600 may be implemented by a wireless device or its components as described herein. For example, the operations of method 1600 may be performed by a communications manager as described with reference to FIGS. 7 through 10. In some examples, a wireless device may execute a set of instructions to control the functional elements of the wireless device to perform the functions described below. Additionally or alternatively, a wireless device may perform aspects of the functions described below using special-purpose hardware. In some cases, the wireless device may be an example of a UE 115, a sidelink node, a repeater, or other device.

At 1605, the wireless device may receive one or more messages indicating respective default operating frequencies for each TRP of a set of two or more TRPs, each of the respective default operating frequencies for communications with the wireless device over different portions of a bandwidth. The operations of 1605 may be performed according to the methods described herein. In some examples, aspects of the operations of 1605 may be performed by a default operating frequency manager as described with reference to FIGS. 7 through 10.

At 1610, the wireless device may determine a priority of each TRP of the set of two or more TRPs based on the respective default operating frequencies for each TRP. The operations of 1610 may be performed according to the methods described herein. In some examples, aspects of the operations of 1610 may be performed by a priority manager as described with reference to FIGS. 7 through 10.

At 1615, the wireless device may determine the priority of each TRP of the set of two or more TRPs based on one or more default operating frequencies of the wireless device for the communications over the portions of the bandwidth. The operations of 1615 may be performed according to the methods described herein. In some examples, aspects of the operations of 1615 may be performed by a priority manager as described with reference to FIGS. 7 through 10.

At 1620, the wireless device may compare the respective default operating frequencies for each TRP with the one or more default operating frequencies of the wireless device, where determining the priority is based on the comparison. The operations of 1620 may be performed according to the methods described herein. In some examples, aspects of the operations of 1620 may be performed by a comparison manager as described with reference to FIGS. 7 through 10.

At 1625, the wireless device may transmit an indication of the priority based on the determination, where the indication of the priority includes an ordering of the set of two or more TRPs, one or more antenna ports associated with each TRP, one or more beam indices, or any combination thereof. The operations of 1625 may be performed according to the methods described herein. In some examples, aspects of the operations of 1625 may be performed by an indication component as described with reference to FIGS. 7 through 10.

Figure 17:
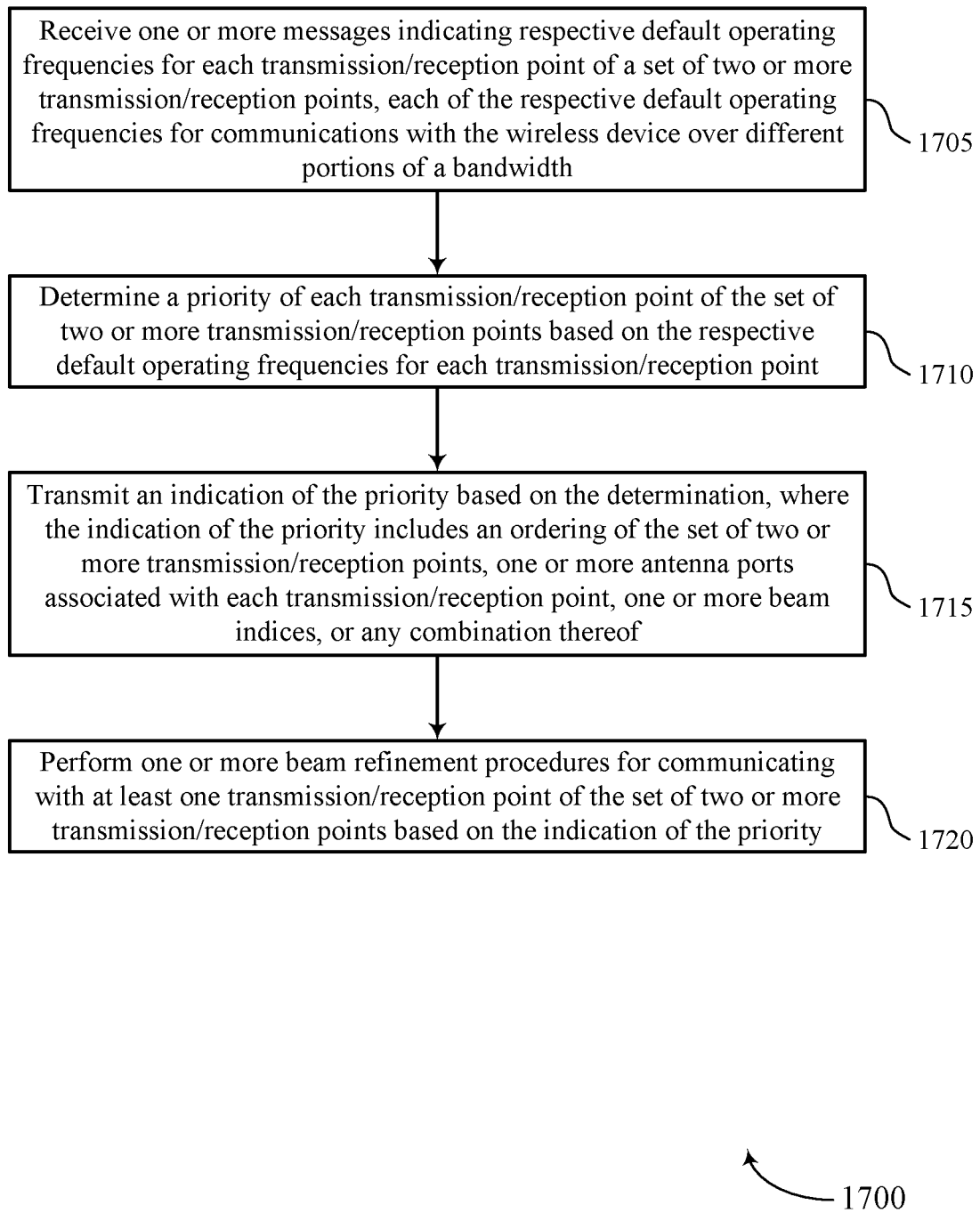

FIG. 17 shows a flowchart illustrating a method 1700 that supports techniques for TRP and beam selection in ultra-wide bandwidth systems in accordance with aspects of the present disclosure. The operations of method 1700 may be implemented by a wireless device or its components as described herein. For example, the operations of method 1700 may be performed by a communications manager as described with reference to FIGS. 7 through 10. In some examples, a wireless device may execute a set of instructions to control the functional elements of the wireless device to perform the functions described below. Additionally or alternatively, a wireless device may perform aspects of the functions described below using special-purpose hardware. In some cases, the wireless device may be an example of a UE 115, a sidelink node, a repeater, or other device.

At 1705, the wireless device may receive one or more messages indicating respective default operating frequencies for each TRP of a set of two or more TRPs, each of the respective default operating frequencies for communications with the wireless device over different portions of a bandwidth. The operations of 1705 may be performed according to the methods described herein. In some examples, aspects of the operations of 1705 may be performed by a default operating frequency manager as described with reference to FIGS. 7 through 10.

At 1710, the wireless device may determine a priority of each TRP of the set of two or more TRPs based on the respective default operating frequencies for each TRP. The operations of 1710 may be performed according to the methods described herein. In some examples, aspects of the operations of 1710 may be performed by a priority manager as described with reference to FIGS. 7 through 10.

At 1715, the wireless device may transmit an indication of the priority based on the determination, where the indication of the priority includes an ordering of the set of two or more TRPs, one or more antenna ports associated with each TRP, one or more beam indices, or any combination thereof. The operations of 1715 may be performed according to the methods described herein. In some examples, aspects of the operations of 1715 may be performed by an indication component as described with reference to FIGS. 7 through 10.

At 1720, the wireless device may perform one or more beam refinement procedures for communicating with at least one TRP of the set of two or more TRPs based on the indication of the priority. The operations of 1720 may be performed according to the methods described herein. In some examples, aspects of the operations of 1720 may be performed by a beam manager as described with reference to FIGS. 7 through 10.

Figure 18:
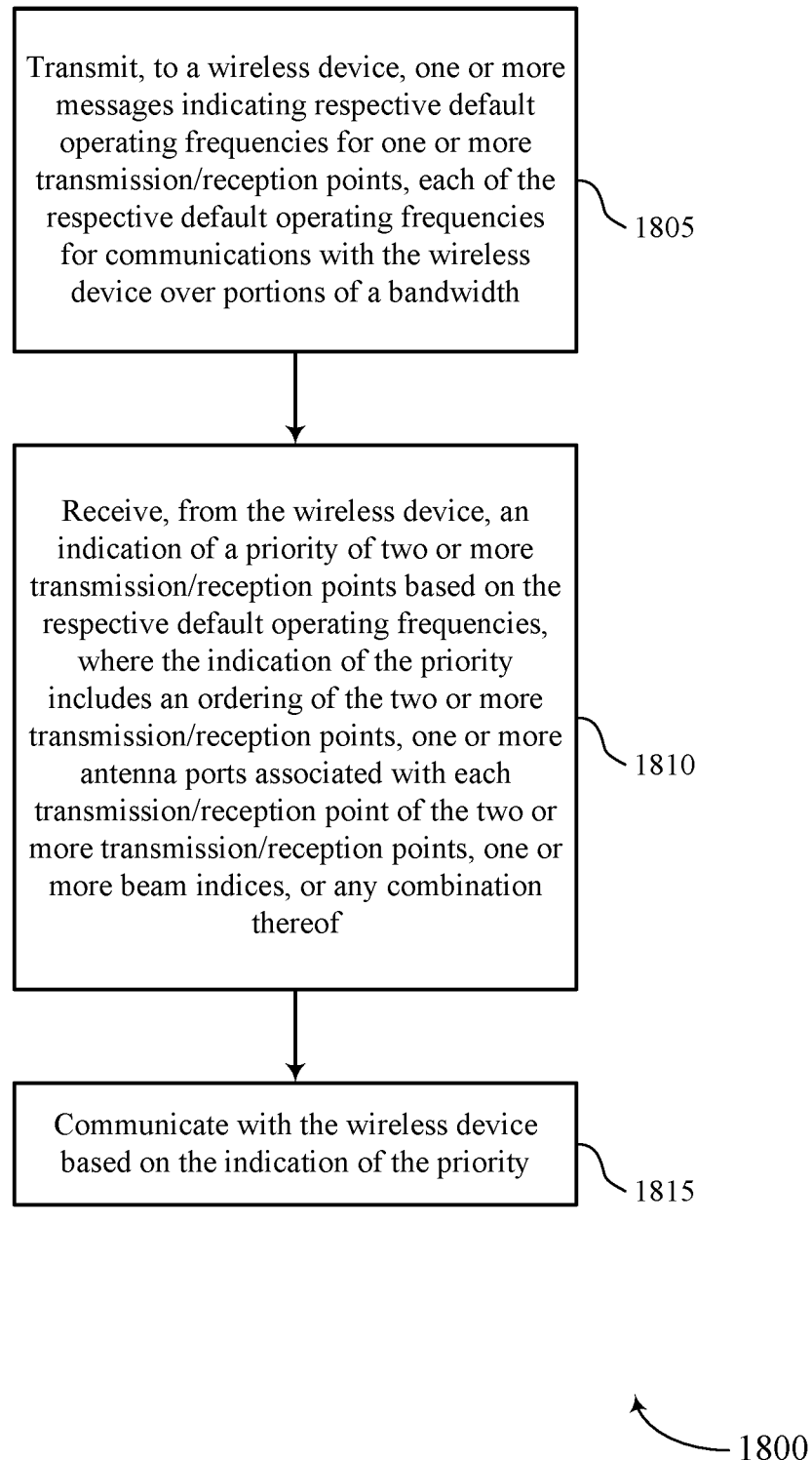

FIG. 18 shows a flowchart illustrating a method 1800 that supports techniques for TRP and beam selection in ultra-wide bandwidth systems in accordance with aspects of the present disclosure. The operations of method 1800 may be implemented by wireless device (e.g., a base station 105, a TRP, an IAB node, or another network device) or its components as described herein. For example, the operations of method 1800 may be performed by a communications manager as described with reference to FIGS. 11 through 14. In some examples, a TRP or base station may execute a set of instructions to control the functional elements of the TRP or base station to perform the functions described below. Additionally or alternatively, a TRP or base station may perform aspects of the functions described below using special-purpose hardware.

At 1805, the base station may transmit, to a wireless device, one or more messages indicating respective default operating frequencies for one or more TRPs, each of the respective default operating frequencies for communications with the wireless device over portions of a bandwidth. The operations of 1805 may be performed according to the methods described herein. In some examples, aspects of the operations of 1805 may be performed by a default operating frequency component as described with reference to FIGS. 11 through 14.

At 1810, the base station may receive, from the wireless device, an indication of a priority of two or more TRPs based on the respective default operating frequencies, where the indication of the priority includes an ordering of the two or more TRPs, one or more antenna ports associated with each TRP of the two or more TRPs, one or more beam indices, or any combination thereof. The operations of 1810 may be performed according to the methods described herein. In some examples, aspects of the operations of 1810 may be performed by a priority component as described with reference to FIGS. 11 through 14.

At 1815, the base station may communicate with the wireless device based on the indication of the priority. The operations of 1815 may be performed according to the methods described herein. In some examples, aspects of the operations of 1815 may be performed by a joint communication component as described with reference to FIGS. 11 through 14.

Figure 19:
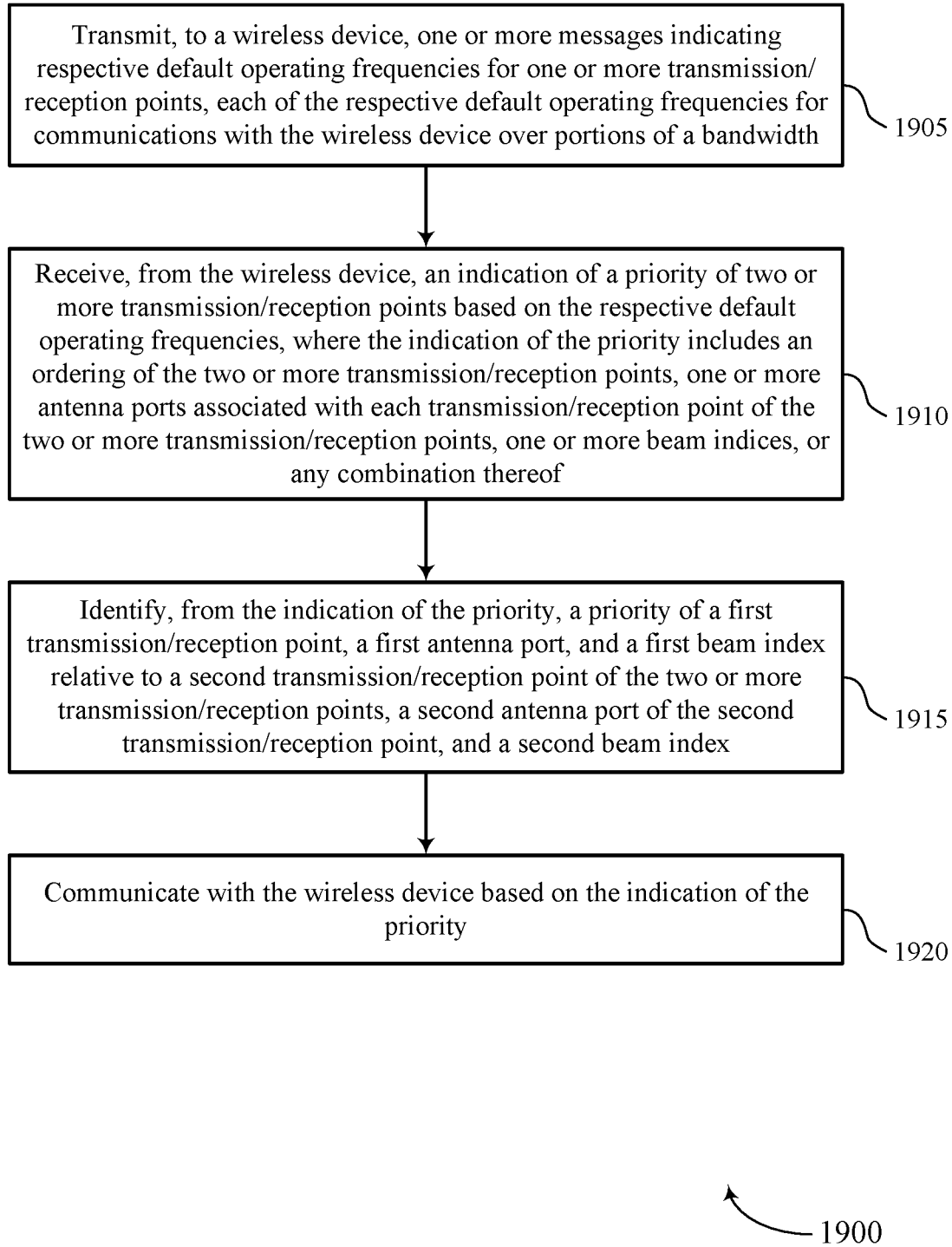

FIG. 19 shows a flowchart illustrating a method 1900 that supports techniques for TRP and beam selection in ultra-wide bandwidth systems in accordance with aspects of the present disclosure. The operations of method 1900 may be implemented by wireless device (e.g., a base station 105, a TRP, an IAB node, or another network device) or its components as described herein. For example, the operations of method 1900 may be performed by a communications manager as described with reference to FIGS. 11 through 14. In some examples, a TRP or base station may execute a set of instructions to control the functional elements of the TRP or base station to perform the functions described below. Additionally or alternatively, a TRP or base station may perform aspects of the functions described below using special-purpose hardware.

At 1905, the TRP may transmit, to a wireless device, one or more messages indicating respective default operating frequencies for one or more TRPs, each of the respective default operating frequencies for communications with the wireless device over portions of a bandwidth. The operations of 1905 may be performed according to the methods described herein. In some examples, aspects of the operations of 1905 may be performed by a default operating frequency component as described with reference to FIGS. 11 through 14.

At 1910, the TRP may receive, from the wireless device, an indication of a priority of two or more TRPs based on the respective default operating frequencies, where the indication of the priority includes an ordering of the two or more TRPs, one or more antenna ports associated with each TRP of the two or more TRPs, one or more beam indices, or any combination thereof. The operations of 1910 may be performed according to the methods described herein. In some examples, aspects of the operations of 1910 may be performed by a priority component as described with reference to FIGS. 11 through 14.

At 1915, the TRP may identify, from the indication of the priority, a priority of a first TRP, a first antenna port, and a first beam index relative to a second TRP of the two or more TRPs, a second antenna port of the second TRP, and a second beam index. The operations of 1915 may be performed according to the methods described herein. In some examples, aspects of the operations of 1915 may be performed by a priority component as described with reference to FIGS. 11 through 14.

At 1920, the TRP may communicate with the wireless device based on the indication of the priority. The operations of 1920 may be performed according to the methods described herein. In some examples, aspects of the operations of 1920 may be performed by a joint communication component as described with reference to FIGS. 11 through 14.

Figure 20:
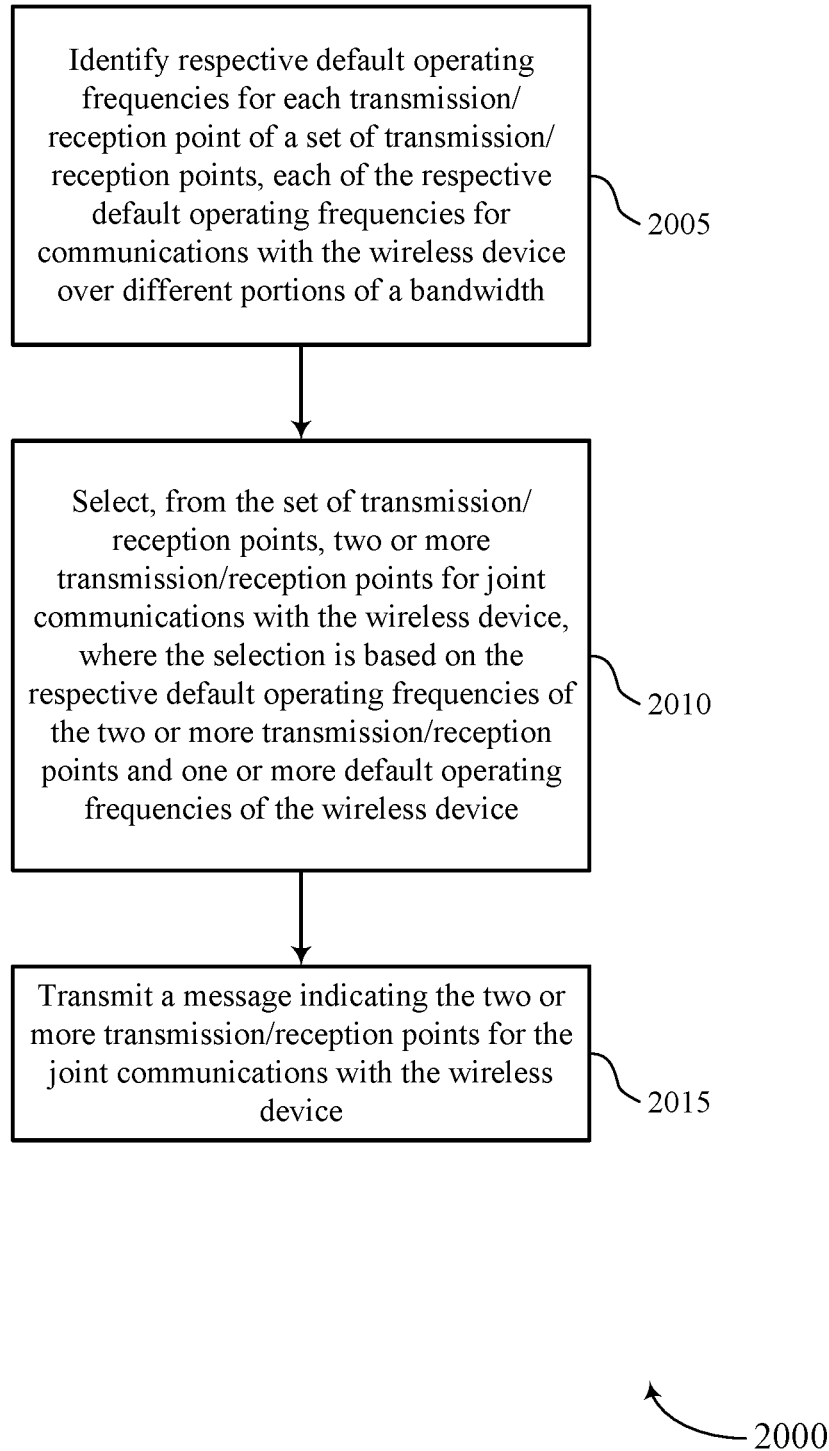

FIG. 20 shows a flowchart illustrating a method 2000 that supports techniques for TRP and beam selection in ultra-wide bandwidth systems in accordance with aspects of the present disclosure. The operations of method 2000 may be implemented by a wireless device or its components as described herein. For example, the operations of method 2000 may be performed by a communications manager as described with reference to FIGS. 7 through 10. In some examples, a wireless device may execute a set of instructions to control the functional elements of the wireless device to perform the functions described below. Additionally or alternatively, a wireless device may perform aspects of the functions described below using special-purpose hardware. In some cases, the wireless device may be an example of a UE 115, a sidelink node, a repeater, or other device.

At 2005, the wireless device may identify respective default operating frequencies for each TRP of a set of TRPs, each of the respective default operating frequencies for communications with the wireless device over different portions of a bandwidth. The operations of 2005 may be performed according to the methods described herein. In some examples, aspects of the operations of 2005 may be performed by a default operating frequency manager as described with reference to FIGS. 7 through 10.

At 2010, the wireless device may select, from the set of TRPs, two or more TRPs for joint communications with the wireless device, where the selection is based on the respective default operating frequencies of the two or more TRPs and one or more default operating frequencies of the wireless device. The operations of 2010 may be performed according to the methods described herein. In some examples, aspects of the operations of 2010 may be performed by a joint communications manager as described with reference to FIGS. 7 through 10.

At 2015, the wireless device may transmit a message indicating the two or more TRPs for the joint communications with the wireless device. The operations of 2015 may be performed according to the methods described herein. In some examples, aspects of the operations of 2015 may be performed by an indication component as described with reference to FIGS. 7 through 10.

Figure 21:
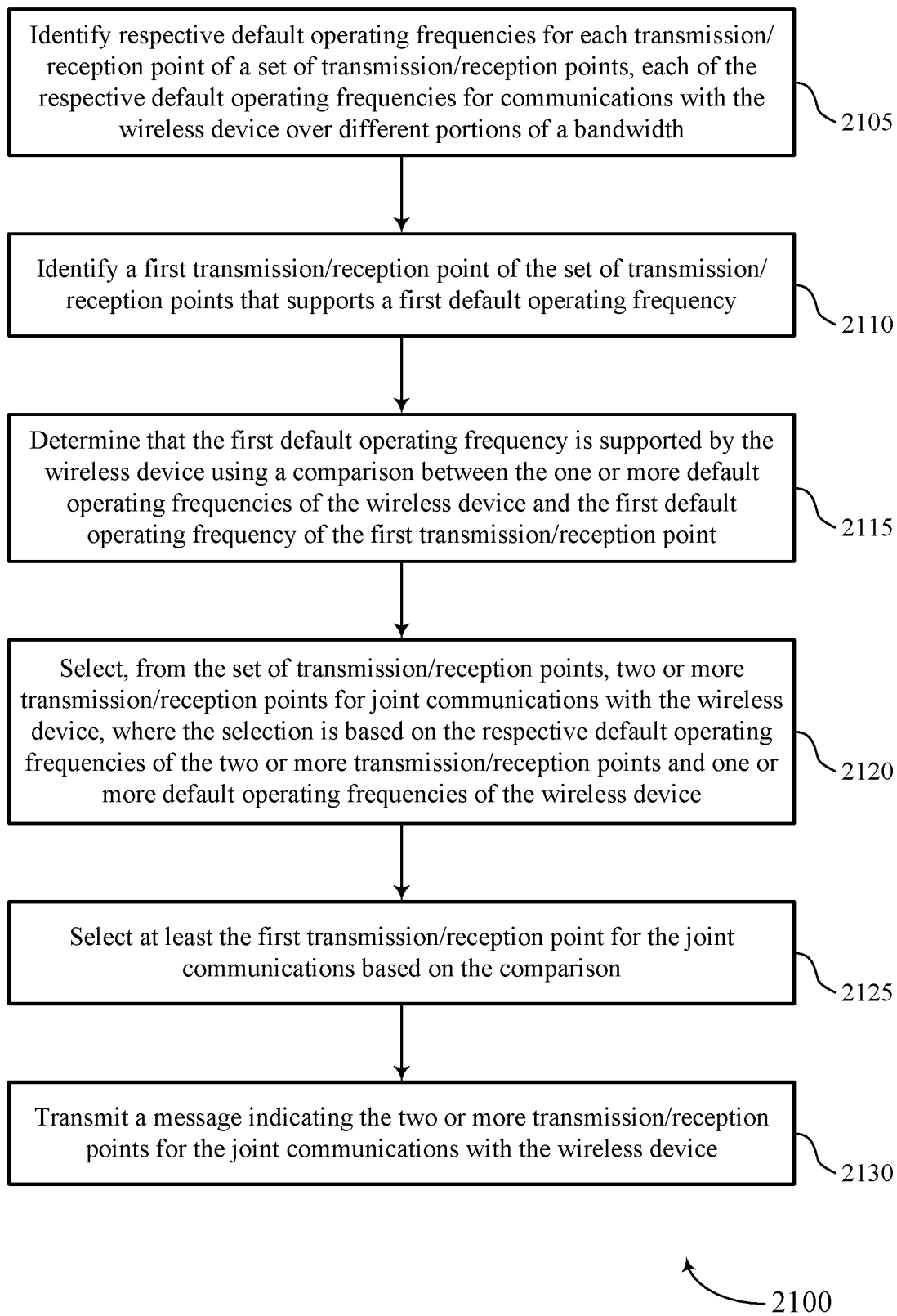

FIG. 21 shows a flowchart illustrating a method 2100 that supports techniques for TRP and beam selection in ultra-wide bandwidth systems in accordance with aspects of the present disclosure. The operations of method 2100 may be implemented by a wireless device or its components as described herein. For example, the operations of method 2100 may be performed by a communications manager as described with reference to FIGS. 7 through 10. In some examples, a wireless device may execute a set of instructions to control the functional elements of the wireless device to perform the functions described below. Additionally or alternatively, a wireless device may perform aspects of the functions described below using special-purpose hardware. In some cases, the wireless device may be an example of a UE 115, a sidelink node, a repeater, or other device.

At 2105, the wireless device may identify respective default operating frequencies for each TRP of a set of TRPs, each of the respective default operating frequencies for communications with the wireless device over different portions of a bandwidth. The operations of 2105 may be performed according to the methods described herein. In some examples, aspects of the operations of 2105 may be performed by a default operating frequency manager as described with reference to FIGS. 7 through 10.

At 2110, the wireless device may identify a first TRP of the set of TRPs that supports a first default operating frequency. The operations of 2110 may be performed according to the methods described herein. In some examples, aspects of the operations of 2110 may be performed by a TRP manager as described with reference to FIGS. 7 through 10.

At 2115, the wireless device may determine that the first default operating frequency is supported by the wireless device using a comparison between the one or more default operating frequencies of the wireless device and the first default operating frequency of the first TRP. The operations of 2115 may be performed according to the methods described herein. In some examples, aspects of the operations of 2115 may be performed by a default operating frequency manager as described with reference to FIGS. 7 through 10.

At 2120, the wireless device may select, from the set of TRPs, two or more TRPs for joint communications with the wireless device, where the selection is based on the respective default operating frequencies of the two or more TRPs and one or more default operating frequencies of the wireless device. The operations of 2120 may be performed according to the methods described herein. In some examples, aspects of the operations of 2120 may be performed by a joint communications manager as described with reference to FIGS. 7 through 10.

At 2125, the wireless device may select at least the first TRP for the joint communications based on the comparison. The operations of 2125 may be performed according to the methods described herein. In some examples, aspects of the operations of 2125 may be performed by a joint communications manager as described with reference to FIGS. 7 through 10.

At 2130, the wireless device may transmit a message indicating the two or more TRPs for the joint communications with the wireless device. The operations of 2130 may be performed according to the methods described herein. In some examples, aspects of the operations of 2130 may be performed by an indication component as described with reference to FIGS. 7 through 10.

Figure 22:
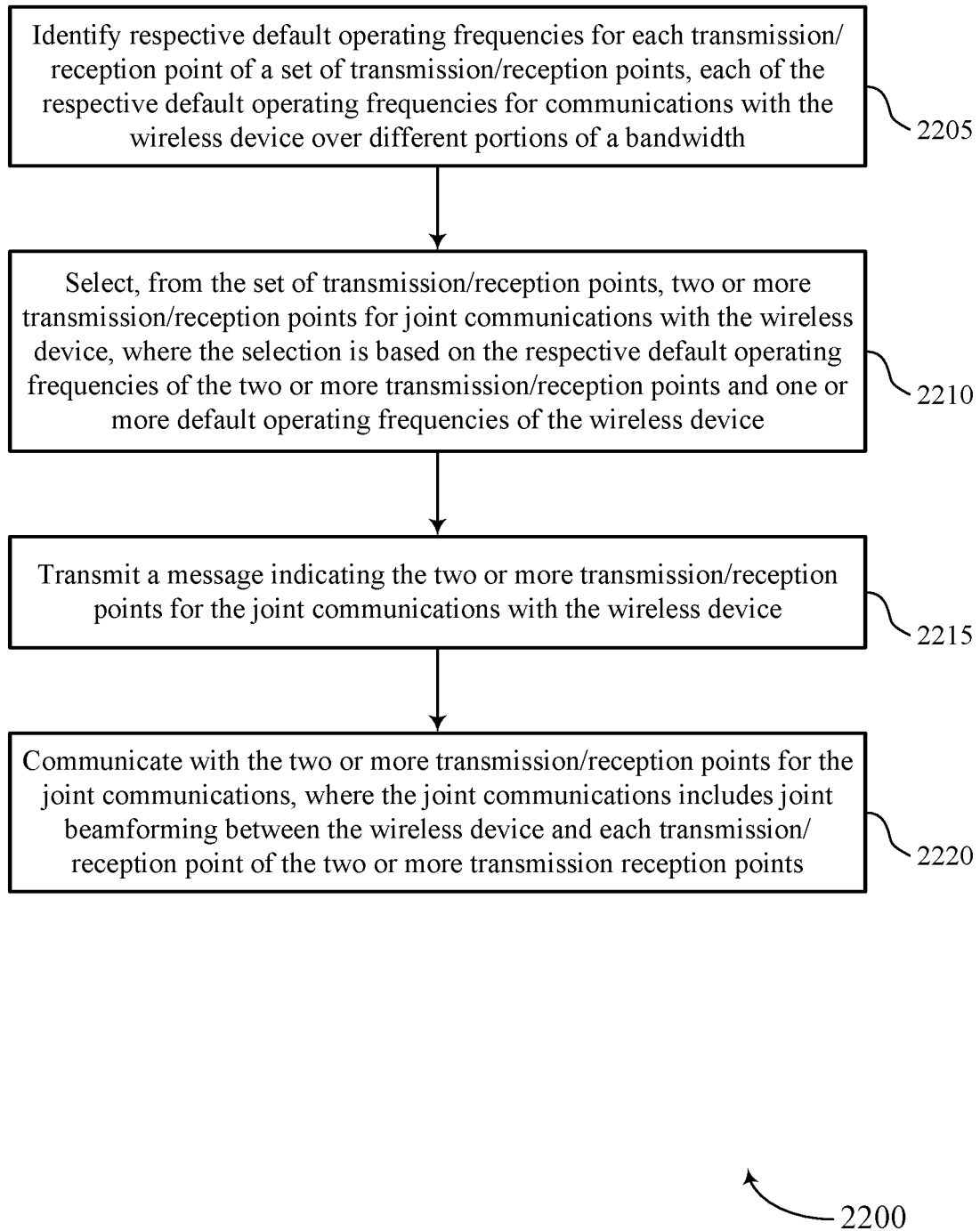

FIG. 22 shows a flowchart illustrating a method 2200 that supports techniques for TRP and beam selection in ultra-wide bandwidth systems in accordance with aspects of the present disclosure. The operations of method 2200 may be implemented by wireless device or its components as described herein. For example, the operations of method 2200 may be performed by a communications manager as described with reference to FIGS. 7 through 10. In some examples, a wireless device may execute a set of instructions to control the functional elements of the wireless device to perform the functions described below. Additionally or alternatively, a wireless device may perform aspects of the functions described below using special-purpose hardware. In some cases, the wireless device may be an example of a UE 115, a sidelink node, a repeater, or other device.

At 2205, the wireless device may identify respective default operating frequencies for each TRP of a set of TRPs, each of the respective default operating frequencies for communications with the wireless device over different portions of a bandwidth. The operations of 2205 may be performed according to the methods described herein. In some examples, aspects of the operations of 2205 may be performed by a default operating frequency manager as described with reference to FIGS. 7 through 10.

At 2210, the wireless device may select, from the set of TRPs, two or more TRPs for joint communications with the wireless device, where the selection is based on the respective default operating frequencies of the two or more TRPs and one or more default operating frequencies of the wireless device. The operations of 2210 may be performed according to the methods described herein. In some examples, aspects of the operations of 2210 may be performed by a joint communications manager as described with reference to FIGS. 7 through 10.

At 1515, the wireless device may transmit a message indicating the two or more TRPs for the joint communications with the wireless device. The operations of 2215 may be performed according to the methods described herein. In some examples, aspects of the operations of 2215 may be performed by an indication component as described with reference to FIGS. 7 through 10.

At 2220, the wireless device may communicate with the two or more TRPs for the joint communications, where the joint communications includes joint beamforming between the wireless device and each TRP of the two or more transmission reception points. The operations of 2220 may be performed according to the methods described herein. In some examples, aspects of the operations of 2220 may be performed by a communication component as described with reference to FIGS. 7 through 10.

Figure 23:
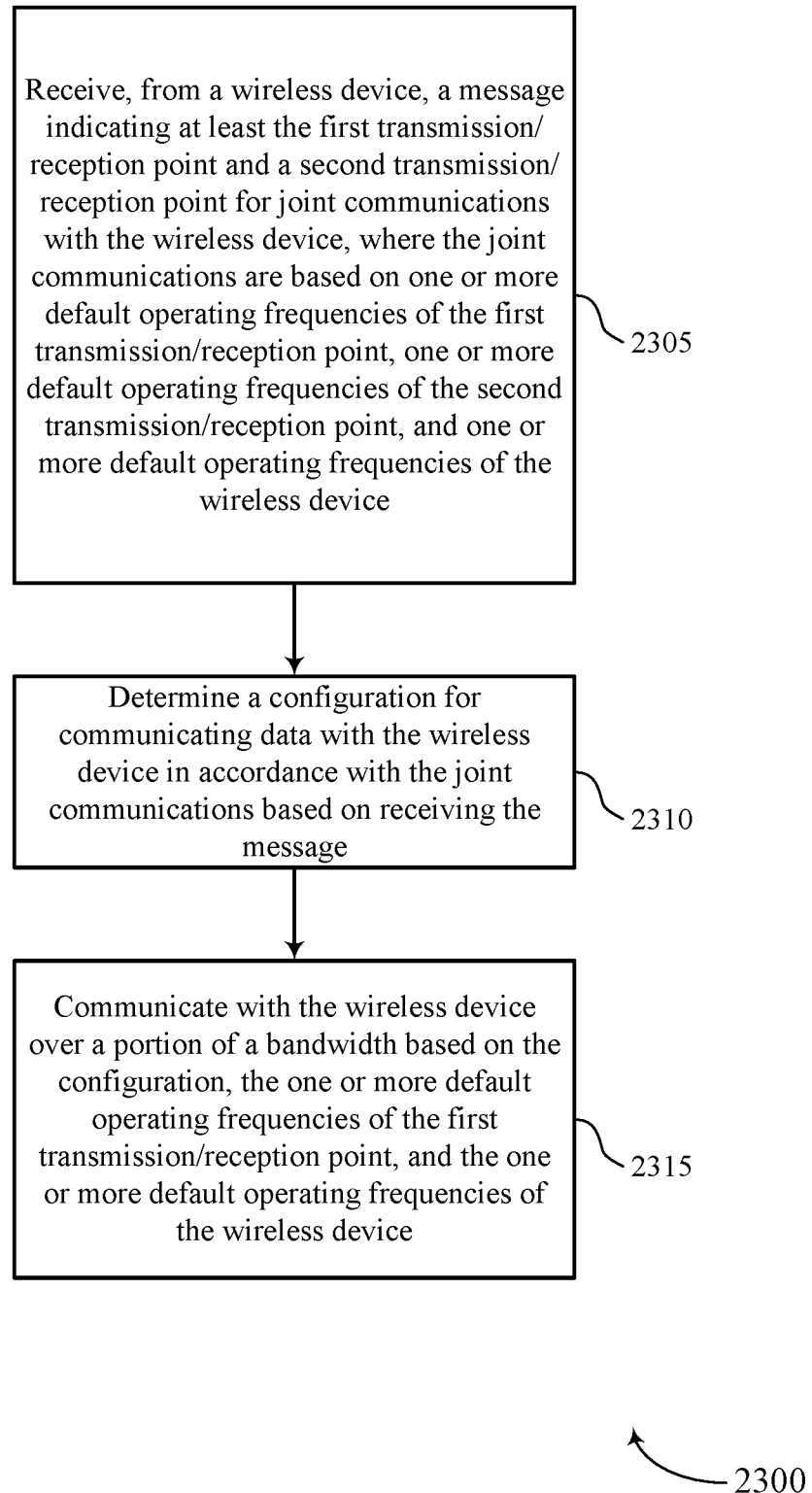

FIG. 23 shows a flowchart illustrating a method 2300 that supports techniques for TRP and beam selection in ultra-wide bandwidth systems in accordance with aspects of the present disclosure. The operations of method 2300 may be implemented by wireless device (e.g., a base station 105, a first TRP, an IAB node, or another network device) or its components as described herein. For example, the operations of method 2300 may be performed by a communications manager as described with reference to FIGS. 11 through 14. In some examples, a first TRP may execute a set of instructions to control the functional elements of the first TRP to perform the functions described below. Additionally or alternatively, a first TRP may perform aspects of the functions described below using special-purpose hardware.

At 2305, the first TRP may receive, from a wireless device, a message indicating at least the first TRP and a second TRP for joint communications with the wireless device, where the joint communications are based on one or more default operating frequencies of the first TRP, one or more default operating frequencies of the second TRP, and one or more default operating frequencies of the wireless device. The operations of 2305 may be performed according to the methods described herein. In some examples, aspects of the operations of 2305 may be performed by a default operating frequency component as described with reference to FIGS. 11 through 14.

At 2310, the first TRP may determine a configuration for communicating data with the wireless device in accordance with the joint communications based on receiving the message. The operations of 2310 may be performed according to the methods described herein. In some examples, aspects of the operations of 2310 may be performed by a configuration component as described with reference to FIGS. 11 through 14.

At 2315, the first TRP may communicate with the wireless device over a portion of a bandwidth based on the configuration, the one or more default operating frequencies of the first TRP, and the one or more default operating frequencies of the wireless device. The operations of 2315 may be performed according to the methods described herein. In some examples, aspects of the operations of 2315 may be performed by a joint communications component as described with reference to FIGS. 11 through 14.

Figure 24:
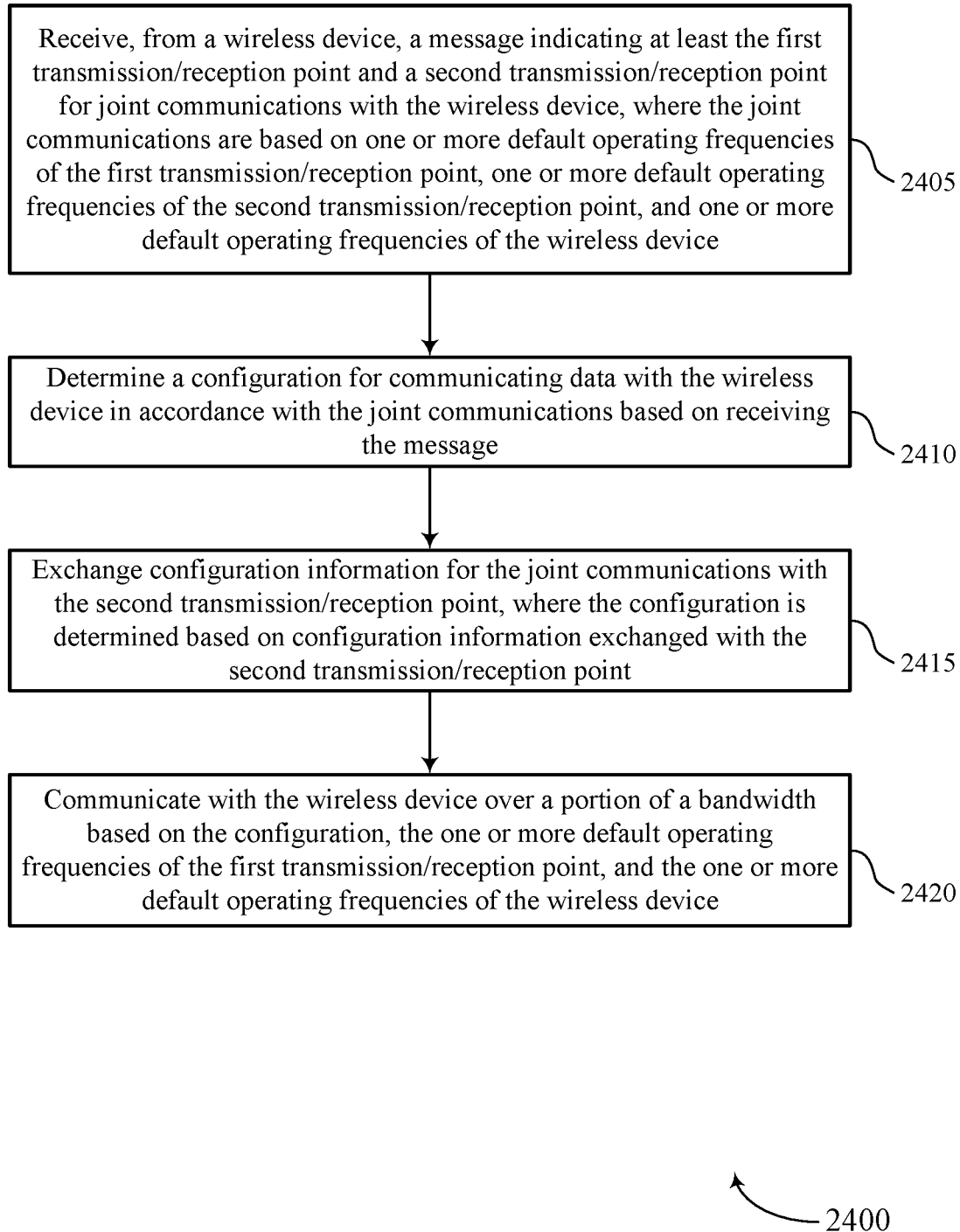

FIG. 24 shows a flowchart illustrating a method 2400 that supports techniques for TRP and beam selection in ultra-wide bandwidth systems in accordance with aspects of the present disclosure. The operations of method 2400 may be implemented by wireless device (e.g., a base station 105, a first TRP, an IAB node, or another network device) or its components as described herein. For example, the operations of method 2400 may be performed by a communications manager as described with reference to FIGS. 11 through 14. In some examples, a first TRP may execute a set of instructions to control the functional elements of the first TRP to perform the functions described below. Additionally or alternatively, a first TRP may perform aspects of the functions described below using special-purpose hardware.

At 2405, the first TRP may receive, from a wireless device, a message indicating at least the first TRP and a second TRP for joint communications with the wireless device, where the joint communications are based on one or more default operating frequencies of the first TRP, one or more default operating frequencies of the second TRP, and one or more default operating frequencies of the wireless device. The operations of 2405 may be performed according to the methods described herein. In some examples, aspects of the operations of 2405 may be performed by a default operating frequency component as described with reference to FIGS. 11 through 14.

At 2410, the first TRP may determine a configuration for communicating data with the wireless device in accordance with the joint communications based on receiving the message. The operations of 2410 may be performed according to the methods described herein. In some examples, aspects of the operations of 2410 may be performed by a configuration component as described with reference to FIGS. 11 through 14.

At 2415, the first TRP may exchange configuration information for the joint communications with the second TRP, where the configuration is determined based on configuration information exchanged with the second TRP. The operations of 2415 may be performed according to the methods described herein. In some examples, aspects of the operations of 2415 may be performed by a configuration component as described with reference to FIGS. 11 through 14.

At 2420, the first TRP may communicate with the wireless device over a portion of a bandwidth based on the configuration, the one or more default operating frequencies of the first TRP, and the one or more default operating frequencies of the wireless device. The operations of 2420 may be performed according to the methods described herein. In some examples, aspects of the operations of 2420 may be performed by a joint communications component as described with reference to FIGS. 11 through 14.

Figure 25:
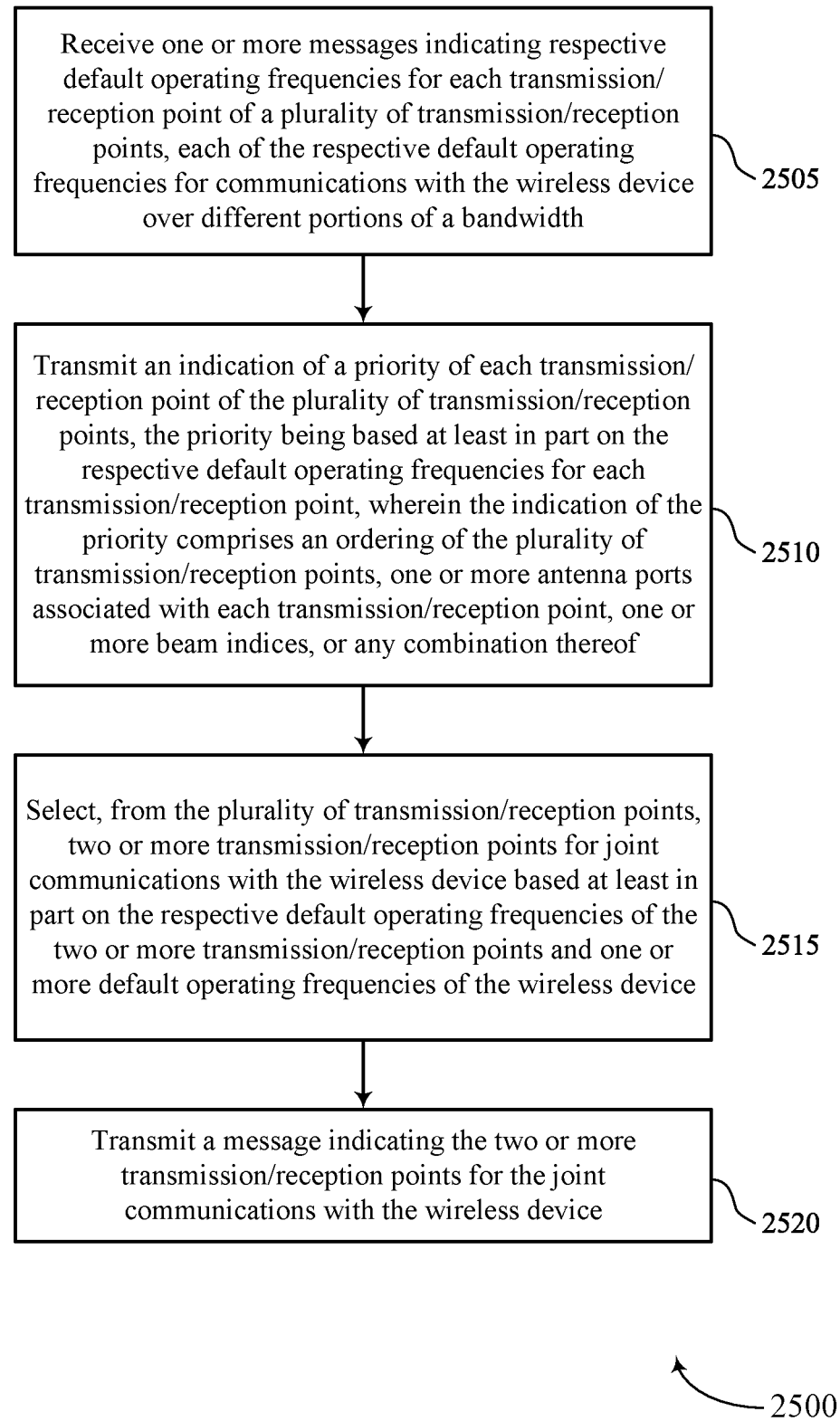

FIG. 25 shows a flowchart illustrating a method 2500 that supports techniques for TRP and beam selection in ultra-wide bandwidth systems in accordance with aspects of the present disclosure. The operations of the method 2500 may be implemented by a UE or its components as described herein. For example, the operations of the method 2500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 2505, the method may include receiving one or more messages indicating respective default operating frequencies for each TRP of a set of multiple TRPs, each of the respective default operating frequencies for communications with the wireless device over different portions of a bandwidth. The operations of 2505 may be performed in accordance with examples as disclosed herein. In some examples, aspects of the operations of 2505 may be performed by a default operating frequency manager 925 as described with reference to FIG. 9.

At 2510, the method may include transmitting an indication of a priority of each TRP of the set of multiple TRPs, the priority being based on the respective default operating frequencies for each TRP, where the indication of the priority includes an ordering of the set of multiple TRPs, one or more antenna ports associated with each TRP, one or more beam indices, or any combination thereof. The operations of 2510 may be performed in accordance with examples as disclosed herein. In some examples, aspects of the operations of 2510 may be performed by a priority manager 930 as described with reference to FIG. 9.

At 2515, the method may include selecting, from the set of multiple TRPs, two or more TRPs for joint communications with the wireless device based on the respective default operating frequencies of the two or more TRPs and one or more default operating frequencies of the wireless device. The operations of 2515 may be performed in accordance with examples as disclosed herein. In some examples, aspects of the operations of 2515 may be performed by a joint communications manager 935 as described with reference to FIG. 9.

At 2520, the method may include transmitting a message indicating the two or more TRPs for the joint communications with the wireless device. The operations of 2520 may be performed in accordance with examples as disclosed herein. In some examples, aspects of the operations of 2520 may be performed by an indication component 940 as described with reference to FIG. 9.

Figure 26:
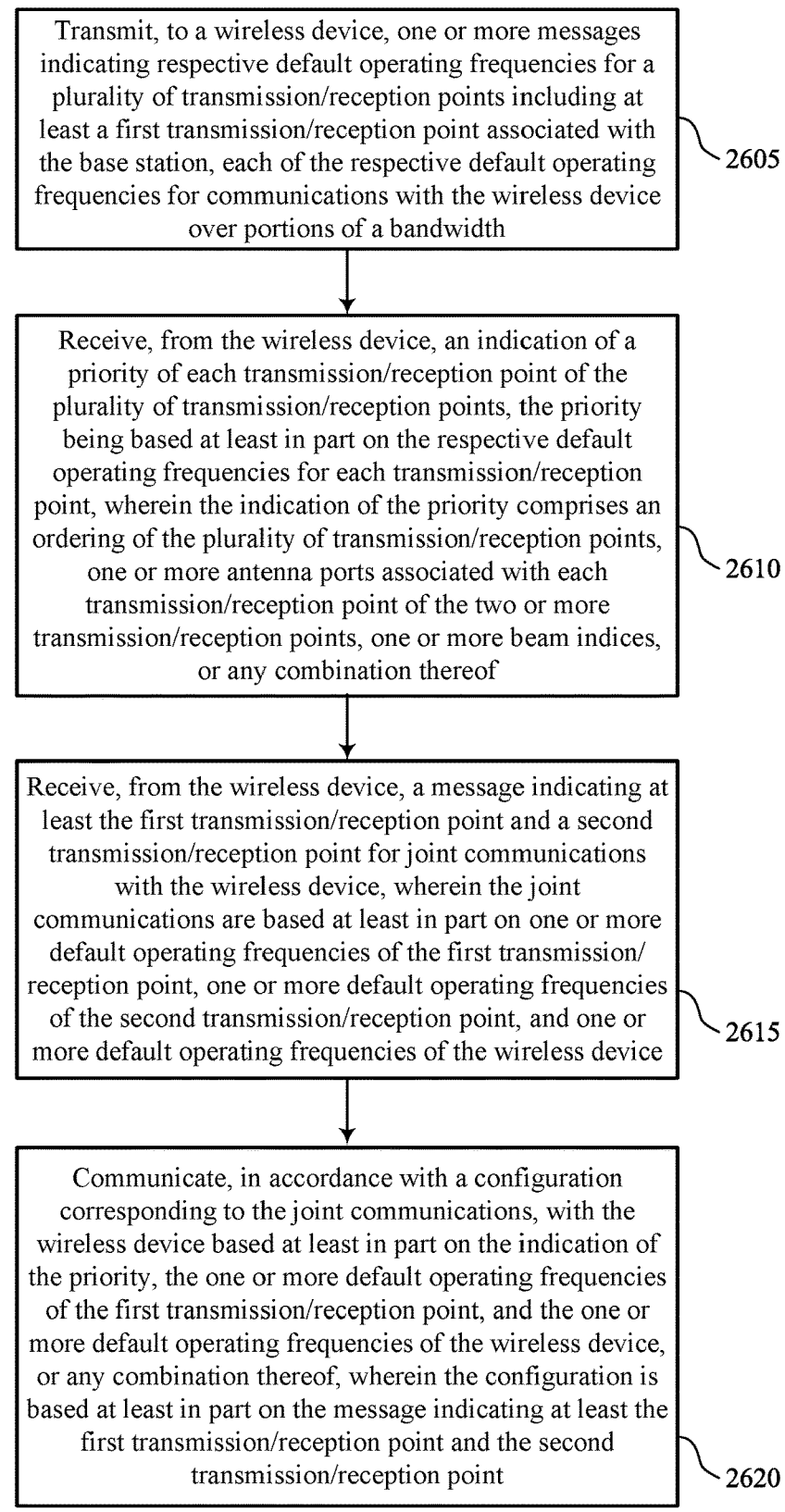

FIG. 26 shows a flowchart illustrating a method 2600 that supports techniques for TRP and beam selection in ultra-wide bandwidth systems in accordance with aspects of the present disclosure. The operations of the method 2600 may be implemented by a base station or its components as described herein. For example, the operations of the method 2600 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2605, the method may include transmitting, to a wireless device, one or more messages indicating respective default operating frequencies for a set of multiple TRPs including at least a first TRP associated with the base station, each of the respective default operating frequencies for communications with the wireless device over portions of a bandwidth. The operations of 2605 may be performed in accordance with examples as disclosed herein. In some examples, aspects of the operations of 2605 may be performed by a default operating frequency component 1325 as described with reference to FIG. 13.

At 2610, the method may include receiving, from the wireless device, an indication of a priority of each TRP of the set of multiple TRPs, the priority being based on the respective default operating frequencies for each TRP, where the indication of the priority includes an ordering of the set of multiple TRPs, one or more antenna ports associated with each TRP of the two or more TRPs, one or more beam indices, or any combination thereof. The operations of 2610 may be performed in accordance with examples as disclosed herein. In some examples, aspects of the operations of 2610 may be performed by a priority component 1330 as described with reference to FIG. 13.

At 2615, the method may include receiving, from the wireless device, a message indicating at least the first TRP and a second TRP for joint communications with the wireless device, where the joint communications are based on one or more default operating frequencies of the first TRP, one or more default operating frequencies of the second TRP, and one or more default operating frequencies of the wireless device. The operations of 2615 may be performed in accordance with examples as disclosed herein. In some examples, aspects of the operations of 2615 may be performed by a joint communication component 1335 as described with reference to FIG. 13.

At 2620, the method may include communicating, in accordance with a configuration corresponding to the joint communications, with the wireless device based on the indication of the priority, the one or more default operating frequencies of the first TRP, the one or more default operating frequencies of the wireless device, or any combination thereof, where the configuration is based on the message indicating at least the first TRP and the second TRP. The operations of 2620 may be performed in accordance with examples as disclosed herein. In some examples, aspects of the operations of 2620 may be performed by a joint communication component 1335 as described with reference to FIG. 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a wireless device, comprising: receiving one or more messages indicating respective default operating frequencies for each TRP of a plurality of TRPs, each of the respective default operating frequencies for communications with the wireless device over different portions of a bandwidth; transmitting an indication of a priority of each TRP of the plurality of TRPs, the priority being based at least in part on the respective default operating frequencies for each TRP, wherein the indication of the priority comprises an ordering of the plurality of TRPs, one or more antenna ports associated with each TRP, one or more beam indices, or any combination thereof; selecting, from the plurality of TRPs, two or more TRPs for joint communications with the wireless device based at least in part on the respective default operating frequencies of the two or more TRPs and one or more default operating frequencies of the wireless device; and transmitting a message indicating the two or more TRPs for the joint communications with the wireless device.

Aspect 2: The method of aspect 1, further comprising: determining the priority of each TRP of the plurality of TRPs based at least in part on the one or more default operating frequencies of the wireless device for the communications over the portions of the bandwidth.

Aspect 3: The method of aspect 2, wherein determining the priority comprises: identifying a first antenna port of a first TRP of the plurality of TRPs, the first antenna port associated with a first default operating frequency; identifying a first beam index of a beam for communicating with the first TRP, the first beam index associated with the first antenna port and the first default operating frequency; and determining a priority of the first TRP, the first antenna port, and the first beam index based at least in part on the one or more default operating frequencies of the wireless device and the first default operating frequency.

Aspect 4: The method of aspect 3, wherein the indication of the priority comprises the priority of the first TRP, the first antenna port, and the first beam index relative to a second TRP of the plurality of TRPs, a second antenna port of the second TRP, and a second beam index.

Aspect 5: The method of any of aspects 3 through 4, further comprising: identifying one or more of a SSB, a CSI-RS, or a SRS, associated with the beam, wherein the first beam index is identified based at least in part on the SSB, the CSI-RS, the SRS, or any combination thereof.

Aspect 6: The method of any of aspects 2 through 5, further comprising: comparing the respective default operating frequencies for each TRP with the one or more default operating frequencies of the wireless device, wherein determining the priority is based at least in part on the comparison.

Aspect 7: The method of aspect 6, further comprising: estimating array gain losses for transmissions over antenna ports of the wireless device and antenna ports of each TRP, wherein the comparison is based at least in part on the estimated array gain losses.

Aspect 8: The method of any of aspects 2 through 7, wherein each default operating frequency of the one or more default operating frequencies comprises a frequency such that substantially half of a wavelength corresponding to the frequency is substantially equal to a spacing between two or more antenna elements of an antenna array of the wireless device.

Aspect 9: The method of aspect 8, wherein the spacing between the two or more antenna elements of the antenna array of the wireless device is within an upper threshold and a lower threshold that are associated with substantially half of the wavelength of the frequency.

Aspect 10: The method of any of aspects 1 through 9, wherein transmitting the indication of the priority comprises: transmitting, to at least one TRP of the plurality of TRPs, the indication of the priority via control signaling.

Aspect 11: The method of any of aspects 1 through 10, wherein transmitting the indication of the priority comprises: broadcasting the indication of the priority to the plurality of TRPs.

Aspect 12: The method of any of aspects 1 through 11, wherein receiving the one or more messages indicating the respective default operating frequencies comprises: receiving, from a first TRP of the plurality of TRPs, a message comprising an indication of one or more default operating frequencies of the first TRP, each of the one or more default operating frequencies corresponding to one or more antenna ports of the first TRP.

Aspect 13: The method of any of aspects 1 through 12, wherein each of the respective default operating frequencies comprise a range of default operating frequencies for a TRP of the plurality of TRPs, the range of default operating frequencies providing beamforming performance that satisfies a performance threshold.

Aspect 14: The method of any of aspects 1 through 13, further comprising: communicating with a first TRP over a beam based at least in part on the priority, wherein the beam corresponds to a beam index, an antenna port, and a TRP having a highest priority.

Aspect 15: The method of any of aspects 1 through 14, further comprising: identifying an additional TRP that is different from TRPs of the plurality of TRPs; and modifying the priority based at least in part on one or more default operating frequencies of the additional TRP.

Aspect 16: The method of any of aspects 1 through 15, further comprising: performing one or more beam refinement procedures for communicating with at least one TRP of the plurality of TRPs based at least in part on the indication of the priority.

Aspect 17: The method of any of aspects 1 through 16, wherein the priority is based at least in part on a dynamic TRP selection scheme.

Aspect 18: The method of any of aspects 1 through 17, further comprising: identifying a first TRP of the plurality of TRPs that supports a first default operating frequency; determining that the first default operating frequency is supported by the wireless device using a comparison between the one or more default operating frequencies of the wireless device and the first default operating frequency of the first TRP; and selecting at least the first TRP for the joint communications based at least in part on the comparison.

Aspect 19: The method of aspect 18, further comprising: identifying a second TRP of the plurality of TRPs that supports a second default operating frequency; determining that the second default operating frequency is supported by the wireless device using a comparison between the one or more default operating frequencies of the wireless device and the second default operating frequency of the second TRP; and selecting the second TRP for the joint communications based at least in part on the comparison.

Aspect 20: The method of any of aspects 18 through 19, wherein determining that the first default operating frequency is supported by the wireless device comprises: identifying a configuration of one or more antenna ports of the wireless device; and determining that the first default operating frequency is supported by the wireless device based at least in part on the configuration of the one or more antenna ports.

Aspect 21: The method of any of aspects 18 through 20, further comprising: estimating array gain losses for communications over the bandwidth that are associated with a first antenna port of the first TRP and a second antenna port of the wireless device, wherein selecting at least the first TRP is based at least in part on the estimated array gain losses satisfying a threshold.

Aspect 22: The method of any of aspects 18 through 21, further comprising: receiving, from the first TRP, a second message comprising an indication of one or more default operating frequencies of the first TRP, each of the one or more default operating frequencies of the first TRP corresponding to one or more antenna ports of the first TRP, or one or more radio frequency chains of the first TRP, or any combination thereof.

Aspect 23: The method of any of aspects 1 through 22, wherein transmitting the message indicating the two or more TRPs comprises: transmitting the message via control signaling to each TRP of the plurality of TRPs.

Aspect 24: The method of aspect 23, wherein the message is transmitted semi-statically during one or more time intervals or dynamically.

Aspect 25: The method of any of aspects 1 through 24, further comprising: communicating with the two or more TRPs for the joint communications, wherein the joint communications comprises joint beamforming between the wireless device and each TRP of the two or more transmission reception points.

Aspect 26: The method of any of aspects 1 through 25, further comprising: identifying a TRP hopping pattern for communications between the two or more TRPs; transmitting, within the message, an indication of the TRP hopping pattern; and communicating with each of the two or more TRPs in accordance with the TRP hopping pattern.

Aspect 27: The method of any of aspects 1 through 26, wherein the wireless device comprises a UE, or an IAB node, or a CPE, or a sidelink node, or a wireless repeater configured for retransmissions.

Aspect 28: A method for wireless communication at a base station, comprising: transmitting, to a wireless device, one or more messages indicating respective default operating frequencies for a plurality of TRPs including at least a first TRP associated with the base station, each of the respective default operating frequencies for communications with the wireless device over portions of a bandwidth; receiving, from the wireless device, an indication of a priority of each TRP of the plurality of TRPs, the priority being based at least in part on the respective default operating frequencies for each TRP, wherein the indication of the priority comprises an ordering of the plurality of TRPs, one or more antenna ports associated with each TRP of the two or more TRPs, one or more beam indices, or any combination thereof; receiving, from the wireless device, a message indicating at least the first TRP and a second TRP for joint communications with the wireless device, wherein the joint communications are based at least in part on one or more default operating frequencies of the first TRP, one or more default operating frequencies of the second TRP, and one or more default operating frequencies of the wireless device; and communicating, in accordance with a configuration corresponding to the joint communications, with the wireless device based at least in part on the indication of the priority, the one or more default operating frequencies of the first TRP, and the one or more default operating frequencies of the wireless device, wherein the configuration is based at least in part on the message indicating at least the first TRP and the second TRP.

Aspect 29: The method of aspect 28, further comprising: identifying, from the indication of the priority, a priority of the first TRP, a first antenna port, and a first beam index relative to a second TRP of the plurality of TRPs, a second antenna port of the second TRP, and a second beam index.

Aspect 30: The method of aspect 29, wherein the first beam index is based at least in part on a SSB, a CSI-RS, a SRS, or any combination thereof.

Aspect 31: The method of any of aspects 28 through 30, wherein transmitting the one or more messages indicating the respective default operating frequencies comprises: transmitting, to the wireless device, a message comprising an indication of one or more default operating frequencies of the first TRP associated with the base station, each of the one or more default operating frequencies corresponding to one or more antenna ports of the first TRP.

Aspect 32: The method of any of aspects 28 through 31, wherein the priority of the plurality of TRPs is based at least in part on one or more default operating frequencies of the wireless device for the communications over the portions of the bandwidth.

Aspect 33: The method of any of aspects 28 through 32, wherein each default operating frequency of the one or more default operating frequencies comprises a frequency such that substantially half of a wavelength corresponding to the frequency is substantially equal to a spacing between two or more antenna elements of an antenna array of each of the one or more TRPs.

Aspect 34: The method of aspect 33, wherein the spacing between the two or more antenna elements of the antenna array of each of the one or more TRPs is within an upper threshold and a lower threshold that are associated with substantially half of the wavelength of the frequency.

Aspect 35: The method of any of aspects 28 through 34, wherein receiving the indication of the priority comprises: receiving, from the wireless device, the indication of the priority via a control signaling.

Aspect 36: The method of any of aspects 28 through 35, wherein receiving the indication of the priority comprises: receiving a broadcast message comprising the indication of the priority.

Aspect 37: The method of any of aspects 28 through 36, wherein each of the one or more default operating frequencies comprises a range of default operating frequencies, the range of default operating frequencies providing beamforming performance that satisfies a performance threshold.

Aspect 38: The method of any of aspects 28 through 37, further comprising: performing one or more beam refinement procedures for communicating with the wireless device based at least in part on the indication of the priority.

Aspect 39: The method of any of aspects 28 through 38, wherein the plurality of TRPs are associated with the base station.

Aspect 40: The method of any of aspects 28 through 39, wherein the plurality of TRPs are associated with different base stations.

Aspect 41: The method of any of aspects 28 through 40, wherein the wireless device comprises a user equipment, or an integrated access and backhaul node, or a customer premises equipment, or a sidelink node, or a wireless repeater configured for retransmissions.

Aspect 42: The method of any of aspects 28 through 41, further comprising: exchanging configuration information for the joint communications with the second TRP, wherein the configuration is determined based at least in part on configuration information exchanged with the second TRP.

Aspect 43: The method of aspect 42, wherein the configuration information is exchanged over a backhaul link between the first TRP and the second transmission reception point.

Aspect 44: The method of any of aspects 28 through 43, wherein communicating with the wireless device comprises: performing joint beamforming with the second TRP for communicating data with the wireless device.

Aspect 45: The method of any of aspects 28 through 44, wherein communicating with the wireless device comprises: receiving, within the message, an indication of a TRP hopping pattern including at least the first TRP and the second TRP; and communicating with the wireless device in accordance with the TRP hopping pattern.

Aspect 46: The method of any of aspects 28 through 45, wherein receiving the message indicating the first TRP and the second TRP for the joint communications comprises: receiving the message from the wireless device via control signaling.

Aspect 47: The method of aspect 46, wherein the message is received semi-statically during one or more time intervals or dynamically.

Aspect 48: An apparatus for wireless communication at a wireless device, comprising a processor; memory coupled with the processor; and instructions stored in the memory and executable by the processor to cause the apparatus to perform a method of any of aspects 1 through 27.

Aspect 49: An apparatus for wireless communication at a wireless device, comprising at least one means for performing a method of any of aspects 1 through 27.

Aspect 50: A non-transitory computer-readable medium storing code for wireless communication at a wireless device, the code comprising instructions executable by a processor to perform a method of any of aspects 1 through 27.

Aspect 51: An apparatus for wireless communication at a base station, comprising a processor; memory coupled with the processor; and instructions stored in the memory and executable by the processor to cause the apparatus to perform a method of any of aspects 28 through 47.

Aspect 52: An apparatus for wireless communication at a base station, comprising at least one means for performing a method of any of aspects 28 through 47.

Aspect 53: A non-transitory computer-readable medium storing code for wireless communication at a base station, the code comprising instructions executable by a processor to perform a method of any of aspects 28 through 47.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:

receiving one or more messages indicating respective default operating frequencies for each transmission/reception point of a plurality of transmission/reception points, each of the respective default operating frequencies for communications with the wireless device over different portions of a bandwidth;

transmitting an indication of a priority of each transmission/reception point of the plurality of transmission/reception points, the priority being based at least in part on the respective default operating frequencies for each transmission/reception point, wherein the indication of the priority comprises an ordering of the plurality of transmission/reception points, one or more antenna ports associated with each transmission/reception point, one or more beam indices, or any combination thereof;

selecting, from the plurality of transmission/reception points, two or more transmission/reception points for joint communications with the wireless device based at least in part on the respective default operating frequencies of the two or more transmission/reception points and one or more default operating frequencies of the wireless device; and transmitting a message indicating the two or more transmission/reception points for the joint communications with the wireless device.

2. The method of claim 1, further comprising:
  determining the priority of each transmission/reception point of the plurality of transmission/reception points based at least in part on the one or more default operating frequencies of the wireless device for the communications over the portions of the bandwidth.

3. The method of claim 2, wherein determining the priority comprises:
  identifying a first antenna port of a first transmission/reception point of the plurality of transmission/reception points, the first antenna port associated with a first default operating frequency;
  identifying a first beam index of a beam for communicating with the first transmission/reception point, the first beam index associated with the first antenna port and the first default operating frequency; and
  determining a priority of the first transmission/reception point, the first antenna port, and the first beam index based at least in part on the one or more default operating frequencies of the wireless device and the first default operating frequency.

4. The method of claim 3, wherein the indication of the priority comprises the priority of the first transmission/reception point, the first antenna port, and the first beam index relative to a second transmission/reception point of the plurality of transmission/reception points, a second antenna port of the second transmission/reception point, and a second beam index.

5. The method of claim 3, further comprising:
  identifying one or more of a synchronization signal block, a channel state information reference signal, or a sounding reference signal, associated with the beam, wherein the first beam index is identified based at least in part on the synchronization signal block, the channel state information reference signal, the sounding reference signal, or any combination thereof.

6. The method of claim 2, further comprising:
  comparing the respective default operating frequencies for each transmission/reception point with the one or more default operating frequencies of the wireless device, wherein determining the priority is based at least in part on the comparison.

7. The method of claim 6, further comprising:
  estimating array gain losses for transmissions over antenna ports of the wireless device and antenna ports of each transmission/reception point, wherein the comparison is based at least in part on the estimated array gain losses.

8. The method of claim 2, wherein each default operating frequency of the one or more default operating frequencies comprises a frequency such that substantially half of a wavelength corresponding to the frequency is substantially equal to a spacing between two or more antenna elements of an antenna array of the wireless device.

9. The method of claim 8, wherein the spacing between the two or more antenna elements of the antenna array of the wireless device is within an upper threshold and a lower threshold that are associated with substantially half of the wavelength of the frequency.

10. The method of claim 1, wherein transmitting the indication of the priority comprises:
  transmitting, to at least one transmission/reception point of the plurality of transmission/reception points, the indication of the priority via a control signaling.

11. The method of claim 1, wherein transmitting the indication of the priority comprises:
  broadcasting the indication of the priority to the plurality of transmission/reception points.

12. The method of claim 1, wherein receiving the one or more messages indicating the respective default operating frequencies comprises:
  receiving, from a first transmission/reception point of the plurality of transmission/reception points, a message comprising an indication of one or more default operating frequencies of the first transmission/reception point, each of the one or more default operating frequencies corresponding to one or more antenna ports of the first transmission/reception point.

13. The method of claim 1, wherein each of the respective default operating frequencies comprise a range of default operating frequencies for a transmission/reception point of the plurality of transmission/reception points, the range of default operating frequencies providing beamforming performance that satisfies a performance threshold.

14. The method of claim 1, further comprising:
  communicating with a first transmission/reception point over a beam based at least in part on the priority, wherein the beam corresponds to a beam index, an antenna port, and a transmission/reception point having a highest priority.

15. The method of claim 1, further comprising:
  identifying an additional transmission/reception point that is different from transmission/reception points of the plurality of transmission/reception points; and
  modifying the priority based at least in part on one or more default operating frequencies of the additional transmission/reception point.

16. The method of claim 1, further comprising:
  performing one or more beam refinement procedures for communicating with at least one transmission/reception point of the plurality of transmission/reception points based at least in part on the indication of the priority.

17. The method of claim 1, wherein the priority is based at least in part on a dynamic transmission/reception point selection scheme.

18. The method of claim 1, further comprising:
  identifying a first transmission/reception point of the plurality of transmission/reception points that supports a first default operating frequency;
  determining that the first default operating frequency is supported by the wireless device using a comparison between the one or more default operating frequencies of the wireless device and the first default operating frequency of the first transmission/reception point; and
  selecting at least the first transmission/reception point for the joint communications based at least in part on the comparison.

19. The method of claim 18, further comprising:
  identifying a second transmission/reception point of the plurality of transmission/reception points that supports a second default operating frequency;
  determining that the second default operating frequency is supported by the wireless device using a comparison between the one or more default operating frequencies of the wireless device and the second default operating frequency of the second transmission/reception point; and
  selecting the second transmission/reception point for the joint communications based at least in part on the comparison.

20. The method of claim 18, wherein determining that the first default operating frequency is supported by the wireless device comprises:
identifying a configuration of one or more antenna ports of the wireless device; and
determining that the first default operating frequency is supported by the wireless device based at least in part on the configuration of the one or more antenna ports.

21. The method of claim 18, further comprising:
estimating array gain losses for communications over the bandwidth that are associated with a first antenna port of the first transmission/reception point and a second antenna port of the wireless device, wherein selecting at least the first transmission/reception point is based at least in part on the estimated array gain losses satisfying a threshold.

22. The method of claim 18, further comprising:
receiving, from the first transmission/reception point, a second message comprising an indication of one or more default operating frequencies of the first transmission/reception point, each of the one or more default operating frequencies of the first transmission/reception point corresponding to one or more antenna ports of the first transmission/reception point, or one or more radio frequency chains of the first transmission/reception point, or any combination thereof.

23. The method of claim 1, wherein transmitting the message indicating the two or more transmission/reception points comprises:
transmitting the message via control signaling to each transmission/reception point of the plurality of transmission/reception points.

24. The method of claim 23, wherein the message is transmitted semi-statically during one or more time intervals or dynamically.

25. The method of claim 1, further comprising:
communicating with the two or more transmission/reception points for the joint communications, wherein the joint communications comprises joint beamforming between the wireless device and each transmission/reception point of the two or more transmission reception points.

26. The method of claim 1, further comprising:
identifying a transmission/reception point hopping pattern for communications between the two or more transmission/reception points;
transmitting, within the message, an indication of the transmission/reception point hopping pattern; and
communicating with each of the two or more transmission/reception points in accordance with the transmission/reception point hopping pattern.

27. The method of claim 1, wherein the wireless device comprises a user equipment, or an integrated access and backhaul node, or a customer premises equipment, or a sidelink node, or a wireless repeater configured for retransmissions.

28. A method for wireless communication at a base station, comprising:
transmitting, to a wireless device, one or more messages indicating respective default operating frequencies for a plurality of transmission/reception points including at least a first transmission/reception point associated with the base station, each of the respective default operating frequencies for communications with the wireless device over portions of a bandwidth;
receiving, from the wireless device, an indication of a priority of each transmission/reception point of the plurality of transmission/reception points, the priority being based at least in part on the respective default operating frequencies for each transmission/reception point, wherein the indication of the priority comprises an ordering of the plurality of transmission/reception points, one or more antenna ports associated with each transmission/reception point of the two or more transmission/reception points, one or more beam indices, or any combination thereof;
receiving, from the wireless device, a message indicating at least the first transmission/reception point and a second transmission/reception point for joint communications with the wireless device, wherein the joint communications are based at least in part on one or more default operating frequencies of the first transmission/reception point, one or more default operating frequencies of the second transmission/reception point, and one or more default operating frequencies of the wireless device; and communicating, in accordance with a configuration corresponding to the joint communications, with the wireless device based at least in part on the indication of the priority, the one or more default operating frequencies of the first transmission/reception point, the one or more default operating frequencies of the wireless device, or any combination thereof, wherein the configuration is based at least in part on the message indicating at least the first transmission/reception point and the second transmission/reception point.

29. An apparatus for wireless communication at a wireless device, comprising:
a processor,
memory coupled with the processor; and
instructions stored in the memory and executable by the processor to cause the apparatus to:
receive one or more messages indicating respective default operating frequencies for each transmission/reception point of a plurality of transmission/reception points, each of the respective default operating frequencies for communications with the wireless device over different portions of a bandwidth;
transmit an indication of a priority of each transmission/reception point of the plurality of transmission/reception points, the priority being based at least in part on the respective default operating frequencies for each transmission/reception point, wherein the indication of the priority comprises an ordering of the plurality of transmission/reception points, one or more antenna ports associated with each transmission/reception point, one or more beam indices, or any combination thereof;
select, from the plurality of transmission/reception points, two or more transmission/reception points for joint communications with the wireless device based at least in part on the respective default operating frequencies of the two or more transmission/reception points and one or more default operating frequencies of the wireless device; and
transmit a message indicating the two or more transmission/reception points for the joint communications with the wireless device.

30. An apparatus for wireless communication at a base station, comprising:
a processor,
memory coupled with the processor; and
instructions stored in the memory and executable by the processor to cause the apparatus to:

transmit, to a wireless device, one or more messages indicating respective default operating frequencies for a plurality of transmission/reception points including at least a first transmission/reception point that is associated with the base station, each of the respective default operating frequencies for communications with the wireless device over portions of a bandwidth;

receive, from the wireless device, an indication of a priority of each transmission/reception point of the plurality of transmission/reception points, the priority being based at least in part on the respective default operating frequencies for each transmission/reception point, wherein the indication of the priority comprises an ordering of the plurality of transmission/reception points, one or more antenna ports associated with each transmission/reception point of the two or more transmission/reception points, one or more beam indices, or any combination thereof;

receive, from the wireless device, a message indicating at least the first transmission/reception point and a second transmission/reception point for joint communications with the wireless device, wherein the joint communications are based at least in part on one or more default operating frequencies of the first transmission/reception point, one or more default operating frequencies of the second transmission/reception point, and one or more default operating frequencies of the wireless device; and communicate, in accordance with a configuration corresponding to the joint communications, with the wireless device based at least in part on the indication of the priority, the one or more default operating frequencies of the first transmission/reception point, the one or more default operating frequencies of the wireless device, or any combination thereof, wherein the configuration is based at least in part on the message indicating at least the first transmission/reception point and the second transmission/reception point.

* * * * *